United States Patent
Reid et al.

(10) Patent No.: US 11,126,714 B2
(45) Date of Patent: *Sep. 21, 2021

(54) ENCODING OF INPUT TO STORAGE CIRCUITRY

(71) Applicant: Arm Limited, Cambridge (GB)

(72) Inventors: Alastair David Reid, Fulbourn (GB); Dominic Phillip Mulligan, St Neots (GB); Milosch Meriac, Cambridge (GB); Matthias Lothar Boettcher, Cambridge (GB); Nathan Yong Seng Chong, Cambridge (GB); Ian Michael Caulfield, Cambridge (GB); Peter Richard Greenhalgh, Cambridge (GB); Frederic Claude Marie Piry, Cagnes-sur-Mer (FR); Albin Pierrick Tonnerre, Nice (FR); Thomas Christopher Grocutt, Cambridge (GB); Yasuo Ishii, Austin, TX (US)

(73) Assignee: Arm Limited, Cambridge (GB)

( * ) Notice: Subject to any disclaimer, the term of this patent is extended or adjusted under 35 U.S.C. 154(b) by 235 days.

This patent is subject to a terminal disclaimer.

(21) Appl. No.: 16/149,297

(22) Filed: Oct. 2, 2018

(65) Prior Publication Data

US 2019/0163902 A1    May 30, 2019

Related U.S. Application Data

(63) Continuation-in-part of application No. 15/825,524, filed on Nov. 29, 2017.

(51) Int. Cl.
*G06F 21/55* (2013.01)
*H04L 9/06* (2006.01)
(Continued)

(52) U.S. Cl.
CPC .......... *G06F 21/556* (2013.01); *G06F 9/3806* (2013.01); *G06F 9/3842* (2013.01);
(Continued)

(58) Field of Classification Search
CPC ........ G06F 21/556; G06F 21/53; G06F 21/78; G06F 9/3806; G06F 9/3842; G06F 9/3851; H04L 9/0643
(Continued)

(56) References Cited

U.S. PATENT DOCUMENTS

| 5,018,147 A | 5/1991 | Kai |
| 5,577,231 A | 11/1996 | Scalzi |

(Continued)

FOREIGN PATENT DOCUMENTS

| WO | 03/003195 | 1/2003 |

OTHER PUBLICATIONS

Notice of Allowance dated Mar. 25, 2020 in U.S. Appl. No. 16/207,241, 10 pages.

(Continued)

*Primary Examiner* — Dant B Shaifer Harriman
(74) *Attorney, Agent, or Firm* — Nixon & Vanderhye P.C.

(57) ABSTRACT

A data processing apparatus comprises branch prediction circuitry adapted to store at least one branch prediction state entry in relation to a stream of instructions, input circuitry to receive at least one input to generate a new branch prediction state entry, wherein the at least one input comprises a plurality of bits; and coding circuitry adapted to perform an encoding operation to encode at least some of the plurality of bits based on a value associated with a current execution environment in which the stream of instructions is being executed. This guards against potential attacks which exploit the ability for branch prediction entries trained by one
(Continued)

execution environment to be used by another execution environment as a basis for branch predictions.

29 Claims, 23 Drawing Sheets

(51) Int. Cl.
  *G06F 9/38* (2018.01)
  *G06F 12/10* (2016.01)
  *G06F 21/53* (2013.01)
  *G06F 21/78* (2013.01)
(52) U.S. Cl.
  CPC ............ *G06F 9/3851* (2013.01); *G06F 12/10* (2013.01); *G06F 21/53* (2013.01); *G06F 21/78* (2013.01); *H04L 9/0643* (2013.01); *G06F 2212/65* (2013.01); *G06F 2221/034* (2013.01)
(58) Field of Classification Search
  USPC .......................................................... 726/22
  See application file for complete search history.

(56) References Cited

U.S. PATENT DOCUMENTS

| | | | |
|---|---|---|---|
| 5,692,168 A | 11/1997 | McMahan | |
| 5,717,885 A | 2/1998 | Kumar | |
| 5,752,275 A | 5/1998 | Hammond | |
| 5,835,967 A | 11/1998 | McMahan | |
| 6,079,004 A | 6/2000 | Liedtke | |
| 6,633,963 B1 | 10/2003 | Ellison | |
| 7,310,706 B1* | 12/2007 | Stribaek | G06F 12/0802 711/128 |
| 7,447,882 B2 | 11/2008 | Elwood | |
| 9,690,714 B1 | 6/2017 | Sites | |
| 10,185,731 B2 | 1/2019 | Hayenga et al. | |
| 2001/0021974 A1* | 9/2001 | Lee | G06F 9/3851 712/240 |
| 2003/0152235 A1* | 8/2003 | Cohen | H04W 12/0431 380/278 |
| 2004/0117318 A1* | 6/2004 | Grawrock | G06F 21/57 705/66 |
| 2004/0181682 A1* | 9/2004 | Orino | G06F 21/71 726/22 |
| 2005/0165758 A1 | 7/2005 | Kasten | |
| 2006/0149981 A1* | 7/2006 | Dieffenderfer | G06F 9/382 713/320 |
| 2006/0277390 A1 | 12/2006 | Zuraski | |
| 2007/0113044 A1 | 5/2007 | Day | |
| 2009/0089564 A1 | 4/2009 | Brickell et al. | |
| 2009/0222645 A1* | 9/2009 | Moyer | G06F 9/382 712/205 |
| 2010/0333093 A1 | 12/2010 | Nussbaum | |
| 2011/0093658 A1* | 4/2011 | Zuraski, Jr. | G06F 9/3844 711/125 |
| 2011/0138149 A1 | 6/2011 | Karlsson | |
| 2011/0208935 A1 | 8/2011 | Grisenthwaite | |
| 2013/0275726 A1* | 10/2013 | Ukai | G06F 9/3806 712/221 |
| 2015/0205885 A1 | 7/2015 | Zhou | |
| 2015/0286483 A1* | 10/2015 | Adiga | G06F 9/3806 712/239 |
| 2015/0286639 A1 | 10/2015 | Bordawekar | |
| 2015/0331691 A1 | 11/2015 | Levitan et al. | |
| 2016/0117246 A1* | 4/2016 | Maurice | G06F 21/556 711/130 |
| 2017/0286421 A1 | 10/2017 | Hayenga et al. | |
| 2019/0065782 A1* | 2/2019 | Selleck | G06F 21/6254 |

OTHER PUBLICATIONS

Office Action dated Mar. 23, 2020 in U.S. Appl. No. 15/825,524, 13 pages.
Office Action dated Dec. 4, 2019 in U.S. Appl. No. 15/825,524, 38 pages.
International Search Report and Written Opinion of the International Searching Authority for PCT/GB2018/053433 dated Mar. 20, 2019, 13 pages.
Final Office Action dated Oct. 28, 2019 in U.S. Appl. No. 16/207,241, 20 pages.
U.S. Appl. No. 15/086,866, filed Mar. 31, 2016, Inventor: Hayenga et al.
Office Action dated May 23, 2018 in co-pending U.S. Appl. No. 15/086,866 13 pages.
J. Porquet et al., "NoC-MPU: a secure architecture for flexible co-hosting on shared memory MPSoCs" Proc. Design Automation and Test in Europe, Jul. 2011, pp. 591-594.
L. Fiorin et al., "Secure Memory Accesses on Networks-on-Chip" IEEE Transactions on Computers, vol. 57, No. 9, Sep. 2008, pp. 1216-1229.
U.S. Appl. No. 15/825,524, filed Nov. 29, 2017, Inventor: Grocutt et al.
Office Action dated Apr. 18, 2019 in U.S. Appl. No. 16/207,241, 23 pages.
International Search Report and Written Opinion of the International Searching Authority dated Jan. 29, 2019 in PCT/GB2018/053033, 17 pages.
D. Evtyushkin et al, "Jump Over ASLR: Attacking Branch Predictors to Bypass ASLR" The 49th Annual IEEE/ACM International Symposium on Microarchitecture, Oct. 15, 2016, 13 pages.
U.S. Appl. No. 16/207,241, filed Dec. 3, 2018, Inventor: Hayenga et al.

* cited by examiner

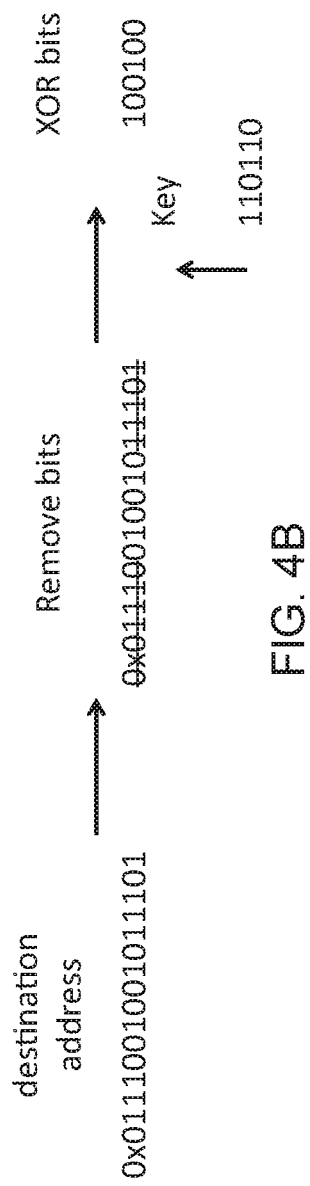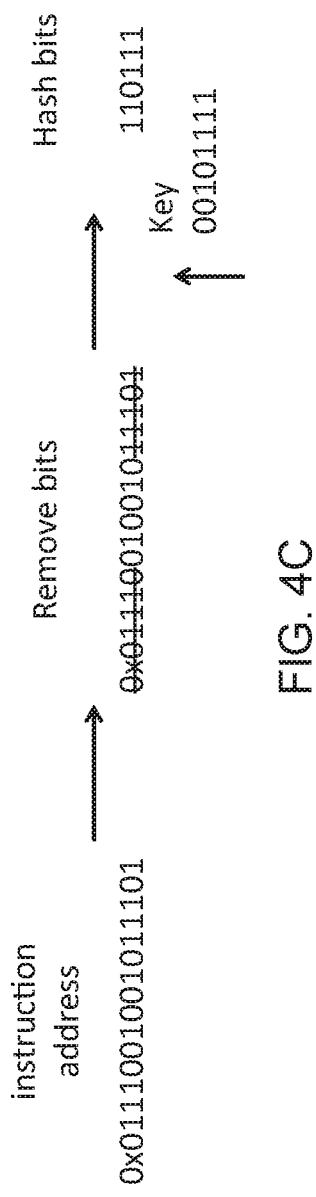
FIG. 4A
FIG. 4B
FIG. 4C

This old information is encrypted by stale key (Key 1) while region table ID A has new key. To create the same attack (speculatively jump to malicious target T), the attacker needs to provide T' such that Dec( Enc(T', Key 1), New Key)==T.

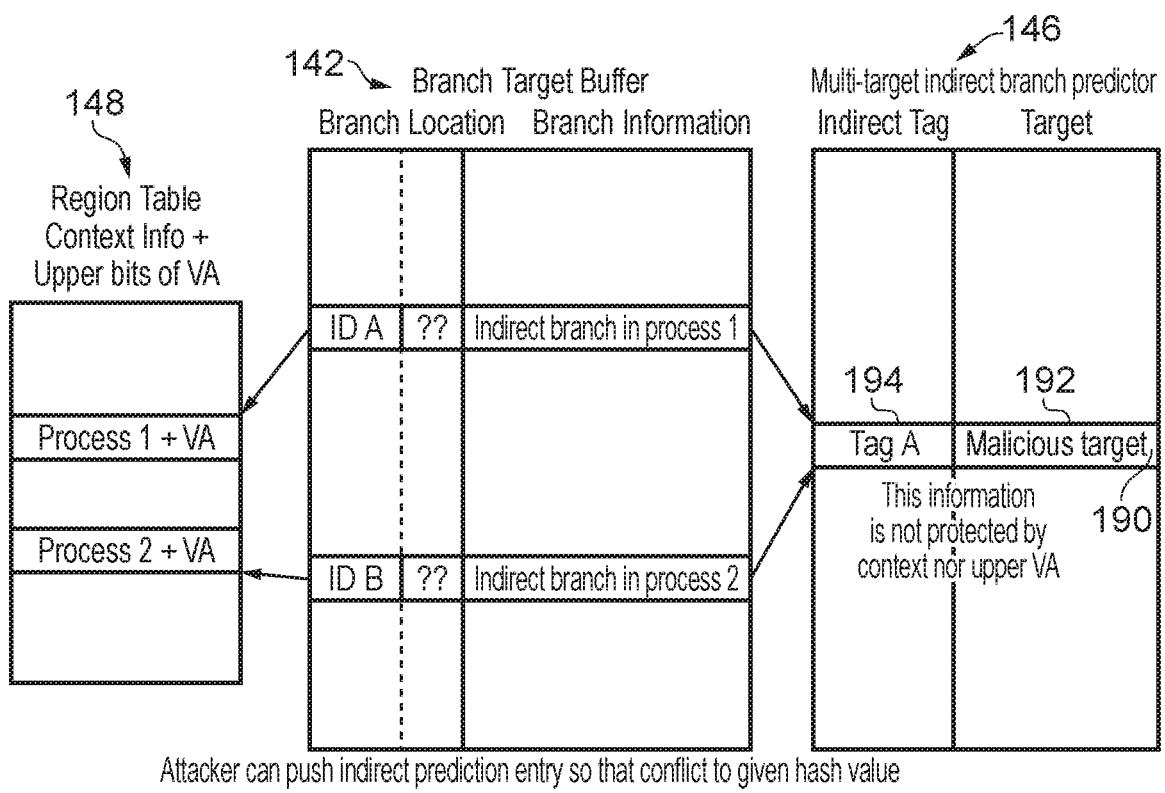

Attacker can push indirect prediction entry so that conflict to given hash value

FIG. 16

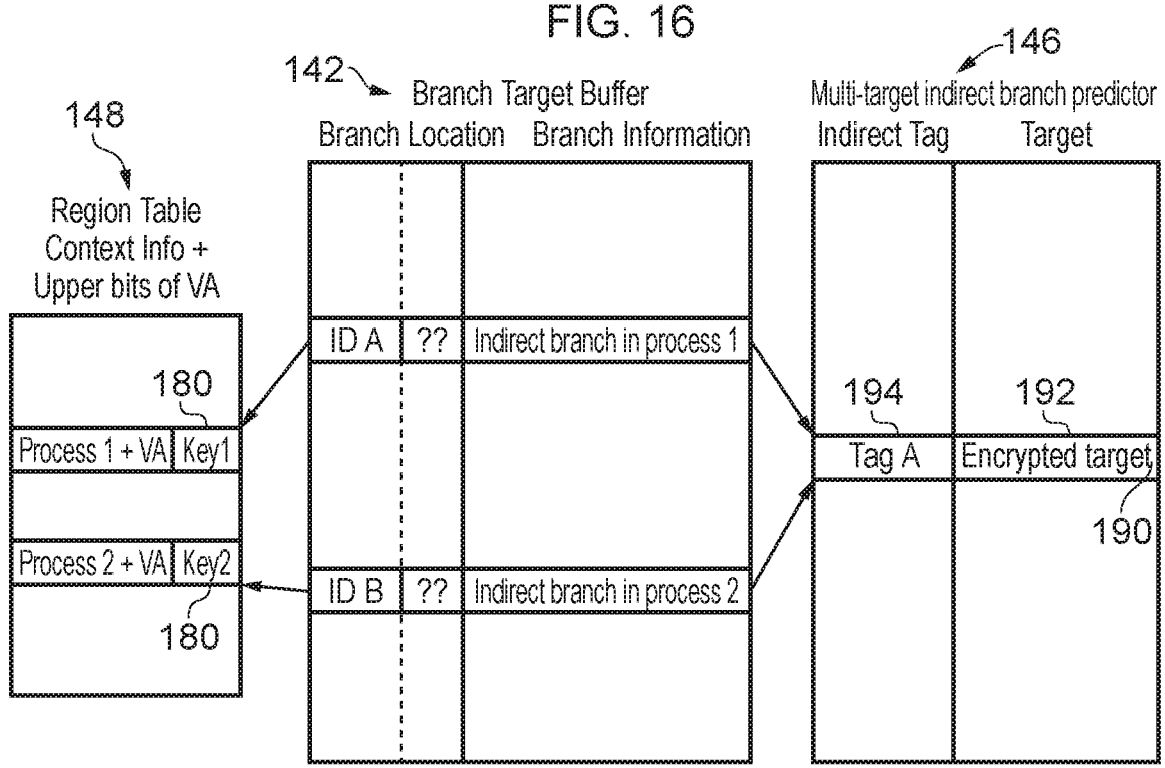

By using same technique, When process 1 is using malicious target, the target will be decrypted by Key 1. While process 2 is using the malicious target, it will be decrypted by Key 2. To jump to actual malicious target T in process 1, process 2 needs to prepare T' such that T = Dec ( Enc (T', Key 2), Key 1 ). Moreover, the Key will change whenever region table replacement happen for ID=A.

FIG. 17

ENCODING OF INPUT TO STORAGE CIRCUITRY

This application is a continuation-in-part of U.S. application Ser. No. 15/825,524 filed Nov. 29, 2017, the entire contents of which is hereby incorporated by reference.

BACKGROUND

Technical Field

The present technique relates to the field of data processing.

Technical Background

In a Side Channel Attack (SCA) an attack manipulates the state of a data processing apparatus in order to infer properties of the apparatus that would otherwise be hidden. For instance, timing information relating to restricted data might reveal whether that data is held in a cache of a data processing apparatus or the main memory (e.g. DRAM).

SUMMARY

At least some examples provide a data processing apparatus comprising: storage circuitry adapted to store an entry; input circuitry to receive at least one input to generate an access request to the entry, wherein the at least one input comprises a plurality of bits; and coding circuitry to perform an encoding operation to encode at least some of the plurality of bits based on a value associated with a current execution environment.

At least some examples provide a method of data processing, comprising: storing an entry; receiving at least one input to generate an access request to the entry, wherein the at least one input comprises a plurality of bits; and performing an encoding operation to encode at least some of the plurality of bits based on a value associated with a current execution environment.

At least some examples provide a data processing apparatus, comprising: means for storing an entry; means for receiving at least one input to generate an access request to the entry, wherein the at least one input comprises a plurality of bits; and means for performing an encoding operation to encode at least some of the plurality of bits based on a value associated with a current execution environment.

Further aspects, features and advantages of the present technique will be apparent from the following description of examples, which is to be read in conjunction with the accompanying drawings.

BRIEF DESCRIPTION OF THE DRAWINGS

FIGS. 4A-4C show examples of encoding part of the input based on a key associated with a current execution context;

FIGS. 16 and 17 show a corresponding example of using encryption to protect a multi-target indirect branch predictor from such attacks;

DESCRIPTION OF EXAMPLES

Figure 1:
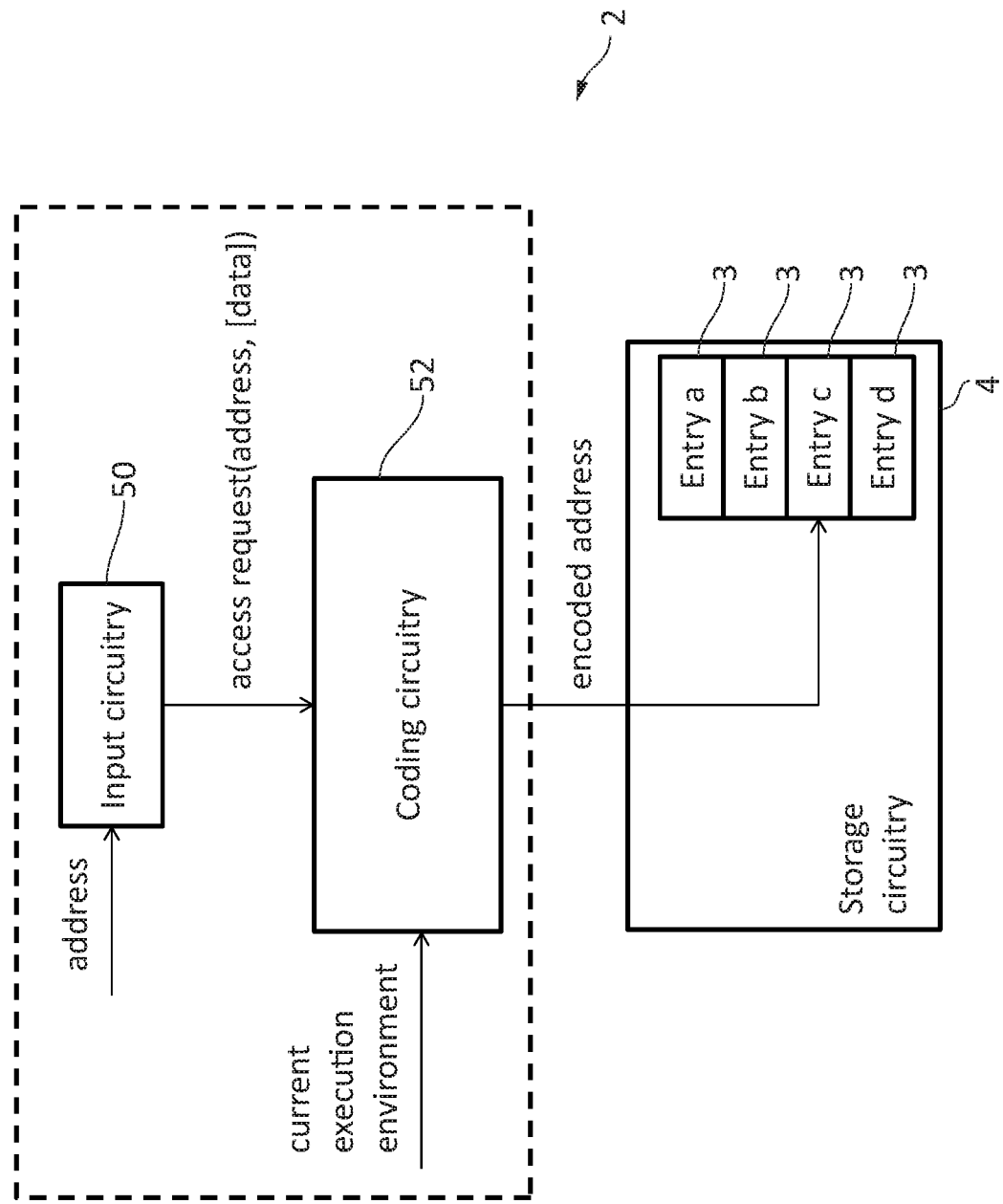
FIG. 1 schematically illustrates an example of a data processing apparatus in accordance with some embodiments.

Before discussing the embodiments with reference to the accompanying figures, the following description of embodiments is provided.

Processing circuitry may perform data processing in one of a plurality of execution environments. For example, each execution environment may correspond to a different software process executed by the processing circuitry, software at different privilege levels (for example an application and the operating system), a different portion of a given software process, a different virtual machine executed on the processing circuitry, etc. Storage circuitry may be provided to store an entry. Input circuitry may be provided to receive at least one input to generate an access request to the entry, wherein the at least one input comprises a plurality of bits. For example, the input could specify a read request to a piece of data stored in the entry. To reduce the amount of storage required some embodiments may store data associated with the entry indirectly, e.g. in one or more other storage circuits.

The present technique provides coding circuitry to perform an encoding operation to encode at least some of the plurality of bits of the input received by the input circuitry, based on a value associated with a current execution environment. The current execution environment could comprise a stream of instructions currently being executed. The encoded version of the input can then be used to access the entry—either by storing it or by retrieving it.

Counter-intuitively, it has been recognised that storage circuitry (particularly micro-architectural storage circuitry or storage circuitry storing soft state) could provide a route which an attacker could exploit to circumvent security protections provided on the processing circuitry which restrict one execution environment from accessing data associated with another execution environment. This is because it is possible that the storage circuitry may allow an entry to be accessed from a different execution environment to the execution environment that allocated the entry.

By providing coding circuitry to apply an encoding of at least some bits of the input to the storage circuitry, based on a value associated with the current execution environment, then even if two different execution environments supply the same input the access request will be different, as the encoding of at least some bits of the input is based on the execution environment-specific values, which makes it harder for one execution context to infer information about the address space of another execution context. This reduces the risk of attacks of the type discussed above. That such coding circuitry is beneficial is surprising, as such storage circuitry would not normally be considered to pose a security risk.

In some examples, the storage circuitry comprises branch prediction circuitry; and the entry comprises a branch prediction state entry in relation to a stream of instructions that execute in the current execution environment. Branch prediction circuitry can be used for predicting outcomes of branch instructions before they are actually executed. By predicting branch outcomes before the branch instruction is actually executed, subsequent instructions following the branch can start to be fetched and speculatively executed before execution of the branch instruction is complete, so that if the prediction is correct then performance is saved because the subsequent instructions can be executed sooner than if they were only fetched once the outcome of the branch was actually known. It is possible that storage circuitry may allow an entry to be accessed from a different execution environment to the execution environment that allocated the entry, so that branch prediction state allocated to the branch prediction circuitry by a first execution environment could be used to control behaviour of branches executed in a second execution environment. Previously, this would have been regarded as merely a performance issue, as if the second execution environment hits against the wrong entry allocated by a different context, a misprediction may be identified later during execution of the branch by the second execution environment, once the actual branch outcome of the branch is identified as not matching the prediction. However, it has been recognised that instructions incorrectly speculatively executed due to the mispredicted branch may still influence data in a cache or other non-architectural storage structure used by the data processing apparatus, which could be exploited by an attacker to attempt to gain some information on potentially sensitive data accessible to the second execution environment. The current execution environment refers to one or more states associated with the data processing apparatus or its underlying system. For instance, this could include any combination of processor ID, core ID, machine ID, execution privilege level, application ID, process ID, (virtual) machine ID, storage location ID, memory ID, memory bank ID, or arbitrary partitions of any of the preceding elements that are associated with instructions that execute on the data processing apparatus. Similarly, other elements that might make up the current execution environment could include any combination of system boot count, values stored in (system writeable) registers, as well as random or pseudo-random numbers. In some embodiments, execution environments can be considered to be encapsulated/isolated environments in which interference from other execution environments is to be inhibited.

In some embodiments, the storage circuitry comprises a cache. When the storage circuitry comprises a cache, this introduces a requirement that the data stored within the cache remains correct. A cache should store the correct data in association with a location (e.g. in memory location) at which that data is associated. If the incorrect data is stored, or if the correct data is stored in association with the wrong memory location, then the wrong data will be provided when it is requested, thereby causing a data operation to perform incorrectly. In contrast, a branch table predictor, for instance, may comprise any kind of data—even data that is invalid. Hitting on incorrect or invalid data in a branch predictor will cause a misprediction, which could impact performance but can be resolved when the branch is executed and the misprediction is detected In some embodiments, the storage circuitry comprises address translation circuitry; and the at least one entry comprises a translation from an input address in an input address space to an output address in an output address space. As an example, the address translation circuitry may comprise a Translation Lookaside Buffer (TLB). A TLB is used in order to provide a prompt translation between an input address (such as a virtual address) and an output address (an intermediate physical address or physical address).

In some embodiments, the data processing apparatus comprises: tag comparison circuitry to compare a tag associated with the entry to determine if the entry should be accessed in response to the access request, wherein the at least one input comprises an input tag; and the tag associated with the entry is compared to the input tag and accessed in response to a match. In general, when accessing a cache, the access request will comprise an input address (such as a virtual address) that comprises a tag, index, and offset. Typically, the index is used to identify a set of entries within the cache, the tag is used to identify which entry of the set contains the requested data, and the offset is an indicator of the desired piece of data within the cache line that is identified by the index and tag. However, as a consequence of encoding the input, it is possible that entries may exist in the cache using a previous encoding scheme (i.e. associated with a different version of the execution environment value). Such entries should not be used. Accordingly, the un-encoded tag and index are stored alongside the entry in the cache and are compared with the un-encoded tag and index of the access request when the access request is used to select a particular entry in the cache in order to make sure that the correct entry has been selected using the current encoding. It will be appreciated that when the access request takes the form of a write request, a cache line will be read and a part of that cache line will be modified. Consequently, a write request will effectively include a read request and therefore should utilise the indexing process just described.

In some embodiments, the storage circuitry comprises an instruction cache; the at least one entry comprises at least one instruction. The at least one instruction could, for instance, be a plurality of instructions.

In some embodiments, the storage circuitry comprises a data cache; and the at least one entry comprises a data value that is stored in memory circuitry at a memory location. When the cache is a data cache, the encoding process should take allowance of the fact that the data cache may be accessed by multiple different processing circuits. It is generally important for reasons of coherency that the same data does not appear in a data cache more than once. In many cases, this could lead to the same data having different values. It will therefore be appreciated that the encoding process should provide the same data when requested by multiple different processors. In particular, if each of the processors requests the same data, then the same data should be provided in spite of the encoding process. In some embodiments, the at least one entry comprises a set of values.

In some embodiments, the data processing apparatus comprises: further storage circuitry to store associations between the execution environments and memory locations, wherein each of the memory locations is associated with at most one of the execution environments. Memory locations (e.g. that uniquely identify entries in the data cache) may be associated with an execution environment. The further storage circuitry stores associations between the execution environments and the memory locations so that given a particular memory location, it is possible to determine the execution environment that is associated with that memory location. Since the execution environments form the basis of the encoding operation, then given a particular memory location it is possible to determine the associated executed environment and thereby appropriately encode some of the bits making up the access requests in order to access the entry. Here, the current execution environment corresponds with the execution environment that is associated with the memory location being accessed.

In some embodiments, the access request is a memory access request to a requested memory location in the memory locations; and the current execution environment is one of the execution environments associated with the requested memory location.

In some embodiments, the memory locations comprise pages in the memory circuitry that are set as being writeable. For the purposes of maintaining coherency, it may only be relevant as to whether a particular memory location (e.g. a page or a group of pages of memory) are writeable or not. When a page is writeable, it is possible for multiple versions of the data in that page to be simultaneously stored within a cache—thereby leading to potential coherency problems.

In some embodiments the further storage circuitry comprises address translation circuitry. The address translation circuitry could, for instance, take the form of a translation look aside buffer (TLB). A TLB provides a translation of input addresses (such as virtual addresses) to output addresses (such as physical addresses). Accordingly, the TLB can be used to indicate the execution environment that is associated with a particular page or group of pages in the memory circuitry.

In some embodiments, the data cache comprises a Virtually Indexed Physically Tagged (VIPT) cache comprising a plurality of sets and a plurality of ways; and the data value is storable within more than one of the plurality of sets within each of the plurality of ways. This typically occurs due to some bits of the index being different than if it had come from the Physical Address. As a consequence, there may be several different sets (e.g. aliases) that are referred to by the index. It will be appreciated that the present technique therefore has relevance to a VIPT cache since the set (e.g. alias) into which particular data is stored can be varied between execution environments. In such cases, since it may not be known which of the sets another execution environment would store a piece of data, a layer of security is added by each execution environment being uncertain as to where data belonging to another execution environment is located in the storage circuitry. Each execution environment can therefore use a different encoding to give a different one of the aliases.

In some embodiments, the data processing apparatus comprises: index circuitry to store an indication of the set in which the data value is stored in association with the at least one input and an execution environment. Where a VIPT cache is being used, index circuitry can be provided in order to provide an indication of the set of which a data value is stored in association with the at least one input. In this case, the at least one input could take the form of a physical address. Consequently, given the physical address, it is possible to determine the specific set in which the data value is stored for a particular execution environment. The index circuitry could take the form of a snoop filter, which is used to provide coherency between the sets of a VIPT cache. In a VIPT cache, when an access is made to an address, it is looked up in the cache using its virtual address. If this misses, then the line may still be in the cache under another alias (e.g. one of the other sets to which the virtual address could point). Therefore, on a miss, a line fill request will be generated to a lower level to the memory system, which can check a snoop filter or other structure tracking cache contents. If this indicates that the physical address already resides in the VIPT cache, then a snoop is sent in order to evict the line from the cache so that that line can be allocated under the new (requested) alias.

In some embodiments, the index circuitry is a snoop filter or a directory.

In some embodiments, the storage circuitry comprises a DRAM comprising memory locations; and the access request is a memory access request to a requested memory location in the memory locations. A particular memory location could, therefore, take the form of a page within the DRAM.

In some embodiments, the current execution environment is based on a processing circuit that provides the input to the input circuitry to generate the access request.

In some embodiments, the data processing apparatus comprises: a plurality of processing circuits, including the processing circuit; and further storage circuitry to store associations between execution environments and memory locations. A Rowhammer attack exploits the fact that certain bits within a DRAM are susceptible to being flipped. This is achieved by "hammering" adjacent bits to the target bit by continually pushing the desired value for the target bit into the adjacent bits. After doing this numerous times, charge will repeatedly leak from the neighbouring bits to the target bit to such an extent that the target bit is flipped. Of course, in order for such an attack to proceed, it is necessary to determine not only a bit that is susceptible to being flipped but also identify the neighbouring bits of that target bit. Accordingly, one way in which this attack can be prevented is to effectively randomise the location of particular data or otherwise obfuscate the location of data between different execution environments. This can be achieved by associating each execution environment with a processing circuit and also associating each execution environment with one or more memory locations. Further storage circuitry (such as a TLB or data cache) can be used in order to store the association between an execution environment and a memory location. Consequently, when that location is to be accessed, the corresponding execution environment is provided, thereby allowing a consistent encoding to take place. Multiple processes can thereby access the same location in memory if appropriate. The same physical address is used in such embodiment (e.g. between processors). In some embodiments, a higher level of granularity is used so that proximal addresses are physically proximal to each other. This can be achieved by partitioning the memory into chunks and effectively 'randomising' the mapping between physical addresses and the start of each chunk.

In some embodiments, the encoding operation comprises encoding the at least some of the bits by using a key, wherein the key is based on the current execution environment. The encoding operation may comprise rearranging the at least some bits using the key (e.g. applying a shift or other reordering of the bits). Also, the encoding operation could comprise toggling at least some of the bits of the input using the key. For example, the toggling could be implemented by applying a XOR (exclusive OR) operation to the at least some bits of the input and the key drive from a value associated with the current execution environment. A XOR operation can be efficient in terms of performance in hardware and can be reversed by reapplying the XOR using the same operands.

In some embodiments, the coding circuitry is adapted to encode the at least some of the plurality of bits by performing a hash function using the key. In some embodiments, the hash function is a one-way hash such that it is computationally intractable to reverse the encoding when starting from the result.

In some embodiments the encoding operation comprises rearranging or toggling the at least some of the plurality of bits using the key. Such embodiments may be computationally efficient and can therefore be performed with limited negative effects on the speed or efficiency of the system.

In some embodiments, the key is further based on any combination of one or more key input values indicative of at least one of: exception level, privilege level, ASID, VMID, NS, physical processor core number, and logical core number, one or more registers, a system reset counter, and a previously generated random number. The key input values could include exception level (distinguishing between different modes of operation, for example user mode, kernel mode, hypervisor mode); privilege level (distinguishing between different execution permissions); ASID (Address Space ID—distinguishing different application level execution contexts); VMID (Virtual Machine ID—distinguishing between different operating systems or virtual machine level execution contexts or applications with the same ASID running under the control of different operating systems or machines); NS (non-secure/secure state, indicating a current security state of the apparatus); physical processor core number (distinguishing between processors executing on different processor cores provided in hardware); logical core number (distinguishing between execution environments executed with different logical partitions of a shared processor core provided in hardware); one or more registers (so that a further input can be supplied as necessary in order to provide further variations in the key); a system reset counter (indicating a number of times that the system has reset or, in some embodiments, the least significant bits of number of times that the system has been reset); and a previously generated random number (in order to provide a random variant in the key—note that there is no necessity for this to be a truly random number and in some embodiments the previously generated random number may be a pseudo-random number).

In some embodiments, at least one of the one or more registers is a software writeable register. By virtue of providing at least one software writeable register, it is possible for the software itself to participate in the selection of the key. In some cases, this allows an individual process to control further divisions of execution environments. For instance, it is possible for software to take a note of a current value of the software-writeable register, to change this to a new value in order to execute a sensitive piece of code, and then to change the value of the software-writeable register back to the previous value. In this way, the sensitive code is treated as being an isolated execution environment and therefore surrounding code is less able to determine a location at which data associated with that execution environment is stored. In some other embodiments, different values of the software-writeable register can be used for simultaneously operating contexts. For example, in the case of a web browser, each tab could be associated with a different execution environment by providing a different value for the software writeable register therefore isolating each tab from each other tab.

In some embodiments, the previously generated random number comprises at least one of: a per-logical-processor element; a per-physical-processor element; and a system-wide element. By providing a random variation in the key that is generated, it is made harder for an attacker who is able to identify the key (or the functions used to derive the key) used by one device to apply that knowledge to other devices which may use a different random number. At least part of the previous generated random number may be generated at start up so that it varies each time the data processing apparatus starts up to provide further assistance to protecting the key associated with the given execution environment. For example, a hardware random number generator or pseudo-randompseudo-random number may be triggered to generate a new random number each time the apparatus is booted.

In some embodiments, the key is based on a one-way transformation applied to said one or more key input values. By applying a time-intensive operation (such as a one-way hash) to only some of the one-or-more key input values, some of the benefits of one-way (e.g. secure) hashing can be gained without needing to continuously expend processing resources in performing the hash. It would be appreciated that it is in the nature of a one-way transformation to completely change the output value as a consequence of even a minor change to the input value. Consequently, by using a one-way transformation even periodically, it is possible to provide a significant change to the overall key that is produced.

In some embodiments, the access request is made in respect of a memory location; and the key is based on the memory location.

In some embodiments, the data processing apparatus comprises: event listening circuitry to change one of the one or more registers in response to an event. Such an event could represent a situation which there is a danger of the key or one of the key input values having being determined. Accordingly, by changing one of the one or more registers in response to such an event, the risk of the key value being deduced inappropriately is reduced.

There are a number of different examples of such events that could cause the key value to be updated. However, in some embodiments, the event is the elapse of a period of time. By periodically changing the value stored in one of the one or more registers that are used to provide key input values, any successful attack that enables the key to be deduced will only last for a period of time after which the key is changed and the encoding used is varied, thereby causing the locations of data to be moved once again.

The present technique may also have relevance to one or more related examples, described below.

In some related examples, the encoding operation may comprise encoding at least some of the plurality of bits of the input value based on a value indicative of a current execution permission with which the stream of instructions is being executed. This enables execution environments associated with different execution permissions to encode the input in different ways, making it harder for an attacker to be able to successfully control a victim execution environment with a different execution permission to branch to a desired target address in an attempt to expose data not accessible to the attacker but accessible to the victim execution environment, as it may be hard for the attacker to guess what value of the input when encoded using the value associated with the attacker's execution environment would match against a target input that has been encoded using a different value associated with another execution environment to be attacked.

The encoding operation applied by the coding circuitry may comprise any operation which varies the bit values of the at least some bits of the input based on the value associated with the current execution environment. Note that a mere concatenation of a value associated with a current execution environment and the input received by the input circuitry would not be considered an encoding of at least some bits of the input, as all the bits of the input would in that case still retain their original values. Hence, in general the encoding changes the values of at least one bit using a transformation defined by the value associated with the current execution environment.

In some related examples, the encoding operation comprises encoding the at least some bits using a key, where the key is based on the current execution environment in which the stream of instructions is being executed. In some related embodiments, the encoding operation comprises rearranging the at least some bits using the key (e.g. applying a shift or other reordering of the bits). In some related embodiments, the encoding operation comprises toggling at least some of the bits of the input using the key. For example, the toggling could be implemented by applying an XOR (exclusive OR) operation to the at least some bits of the input and the key derived from a value associated with the current execution environment. An XOR operation can be efficient in terms of performance and hardware. Alternatively, the encoding operation may comprise a hash function applied to the at least some bits of the input based on the key. The encoding operation could be reversible (e.g. applying a second XOR operation to the result of a previous XOR operation using the same key may restore the original input), or could be a one-way hash function.

The input to the branch prediction circuitry could comprise a number of pieces of information. The encoding could be applied to different parts of the input. It is not necessary to encode the entire input.

For example, in some related examples, the at least one input comprises an indication of an instruction address of a branch instruction, which may be used to form a new branch prediction state entry providing the prediction for that branch instruction. When querying the branch prediction circuitry, the branch prediction circuitry receives a query value comprising an indication of an instruction address of an instruction for which a branch prediction is to be made and perform a search using the query value. The search may for example identify whether the branch prediction circuitry stores any branch prediction state entry that is relevant to one or more instructions corresponding to the instruction address specified by the query value. For example, each entry may include some tag information or other state data that enables the search to identify whether a query supplied to the branch prediction circuitry matches against that entry. If the query misses, and it is subsequently determined that the instruction address indicated by the query corresponds to a branch instruction, a new branch prediction state entry can be allocated to the branch prediction circuitry, specifying tag information or other state corresponding to the query which caused the miss and specifying the actual branch information determined for the branch instruction.

In some related examples, the coding circuitry performs the encoding operation on at least some of a plurality of bits of the query value using the key derived from one or more values associated with the current execution environment, prior to performing the search. Hence, different execution environments encode the same query in different ways based on their environment-specific keys, to change the mapping between the input query and the entries of the branch prediction circuitry returned as matching, to make it more complex for an attacker to predict what value of the input should be supplied as a query for training the branch predictor in order to trick branches associated with some other query value in a different execution environment to use prediction state allocated by the attacker's execution environment. An advantage of applying the coding to the query value (rather than to the predicted branch state, such as the destination address predicted for a branch), is that applying the encoding operation to the query input to the branch prediction circuitry can be enough to frustrate the attacker, so it is not essential to apply any decoding when reading branch state information from the branch predictor, as the predicted branch information could still be stored in the branch prediction circuitry in the clear. This can improve performance by avoiding an additional timing path through decoding circuitry at the output of the branch predictor.

In some related examples, the at least one input whose bits are encoded by the coding circuitry to form the new branch prediction state entry may comprise an indication of a destination address (also known as a "branch target address" or a "branch target offset") of a branch instruction. In this case, the apparatus may also comprise reverse encoding circuitry (or decoding circuitry) to perform a reverse encoding operation on an output of the branch prediction circuitry which is output in response to the search of the branch prediction circuitry triggered based on a query value indicating the instruction address. The reverse encoding operation may be any operation which reverses the effect of the encoding operation applied by the coding circuitry, to restore the original values of the bits whose values were transformed by the encoding operation. In this case, rather than changing the mapping between the query value and which entry of the branch prediction circuitry accessed, the predicted branch state is encoded in an environment-specific manner based on the key associated with the current execution environment, so that even if a second execution environment hits against a branch prediction state entry trained by a first execution environment, the resulting branch prediction may be different to the prediction made if the same entry was accessed from the first execution environment. This makes it harder for an attacker to successfully control the location to which a different execution environment branches by maliciously training the branch predictor. This can improve performance by reducing the chance of hitting against the wrong branch predictor state entry.

In some related examples, the reverse encoding circuitry recalculates the value of the key associated with the current execution environment and perform the reverse encoding operation using the recalculated value of the key. Hence, if the current execution environment changes between the time when the branch prediction state entry is allocated and the time the branch prediction state entry is accessed to make a prediction, as the key derived from values associated with the current execution environment is recalculated, the reverse encoding operation may yield different information to the information supplied as predicted branch state on allocation of that entry.

In some related examples, the encoding operation is applied to both the instruction address and the destination address of a branch, so as to combine the two approaches discussed above.

In some related examples, the key associated with the current execution environment may be based on a combination of one or more identifiers associated with the current execution environment. For example, the key may be based on any combination of one or more of the following:
  exception level (distinguishing between different modes of operation, for example user mode, kernel mode, hypervisor mode);
  privilege level (distinguishing between different execution permissions);
  ASID (address space ID—distinguishing different application-level execution contexts);
  VMID (virtual machine ID—distinguishing different operating-system or virtual-machine level execution contexts or applications with the same ASID running under control of different operating systems or virtual machines);
  NS (non-secure/secure state, indicating a current security state of the apparatus);
  physical processor core number (distinguishing processes executing on different processor cores provided in hardware);
  logical core number (distinguishing execution environments executed with different logical partitions of a shared processor core provided in hardware); and
  one or more software writeable registers (so that the software can supply a further input used to derive the key to provide further variation in the key, e.g. this can make it harder for a process which knows context identifiers such as ASID or VMID of a process executing under it to predict the value of the key used by that process).

In some related examples, the key may further be generated based on a previously generated random number. This can provide further variation in the key generated for a given combination of identifiers associated with the current execution environment, making it harder for an attacker who is able to identify the key (or the functions used to derive the key) used by one device to apply that knowledge to other devices which may use a different random number. The random number may comprise at least one of: a per-logical-processor element; a per-physical-processor element; and a system-wide element. At least part of the previously generated random number may be generated at start up, so that it varies each time the data processing apparatus starts up to provide further resistance to breaking of the key associated with a given execution environment. For example, a hardware random number generator or pseudorandom number generator may be triggered to generate a new random number each time the apparatus is booted. At least part of the previously generated random number may be pseudo-random—true randomness may not be required.

In some related examples, the stream of instructions may be executed in one of a plurality of execution environments adapted to execute at a lowest execution permission (the execution permission level having the least privilege). For example, the execution environments at the lowest execution permission may comprise applications or sub-portions of applications. In some examples, the coding circuitry may perform the encoding operation further based on an identifier of the one of the plurality of execution environments at the lowest execution permission in which the stream of instructions is being executed. This can allow different portions of application-level software, which might share the same address translation regime and so may be expected to share a mapping of branch predictor inputs onto entries of the branch predictor, to use different encodings of the branch predictor input, to reduce the risk of one application or portion of an application creating an attack of the form discussed above against another application or another portion of an application sharing the same address translation regime.

In some related examples, monitoring circuitry may be provided to detect a rate of instruction fetch or decode faults while the stream of instructions is being executed in a speculative state, and to raise an exception or create an error response in response to the detected rate of instruction fetch and/or decode faults meeting a predetermined criterion, such as increasing beyond a predetermined threshold. For example, the threshold may be at least 20% higher than the immediately preceding rate. Alternatively the threshold may be 20% above the average rate for other applications. This can provide a technique for detecting attacks of the form discussed above. If the number of instruction fetch faults increases, one possible explanation could be that an attacker is attempting to train the branch predictor to trick other code into executing instructions from an inappropriate branch address, which is subsequently detected as a misprediction. By triggering an exception or error response when the rate of speculative instruction fetch or decode faults increases, a warning of a potential attack can be given. How software chooses to respond to such a warning may depend on the particular software being executed, but the provision of the monitoring circuitry to trigger the interrupt/error response when an unusually high increase in instruction fetch faults is detected can provide a hardware framework for enabling the software to respond in a manner appropriate to that software.

In some related examples, the branch prediction circuitry may comprise a branch target prediction structure comprising a plurality of branch target entries, each branch target entry specifying at least a branch target address. The coding circuitry may comprise encryption circuitry to encrypt at least part of a new branch target entry to be written to the branch target prediction structure, using an encryption key associated with the current execution environment.

In some related examples, each branch target entry specifies tag information. The apparatus may have branch target prediction circuitry which performs a branch target prediction lookup for an instruction fetch address associated with a current execution environment. The branch target prediction lookup may comprise determining whether any of a subset of branch target entries specify tag information which corresponds to a target tag determined for the instruction fetch address. The subset of branch target entries which is looked up in the branch target prediction lookup could comprise all of the branch target entries of the branch target prediction structure in the case of a fully-associative cache implementation, or could comprise only some of the branch target entries (a proper subset of the branch target entries) in a set-associative implementation. In a set-associative implementation the subset of branch target entries to be looked up could be selected, for example, based on a portion of the address of the given branch instruction.

In some relates examples, the target tag may be determined in some way based on some property of the instruction fetch address, the current execution environment in which the fetch address arises, or some past history of recent operation of the processing circuitry which indicates some property of the current point of execution represented by the instruction fetch address. The particular tag used may vary depending upon the type of branch target prediction structure implemented. For example, the target tag could be derived from the instruction fetch address, or from one or more identifiers associated with the current execution environment, or could be based on a past history of branch outcomes which led up to the instruction(s) identified by the instruction fetch address.

In some related examples, values of the target tag may be re-useable in more than one execution environment. Hence the target tag may not be unique to a particular execution environment. This could be, for example, because the particular branch target prediction structure uses a tag which is completely independent of identifiers associated with the current execution environment, or because while the tag includes at least a portion derived from a value associated with the current execution environment, to save circuit area in the tag information storage of the branch target prediction structure, the tag information and target tag may be based on a compressed version of one or more execution environment identifiers identifying the current execution environment, so that the value of the compressed identifier can be reusable from one execution environment to another.

Hence, it cannot be guaranteed that a target tag used in one execution environment will not match against tag information allocated to an entry of the branch target prediction structure following execution of a branch instruction associated with a different execution context. This can lead to false positive hits in the branch target prediction structure, so that an incorrect branch target address may sometimes be returned and hence a branch misprediction may cause the wrong instructions to be executed following the branch. While such false positive hits may cause a reduction in processing performance, branch misprediction resolution circuitry may already be provided to handle mispredictions by triggering the processor to flush pipelined instructions following the mispredicted branch and resume instruction fetching from the correct processing path once the branch outcome has been resolved. Hence, false positive hits caused by reuse of tag values across multiple execution environments would not typically have been considered a major problem, as they could be resolved in a similar way to other causes of branch misprediction, and while this affects performance, it would not typically be considered a risk to data security.

However, it is recognised that in fact such false positive hits in the branch target prediction circuitry may pose a vulnerability to the security of data being processed by the data processing apparatus. The apparatus may restrict access to some data to certain execution environment, for example using a privilege-based data access protection scheme. It has been recognised that false positive hits in the branch target prediction circuitry may allow such security mechanisms to be circumvented so that a first execution environment controlled by an attacker is able to gain information about sensitive information which is accessible to a second execution environment and is inaccessible to the first execution environment. This is surprising as a branch prediction mechanism would normally be regarded as a performance-enhancing mechanism whose mispredictions are not critical to the security of data processed by the system but merely affect the level of performance achieved.

A reason for the potential security vulnerability is that, if an attacker controlling a first execution context can exploit the re-use of target tag values between execution environments to trigger a second execution environment to hit against an entry allocated by the first execution environment which indicates a certain known address (referred to as the "falsely hit target address" below) as its branch target address, this can allow the attacker to control the second execution environment to branch to certain malicious code located at the falsely hit target address. While eventually, the branch prediction may be determined to be incorrect as the actual target address of the branch executed by the second execution environment may not match the falsely hit target address, and then any architectural state associated with the incorrectly executed instructions may be rewound to previous correct state values to reverse architectural effects of the incorrectly executed instructions, in the meantime the incorrectly executed instructions may also have made changes to non-architectural processor state, such as data in a cache or translation lookaside buffer (TLB), which may persist after the misprediction has been resolved. The attacker may have designed the malicious code at the falsely hit target address to ensure that the particular addresses whose data is cached as a result of the incorrectly executed instructions are dependent on the sensitive information that the attacker wishes to gain access to. Hence, the attacker could then execute instructions in the first execution environment designed to probe what data has been cached, and use performance indicators such as cache miss counts or memory access latency measurements to probe what information was cached by the second execution environment during the period when the mispredicted instructions were being executed. This could then allow the attacker to gain information about potentially sensitive data processed by the second execution environment, to circumvent the security mechanisms of the system.

Hence, at least part of a new branch target entry to be written to the branch target prediction structure can be encrypted using an encryption key associated with the corresponding execution environment which allocated that branch information. Either the tag information of the new branch target entry, or the branch data (specifying at least the predicted branch target address) of the new branch target entry, or both, can be encrypted. If the tag information is at least partially encrypted using the encryption key on allocating a new branch target entry, then during the branch target prediction lookup, either the encryption circuitry may encrypt the target tag determined for the instruction fetch address using the (recalculated) encryption key associated with the current execution environment and the branch target prediction circuitry may compare the encrypted target tag with the tag information of the subset of branch target entries to identify whether any of the subset of branch target entries specifies tag information corresponding to the target tag, or the encrypted tag information stored in the looked up entries could be decrypted and compared with the (unencrypted) target tag. If the branch data is encrypted on allocating a new entry to the branch prediction structure, the apparatus may also have decryption circuitry to decrypt the encrypted part of the branch data of one of the subset of branch target entries identified in the branch target prediction lookup as specifying tag information corresponding to the target tag.

In some related examples, in the branch target prediction lookup, when none of the looked up subset of branch target entries specifies tag information corresponding to the target tag and the instruction fetch address specifies a block of one or more instructions including a branch instruction, the encryption circuitry may encrypt actual branch information determined for the branch instruction using an encryption key associated with the current execution environment, and the branch target prediction circuitry may allocate a branch target entry to the branch target prediction structure specifying the encrypted branch information and the tag information corresponding to the target tag. On the other hand, on a lookup hit when one of the subset of branch target entries does specify tag information corresponding to the target tag, the branch information stored in that entry can be decrypted using the encryption key associated with the current execution environment, and then the decrypted branch information can be output as the predicted branch information for the given branch instruction.

Hence, in these examples, as branch information in the branch target prediction structure is protected by an encryption key associated with the corresponding execution environment associated with that branch information, then if one execution environment allocates the branch information it will be encrypted using a key associated with that environment, and then if there happens to be a false positive hit when another execution environment reuses the same tag information of that entry, the branch information would be decrypted using a key associated with the other execution environment, so would not indicate the same branch target address as the one originally provided by the execution environment which allocated the entry. As normally one would think of a branch predictor as a purely performance-enhancing measure which does not affect data security or integrity, it is surprising encryption would be useful in a branch predictor, but by encrypting the branch information using an execution environment-specific key this makes attacks of the type discussed above much harder as it is more difficult for the attacker to control the location to which another execution environment branches when they do not know the keys associated with each execution environment.

In some related examples, the encryption circuitry and the decryption circuitry may comprise separate circuits. For example, in some cases the operation applied to decrypt the encrypted branch information may not be the same as the operation applied to encrypt the branch information, and so separate encryption and decryption methods may be applied. Alternatively, the encryption and decryption operations could in fact be the same operation. For example, the encryption operation could comprise applying a reversible operation (e.g. XOR) to the branch information and the encryption key, and the decryption operation could comprise applying the same reversible operation (e.g. XOR) to the encrypted branch information and the encryption key. Hence, in some examples the encryption circuitry and the decryption circuitry may both correspond to the same circuitry provided in hardware (it would not be necessary to provide two separate circuit units). Alternatively, even if the encryption and decryption operations are the same, it may still be useful to provide separate encryption and decryption circuitry to allow decryption of branch information for one entry of the branch target prediction structure to be performed in parallel with encryption of branch information for another entry.

In some related examples the encryption key could comprise a static key fixed for the current execution environment. Hence, each execution environment could be associated with a certain fixed key which never changes. This may be enough to provide sufficient security as it may still be hard for an attacker to predict the outcome of decrypting a value encrypted using one encryption key with a decryption key different to the key used in the encryption, where one or more of the keys is unknown. Although a number of environment-specific keys could be stored in a storage structure for each execution environment, this may require a significant amount of storage as the number of execution environments may be large. A simpler approach for determining the static key for the current execution environment may be to derive the static key from a common key which is shared between multiple execution environments and at least one environment identifier which is specific to the current execution environment. For example, the common key could be a previously generated random number as discussed above. For example the common key could be hashed or modified based on the current execution environment's identifier(s), such as ASID, VMID, etc. mentioned above.

In some related examples the encryption key may comprise a dynamic key which is variable for the current execution environment. Hence as well as varying from environment to environment, the encryption key can also be changed from time to time for a specific environment. This can provide greater security as it reduces the chance of an attacker being able to derive the key for a given environment by observing the behaviour of the data processing system over a period of time. Hence, the apparatus may comprise key generating circuitry for generating an updated encryption key for the current execution environment. For example the key generating circuitry could comprise a random or pseudo-random number generator such as linear feedback shift register, to generate a new random or pseudo-random value for the encryption key for a given execution environment when required. The timing at which the keys are updated could be arbitrary, or could be in response to certain predetermined events, or could be on expiry of a certain time period or number of branch prediction events.

In some related examples the tag information in each branch target entry may be stored in the clear so that no encryption or decryption is applied to the tag information. This can simplify tag comparisons. Encrypting the branch information may be enough to reduce the probability of attacks as discussed above.

Alternatively in some related examples the tag information could be encrypted, in addition to (or instead of) encrypting the branch information which is indicative of the branch target address. Hence, on a miss in the branch target prediction lookup when the instruction fetch address is identified as referring to a block of instructions including a branch, then the target tag can be encrypted using the encryption key associated with the current execution environment and the encrypted target tag may be specified as the tag information for the allocated branch target entry. In the branch target prediction lookup the decryption circuitry may decrypt the tag information of each of the subset of branch target entries and the branch target prediction circuitry may compare the decrypted tag information with the target tag. Alternatively, the encrypted target tag from the branch target lookup could be compared direct with the encrypted tag information stored in the branch target prediction structure to identify whether the tags match, avoiding the need for decryption.

In some related examples the tag and the branch information could be encrypted or decrypted separately, with one encryption applied to the tag and another encryption applied to the branch, and in this case either of the approaches to handling the tag encryption (comparison in encrypted or decrypted form as desired) could be used. However, in other examples the tag information and branch information may be encrypted together in a single encryption scheme. This can provide additional security as it may be harder to break the encryption applied to the branch information if the encrypted value depends not only on the branch information and the environment-specific encryption key but also on the tag information provided alongside the branch (the tag information may provide additional entropy for the encryption of the branch information). However, this may be slower as in this case, the decryption circuitry may need to decrypt the entire block of tag and branch information of each looked up entry before the decrypted tag can be compared with the target tag to see whether there is a matching entry, and if so the decrypted branch information can be output.

Hence, in summary the approach taken for encryption/decryption, and the extent to which the branch information and tag are encrypted, may depend on the desired trade-off between performance and security.

In general, any information indicative of the branch target address may be used as the branch information. In some related examples, the branch information (when seen in the clear before encryption or after decryption) may explicitly indicate the branch target address. The branch target address could be indicated as an absolute address, or as a relative address using an offset relative to the current instruction fetch address for which the branch target prediction lookup is being performed. In some related examples, the branch target address may not be directly identified by the branch information, but the branch information could provide a pointer to some other structure which identifies the branch target address or can be used to calculate the branch target address. Hence, in general the branch information may comprise any information which allows the predicted branch target address to be determined.

In some related examples, the branch information may not specify any other information, other than the branch target address. However, in some related examples the branch information may also be indicative of at least one other piece of branch information, which represents some predicted property of a branch instruction in the block of one or more instructions identified by the instruction fetch address. For example the additional information could specify whether the branch is a conditional branch instruction, whether the branch target address should be predicted using some other branch target predictor separate from the branch target prediction structure (e.g. a branch target predictor for predicting targets of polymorphic branches whose target address varies depending on past processing outcomes preceding the branch), or whether the branch represents a function call or function return. Such additional branch information could be encrypted/decrypted along with the information identifying the branch target address.

Although the target tag could depend on a range of properties of the instruction fetch address, in some related examples the branch target prediction circuitry may determine the target tag depending on at least one environment identifier associated with the current execution environment. This can help to avoid false positive hits between predictions made for the same address arising in different environments. For example the environment identifier could comprise a virtual machine identifier identifying a virtual machine associated with the address, and/or a process identifier identifying a process associated with the address.

One might expect that if the target tag depends on at least one execution environment identifier associated with the current execution environment then there should be no re-use of target tag values between execution environments. However, in practice there may be a large number of different environments which could be executed by the data processing apparatus, but at any one time the number of different environments which have information stored in the branch target prediction structure may be much lower. Hence, representing the full environment identifiers in the tag information of each entry may require a large number of bits, and in practice a lot of this information may be redundant since for the purposes of the branch target prediction lookup, it is only needed to distinguish the current execution environment from other execution environments which currently have branch information cached in the branch target prediction structure, and it is not necessary to distinguish the current execution environment from other environments which do not have branch information represented in the branch target prediction structure. Hence, storing the full environment identifier may unnecessarily increase the size of each region entry and the number of comparators required to compare the respective bits of the tag information against the target tag, increasing circuit area.

Hence, to reduce circuit area and power consumption, some related examples may provide a region table which has a number of region entries, each region entry mapping branch context information to a region identifier comprising fewer bits than the branch context information. The branch context information may comprise at least one identifier associated with a corresponding execution environment. When performing the branch target prediction lookup, the target tag may be determined based on the target region identifier which is mapped by the region table to the branch context information (including the at least one identifier) that is associated with the current instruction fetch address. The tag information for each branch target entry may specify the region identifier in place of the identifier(s) of the execution environment. Hence, the region table effectively allows a larger set of execution environment identifiers, and any other information used to identify the branch context information, to be compressed into a shorter identifier which is used as the tag in the branch target prediction structure to save area.

In related examples which use such a region table, the number of region entries may be finite and so when a new execution environment is encountered which does not already have a corresponding region entry allocated in the region table, a region entry previously allocated to a different execution environment may need to be reused for the current execution context. When a region entry is reused, the corresponding region identifier may still be used as a tag for certain entries in the branch target prediction structure. While these stale branch target entries could be invalidated from the branch target prediction structure to prevent false positive hits, performing such an invalidation may be expensive in terms of performance and complexity as it may require special circuitry to walk through the branch target prediction structure to evict information for the selected region identifier being reused. In practice this performance cost may not be justified as in any case one would expect stale entries to be evicted if there is a branch misprediction based on that entry. Therefore, related examples which use a region table tend not to invalidate branch target entries on a region table update, and so are prone to false positive hits in the branch target prediction structure. Hence, the encryption/decryption of branch information as discussed above can be particularly useful for branch target predictors which use a region table, to improve security.

Although the encryption keys associated with each execution environment could be stored in a separate storage structure, when a region table is provided it can be efficient for each region entry to specify the encryption key associated with the corresponding execution environment. Hence in some related examples, the encryption key can be read from the region table at the same time as looking up the target region identifier, to save the need for a separate lookup of a separate storage structure. This approach also means that it is not necessary to store encryption keys for all execution environments. Instead, keys could be maintained only for the particular execution environments which currently are mapped to region identifiers by the region table. For other execution environments there is no need to maintain any encryption key as they are not currently involved with the branch target prediction structure. Hence this approach can also reduce the number of keys which need to be stored.

The encryption key associated with a given execution environment may, in some related examples, be updated at the time when the mapping provided by a given region entry of the region table is also updated. That is, when a region entry of the region table has to be allocated to a different execution environment then the encryption key specified for that region entry may also be updated, to generate a new key for the execution environment that is associated with that region entry following the mapping update. This prevents an old key associated with one environment remaining the same for a new environment and hence ensures that each environment uses a different key.

In some related examples, the branch context information mapped to region identifiers by the region table could comprise one or more execution environment identifiers identifying the current execution environment, but may not include any other information.

However, in other related examples the branch context information could also depend on other information. For example the branch context information may also comprise a portion of the instruction fetch address for which a previous branch target prediction lookup caused the given region entry to be allocated to the region table. Hence, a portion of the instruction fetch address is used to look up the region table and identify the corresponding region identifier, which avoids the need to store that portion of the instruction fetch address as tag information in each branch target entry of the branch target prediction structure. Often the most significant portion of the instruction fetch address may be the same for a large number of fetch addresses used by a given execution environment, and the number of different values for that most significant portion used across all instruction fetch addresses used within a given time frame in a particular execution environment may be relatively low. Hence, by representing this portion of the instruction fetch address in the region table and compressing it along with the execution environment identifiers into a shorter region identifier, this can reduce the amount of tag storage needed for each branch target entry and the amount of comparison logic for comparing the target tag with the stored tag information.

Other forms of branch target prediction structure may use tags which are independent of the execution environment identifier associated with a given execution environment. For example, one type of branch target prediction structure may be used, in some related examples, to predict the target addresses of certain branch instructions which vary in their behaviour depending on previous branches executed. For example the branch target address of a given branch instruction may be calculated as one of a range of different possible branch target addresses, for example depending on the outcome of earlier conditional instructions, and for which those conditional instructions may themselves depend on a past history of branch outcomes. For such branch target prediction structures, the tag may depend on the instruction fetch address and a history of branch outcomes of previous branch instructions preceding the instruction at the instruction fetch address, but could be independent of the environment identifier(s) of the current execution environment. Hence, with this type of tag, it is possible that values of the tag could be reusable in more than one execution environment since a given instruction address and history of branch outcomes could be generated in different environments. Again this may provide an avenue for an attacker to populate the branch target prediction structure with branch information for a given branch history expected to be used in some victim environment to be attacked, in an attempt to force the victim environment to branch to some instruction address controlled by the attacker environment due to the false positive hit between different environments. By using the encryption (and if needed decryption) of the branch information and/or tag information in the branch target prediction structure as discussed above, such attacks can be made more difficult because it is unlikely that decrypting the encrypted branch information using the wrong environment's encryption key would lead to a known address which can be controlled by the attacker.

Particular embodiments will now be described with reference to the figures.

FIG. 1 schematically illustrates an example of a data processing apparatus 2. In this embodiment, a signal or input is transmitted to the input circuitry 50 for a particular entry 3 in storage circuitry 4 to be accessed. The access could take the form of a read or a write for instance. On receiving the input, the input circuitry 50 generates an access request, which is transmitted to the storage circuitry 4 via coding circuitry 52. The access request comprises a reference to the entry 3 in the form of an address in the storage circuitry 4. The access request may include data if, for instance, data is to be stored at that particular address as part of the access. The coding circuitry 52 intermediates the storage circuitry 4 and the input circuitry 50 and encodes the address. In particular, if the address received by the input circuitry comprises a number of bits, then some or all of those bits will be encoded by the coding circuitry 52. The encoding is based on a current execution environment, e.g. that the data processing apparatus 2 is operating under. The modified access request is then transmitted to the storage circuitry 4.

The encoding performed by the coding circuitry 52 is such that the actual entry 3 accessed at the storage circuitry is difficult to determine. However, since it is based on the current execution environment, the entry 3 that is accessed should be consistent provided that the address provided to the input circuitry 50 remains the same. Consequently, as far as the execution environment itself is concerned, the data remains accessible. However, other execution environments, that achieve a different encoding by the coding circuitry 52 will find it difficult to determine the exact entry 3 in which the data is stored. The reverse is also true, given a particular entry, it will be difficult for a current execution environment to determine the corresponding input address for a different execution environment.

Security is thereby obtained by obfuscating the location in which data belonging to another execution environment is stored and thereby making it difficult for one execution environment to access data belonging to another execution environment. The present technique has relevance to numerous different pieces of hardware, as will be discussed below.

Figure 26:
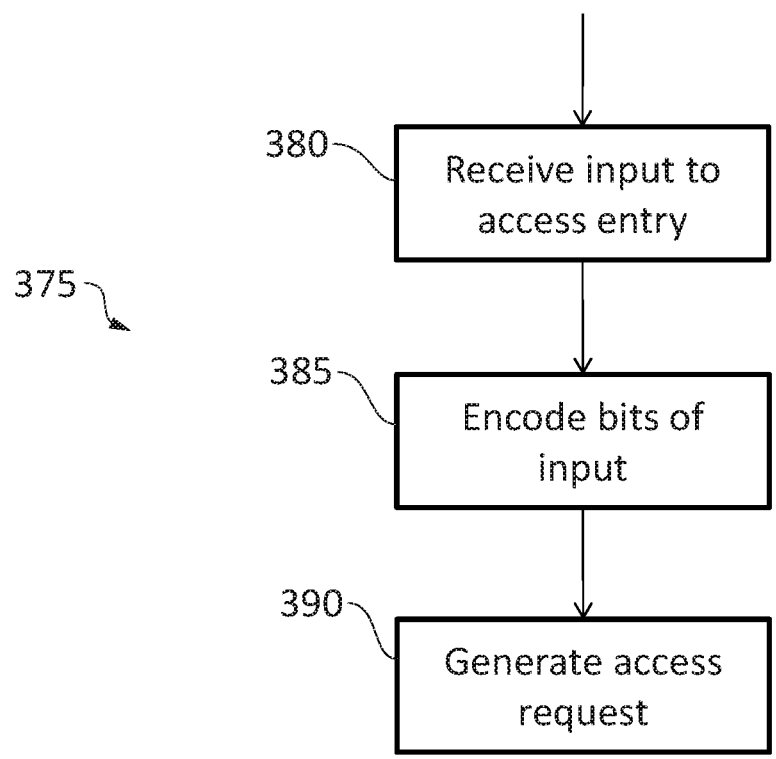
FIG. 26 schematically illustrates an example of data processing in accordance with some embodiments.

FIG. 26 shows a flow diagram 375 that illustrates a method according to some embodiments. At a step 380, an input is received to access an entry that is stored in storage circuitry. At a step 385, some of the bits of that input (such as the bits making up an access address of the entry that is to be accessed) are encoded. This encoding is based on a current execution environment. At a step 390, an access request is then generated based on the encoded bits. As a consequence of this, the access request itself becomes obfuscated to other execution environments that are not aware as to exactly how the coding has been performed.

Branch Target Buffer

Figure 2:
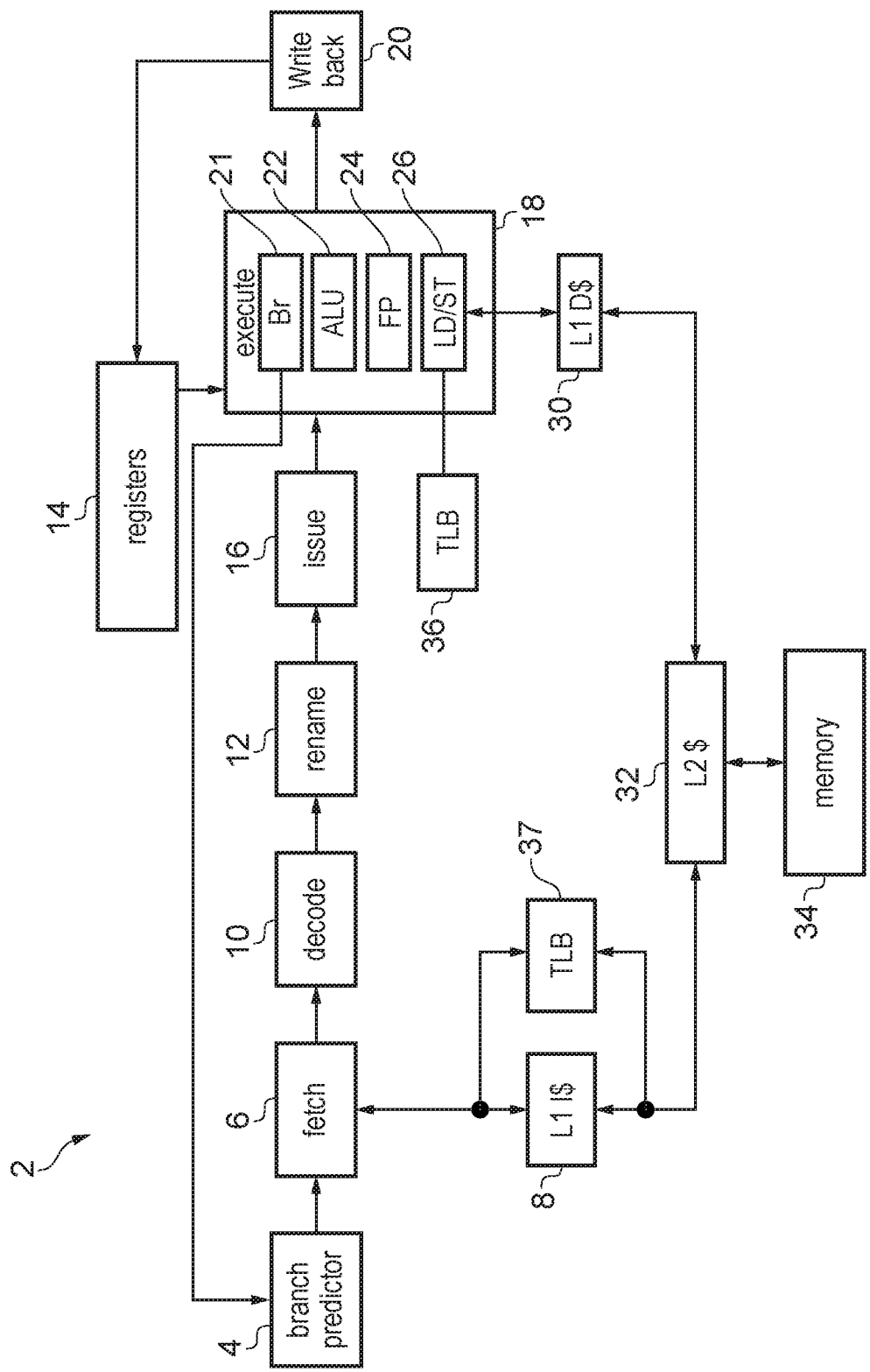
FIG. 2 schematically illustrates an example of a data processing apparatus having a branch predictor.

FIG. 2 schematically illustrates an example of a data processing apparatus 2 having a processing pipeline comprising a number of pipeline stages. The pipeline includes a branch predictor 4 (an example of the claimed storage circuitry) for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 2 is just one example and other examples may have different sets of pipeline stages or execution units. For example, an in-order processor may not have a rename stage 12.

Figure 3:
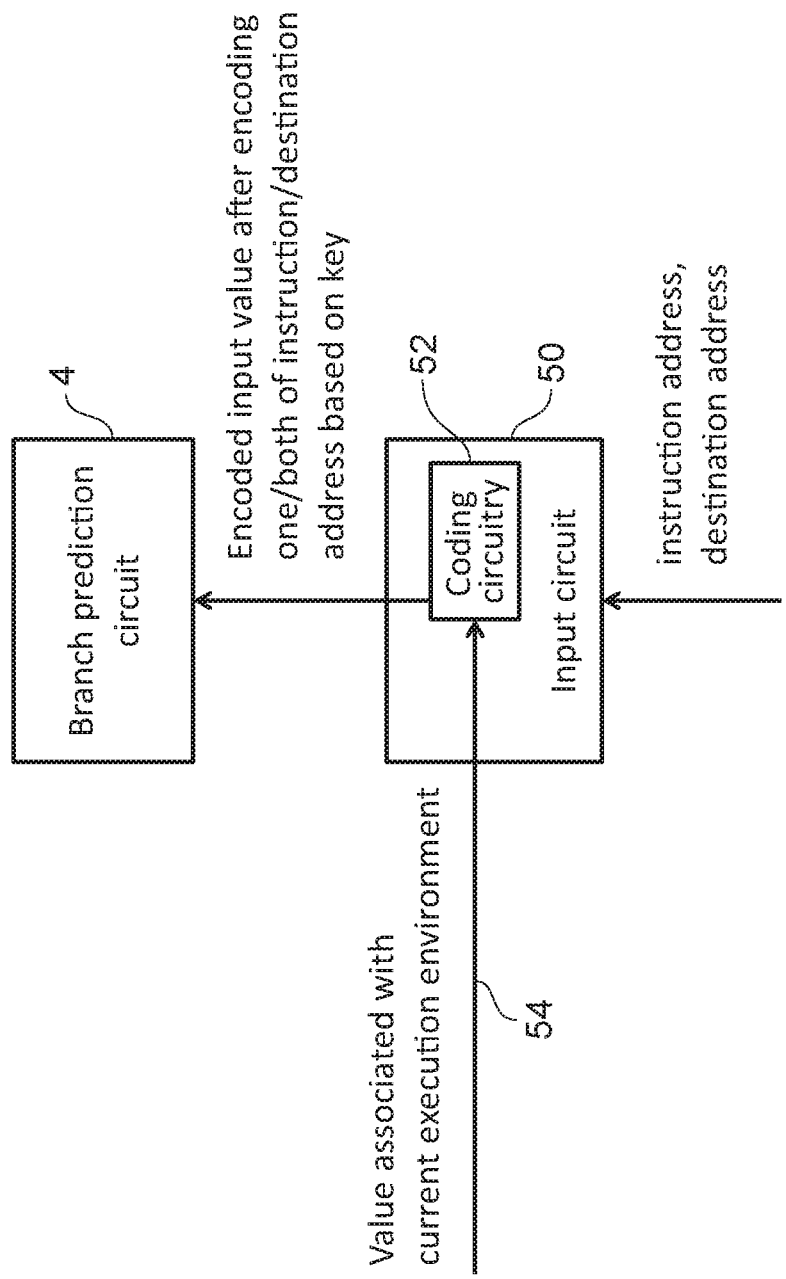
FIG. 3 illustrates an example of coding circuitry for encoding part of an input to a branch prediction circuit.

FIG. 3 illustrates an example of supplying an input to the branch predictor 4 for generating a new branch prediction state entry to be allocated. The input includes a number of bits. For example, the input in this example specifies an instruction address of an instruction identified as a branch, and a branch destination address (target address) indicating the address to which the branch branched to when it was executed. Coding circuitry 52 is provided to perform an encoding operation on at least some bits of the input, based on a value 54 associated with a current execution environment in which the stream of instructions is being executed. The encoded input value resulting from the encoding operation is then supplied to the branch prediction circuit 4. For example, the encoding may be applied to all or part of one or both of the instruction address or the destination address of the input.

FIGS. 4A to 4C illustrate different examples of performing the encoding operation (in example 4A and 4B, applied to a portion of the destination address of the branch, although it could also be applied to the instruction address as in example 4C). As shown in FIGS. 4A to 4C, some bits of the input address can be removed before applying the encoding operation to remaining bits. In FIG. 4A a rearrangement of the relative order of the remaining bits is performed based on a key derived from the value associated with the current execution environment (or current execution permission). For example, a right shift (or rotation) by a number of bits specified by the key could be performed, or some other reordering of the bits. In the example of FIG. 4B, the encoding operation is performed as an XOR of the key with the selected bits of the input to the branch predictor. An XOR is an example of a reversible encoding operation for which a reverse encoding operation can be performed by performing a further XOR based on the corresponding key. In the example of FIG. 4C, a hash function may be applied to the selected bits of the input based on the key. Note that the key does not need to comprise the same number of bits as the selected bits being encoded. In general, regardless of the particular form of the encoding applied, some values of the input have their bit values changed before supplying the encoded input to the branch prediction circuitry. In the examples of FIGS. 4A and 4B showing encoding the destination address, the removed bits may be bits whose values can be deduced or are known at the time of applying the reverse encoding. For example, if instructions are already aligned to their size, then one or more lower bits of the address could be removed as they would always be zero. Similarly, if the destination address is represented as an offset from the instruction address, the top bits may always be zero, so could be removed before applying the coding, as there is no need to restore them on applying the reverse encoding. In contrast, for encoding of the instruction address there is no need to ensure that the removed bits are able to be restored by a reverse encoding, as no reverse encoding is necessary with this approach and so the transformation can be a one-way transformation.

Figure 5A:
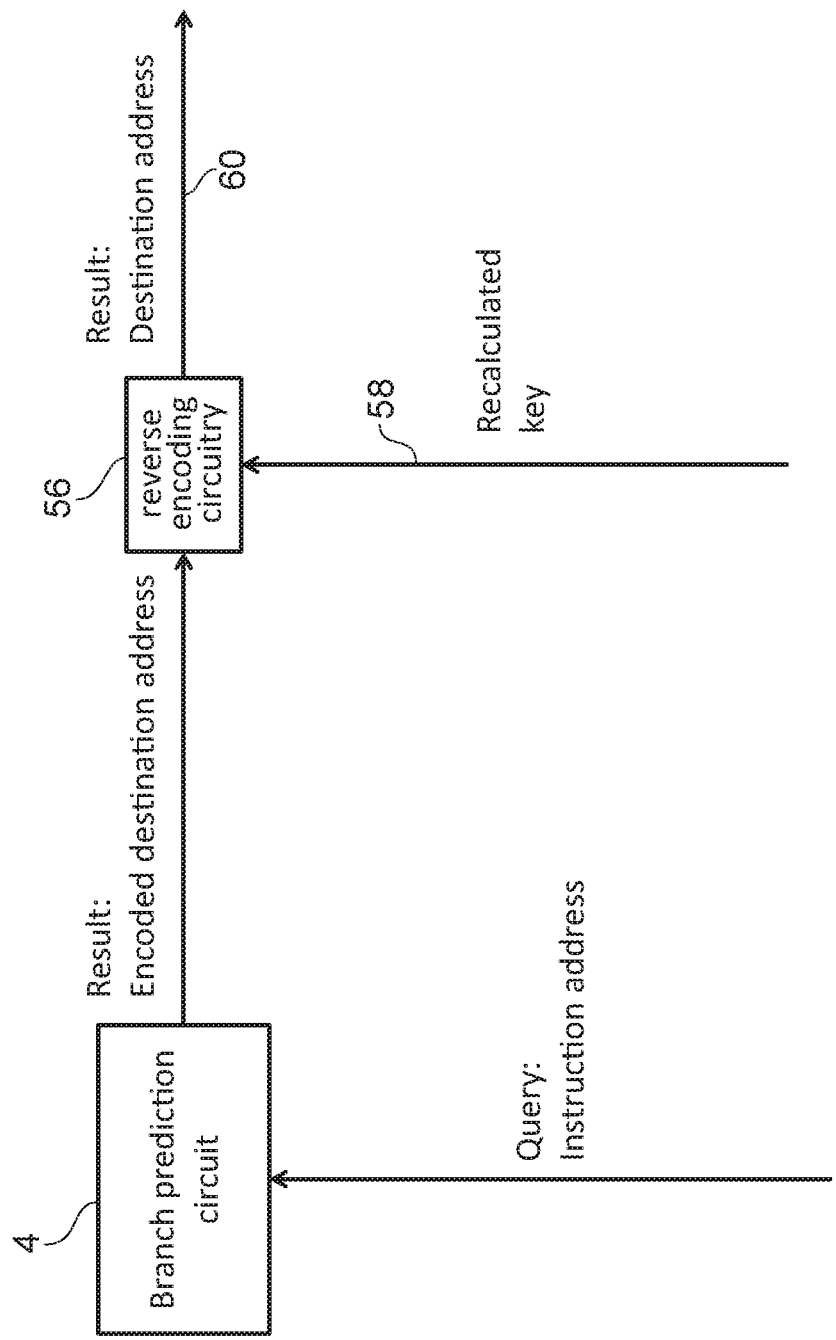
FIG. 5A shows an example of applying a reverse encoding operation, based on a recalculated key associated with the current execution context, to an encoded destination address output by the branch prediction circuit.
Figure 5B:
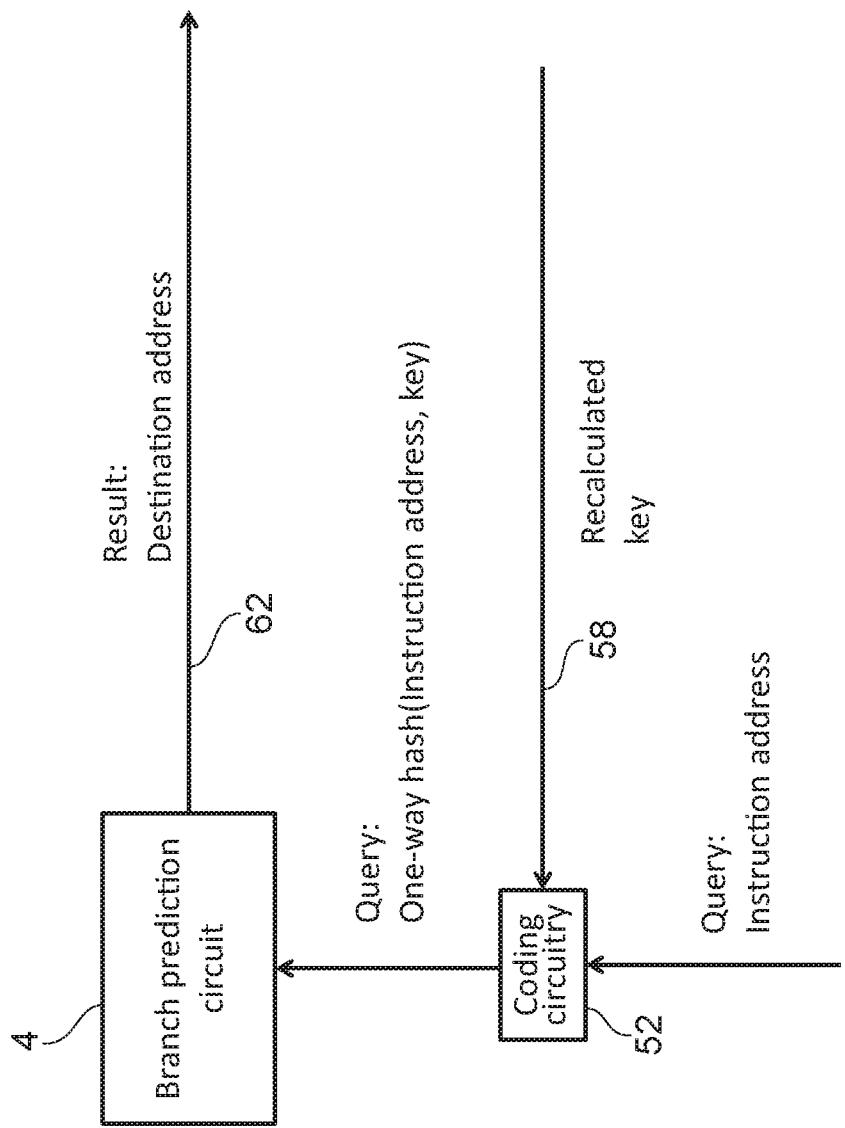
FIG. 5B shows an example of applying the encoding operation to an instruction address used as part of a query for searching the branch prediction circuit.

FIGS. 5A and 5B show two examples of querying the branch prediction circuit to retrieve predicted branch information in response to a query specifying a given instruction address. FIG. 5A may be used in an example where the coding circuitry 52 of FIG. 3 applies the encoding operation to at least some bits of the destination address of the branch. In this example, a query is supplied to the branch prediction circuit specifying an instruction address for which a branch prediction is to be made. The branch prediction circuit 4 performs a lookup of its storage structure to identify whether any entries match the query, and if an entry matches, the encoded destination address (which was generated by the coding circuitry 52 based on the value 54 associated with the current execution environment) is retrieved and output. Reverse encoding circuitry 56 (which could be the same as the coding circuitry 52 in some embodiments, or could be different, depending on the encoding/decoding algorithm implemented) applies a reverse encoding operation to the encoded destination apparatus, based on a recalculated key 58 which is formed in the same way as the value associated with the current execution environment 54 used in FIG. 3, except that it has been recalculated based on parameters associated with the current execution environment 54 at the time the query of the branch prediction circuit is performed, rather than at the time the matching branch prediction entry was written to the branch prediction circuit (as in FIG. 3). Hence, if the matching entry is accessed following a query triggered by the same execution environment as the one that allocated the entry, the resulting destination address output by the reverse encoding circuitry 56 would be the same as the destination address originally supplied as an input in FIG. 3. However, if the matching entry is accessed from a different execution environment from the one that allocated it, the decoded destination address 60 is different to the one originally allocated. The encoding/reverse encoding algorithm and/or the key (or the method used to generate the key) can be chosen to make it difficult for an attacker to predict what alternative value of a destination address should be provided as the input in FIG. 3 in order to have the reverse encoded address 60 (when reverse encoded using a different key to the one that encoded the address) match a desired branch target address to which the attacker wishes some other execution environment to branch to.

FIG. 5B shows an alternative approach used for querying the branch prediction circuit 4 in examples in which the encoding operation is applied to the instruction address (or other tag information used for locating a matching entry in the branch prediction circuit 4) by the coding circuitry 52. In this case, on querying the branch prediction circuit 4 to perform a search for branch information, corresponding coding circuitry 52 (which could be the same physical circuit as used in FIG. 3 or could be a different circuit) applies the same encoding operation to the queried instruction address based on a recalculated key 58 recalculated based on identifiers associated with the current execution environment (recalculated at the time of querying the branch predictor), e.g. applying a one-way hash to encode the instruction address according to the key. With this approach, it is not essential to use a reversible operation, as the data output from the branch prediction circuit 4 does not need to be encoded, instead the resistance against attack is provided by scrambling the mapping between the query supplied as an input to the branch predictor and the location in the branch predictor which is considered to match the query. Hence, the branch prediction circuit 4 is searched based on the hashed query information, and the destination address 62 output from the matching entry can be output in the clear without any reverse encoding being applied, and used as the predicted branch target address for a branch represented by the instruction address supplied as the query input.

Figure 6:
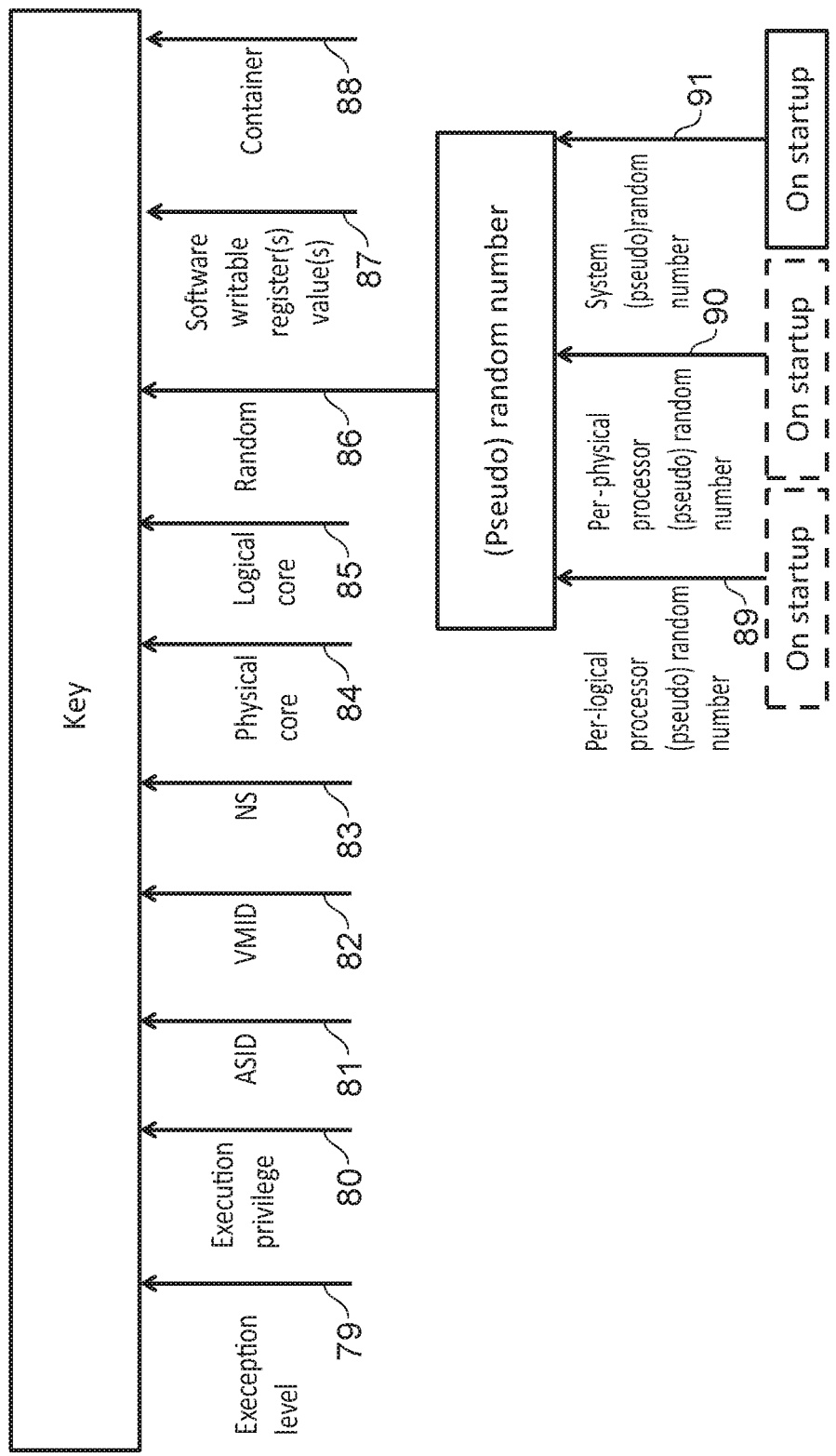
FIG. 6 shows an example of generating the key based on a number of identifiers associated with the current execution context.

FIG. 6 shows an example of forming the key from a number of identifiers associated with the current execution environment. These identifiers could be obtained from one or more control registers associated with the processing pipeline 2, which specify properties of the current execution environment. For example, the key may be based on any of the following:

exception level 79;
execution privilege level 80;
address space ID (ASID) 81;
virtual machine ID (VMID) 82;
security state (NS) 83;
physical core number 84;
logical core number 85;
a random value 86, which may a true random number or pseudo-random number. The (pseudo) random number may be derived from at least one of: a per-logical processor (pseudo) random number 89 which is different for each logical processor; a per-physical processor (pseudo) random number 90 which is different for each physical processor core; and a system (pseudo) random number 91 which is shared between all logical or physical processor cores in a data processing system but may differ from system to system to reduce the chance a key break on one system can be reused for another system. (or any one or more of these). Each of these elements 89, 90, 91 of the random number may be updated each time the data processing apparatus 2 starts up.
one or more software writable register values 87, which may be written to registers 14 under control of software to provide further entropy for the encoding operation
a container ID 88 (an identifier distinguishing different portions of execution environments, which could for example be at the lowest privilege level having the most restrictive access rights).

Of course, not all of these parameters need to be considered for a particular implementation. In general, by generating the key for the encoding operation (and reverse encoding operation if necessary) based on one or more identifiers 80-85, 88 associated with the current execution environment, and optionally based on further parameters such as random numbers of software-defined values, two different execution environments with different privilege levels are unlikely to have the same key and so it is hard for the attacker to train the branch predictor in one execution environment to trick an execution environment with greater data access privilege into branching to malicious code which may lead to exposure of secure data. Furthermore, by adding a (pseudo) random value into the key generation process it is even more difficult for the attacker to determine what the key will be. In particular using a random value means that even if the attacker has complete access to one system, any information gained through reverse engineering cannot be used to predict the key used on another system because the (pseudo) random values will be different. Similarly it may be desirable to have different keys generated for each execution environment on each logical processor core. For complexity and performance reasons it may not be desirable to have separate (pseudo) random number generators per logical processor. In this case it may be possible to achieve the same result by using a per processor or system level (pseudo) random number with the logical and/or physical core numbers in the key generation process. In some embodiments the key generation process may comprise hashing the various key inputs together. The hash algorithm used may be a (secure) one way hash.

That is, in some examples the key could be based on a one-way transformation applied to at least one key input parameter, where the at least one key input parameter includes at least one value associated with the current execution environment (e.g. the ASID, VMID, or exception level discussed above), but could also include other inputs such as a random number of software-writable value. By using a one-way transformation to generate the key, this means that even if an attacker can observe all but one of the inputs, and they know the algorithm, and they can observe some of the generated keys, they cannot work out what the missing input is (e.g. the random number), which in turn means they cannot predict what the key will be for a different execution environment.

Figure 7:
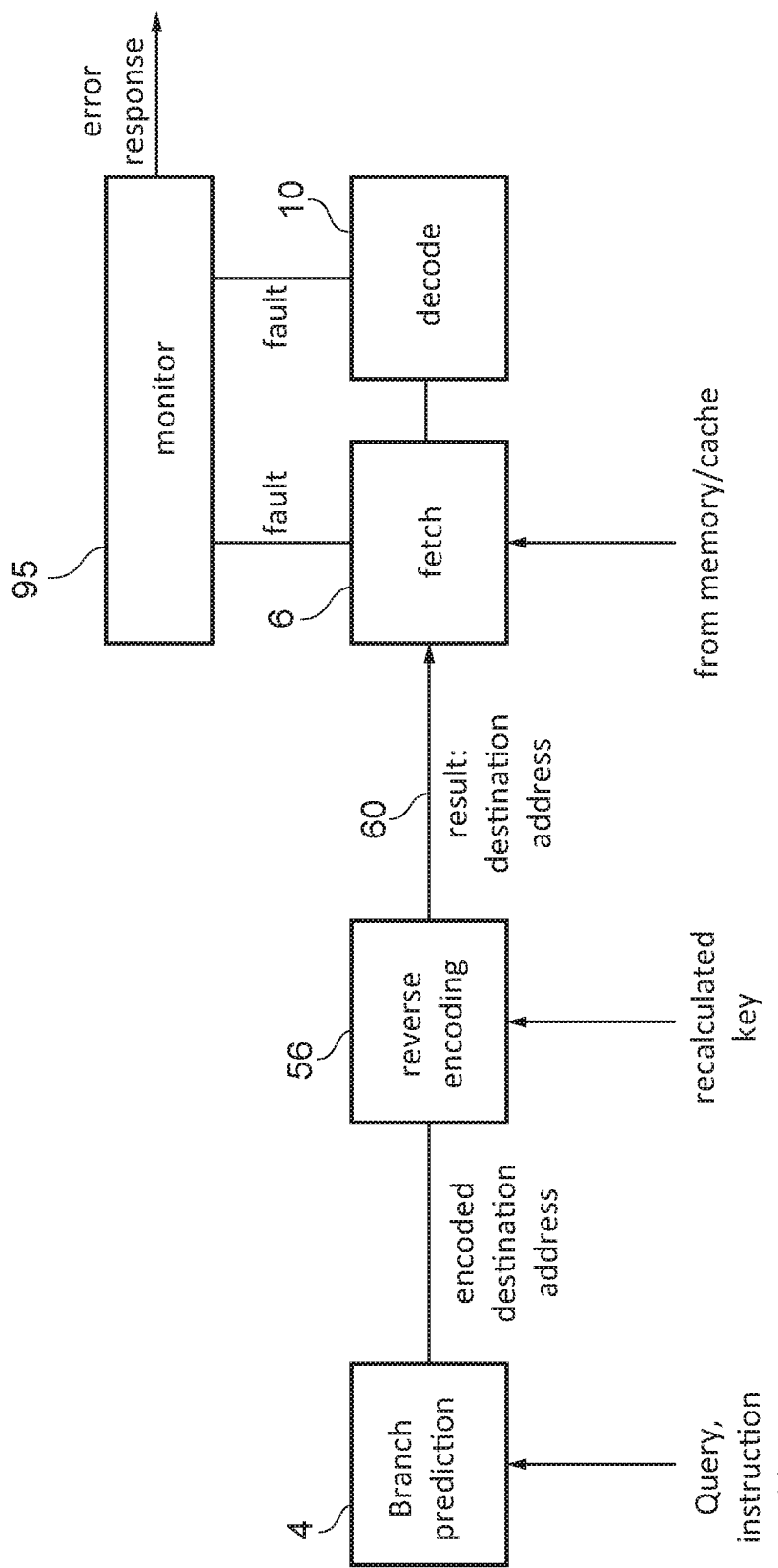
FIG. 7 shows an example of monitoring circuitry for detecting a rate of instruction fetch faults.
Figure 8:
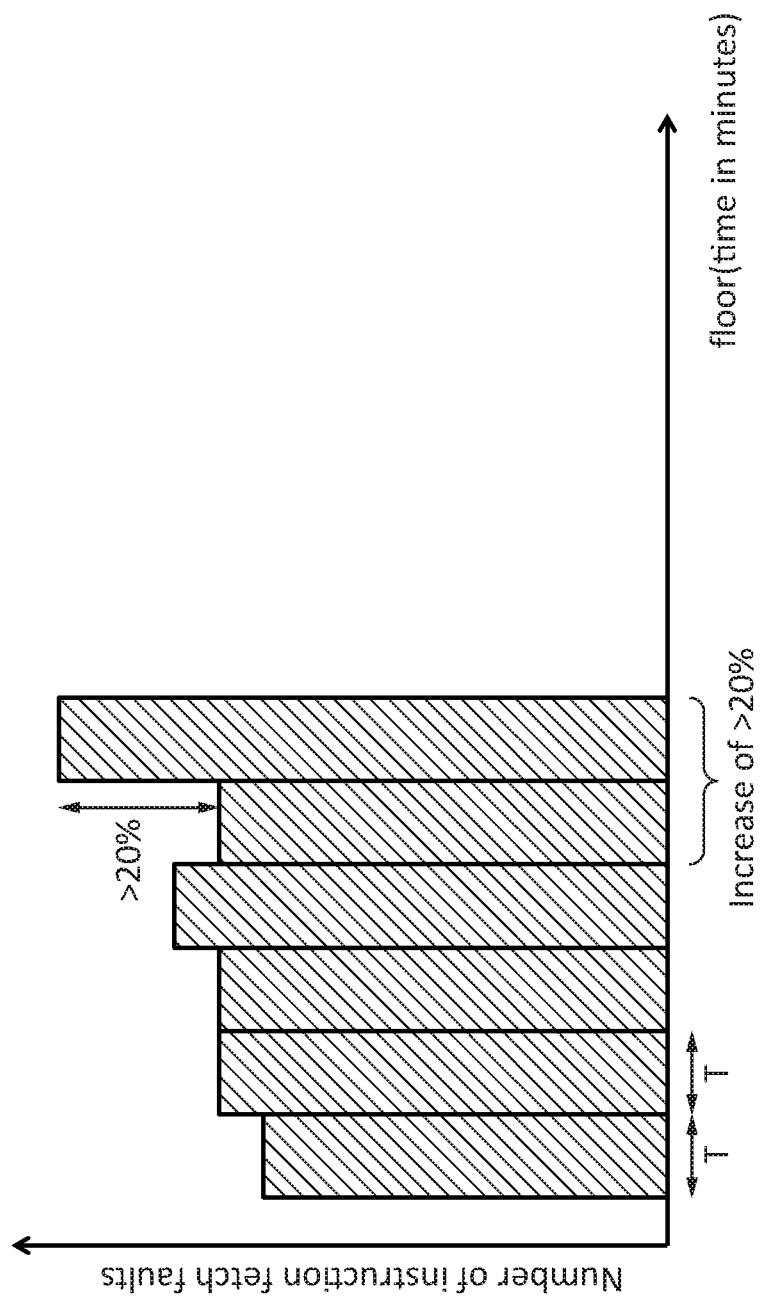
FIG. 8 shows a graph illustrating an example where an increase in the rate of instruction fetch faults of 20% or more triggers an error response.

FIG. 7 shows an example in which monitor circuitry 95 is provided to monitor a rate of instruction fetch faults encountered by the fetch stage 6 and/or instruction decode faults encountered by the decode stage 10. The rate of fetch faults and the rate of decode faults could be monitored separately, or as a combined rate. Also, in some examples only one of these types of faults could be monitored (e.g. fetch faults alone, or decode faults alone). Although fetch and decode faults could occur for a number of reasons, one may be branch mispredictions by the branch predictor 4. If an attacker attempts to use the branch predictor to pose an attack as discussed above, there may be more frequent branch mispredictions. Therefore, the rate of instruction fetch and decode faults could be used as an indicator that may provide a hint that an attack is being mounted. The monitor circuitry 95 could trigger an error response (such as raising an interrupt or exception), if an increase in the number of or rate of instruction fetch or decode faults in a given time period by a certain threshold is detected. FIG. 8 shows a graph tracking the rate of instruction fetch faults in successive time periods of duration T. As shown in FIG. 8, if an increase in the rate of instruction fetch faults increases by greater than the threshold (e.g. 20%) from one time period to the next, a fault handling response can be triggered. It will be appreciated by one skilled in the art that there any many ways of using the fault rate to detect an attack (for example comparing against a predetermined threshold, or comparing against the fault rate from previous executions of a program) that are within the scope of the invention. How software chooses to respond to such an exception may vary, but this provides a means of signalling to software that an attack is in progress.

Figure 9:
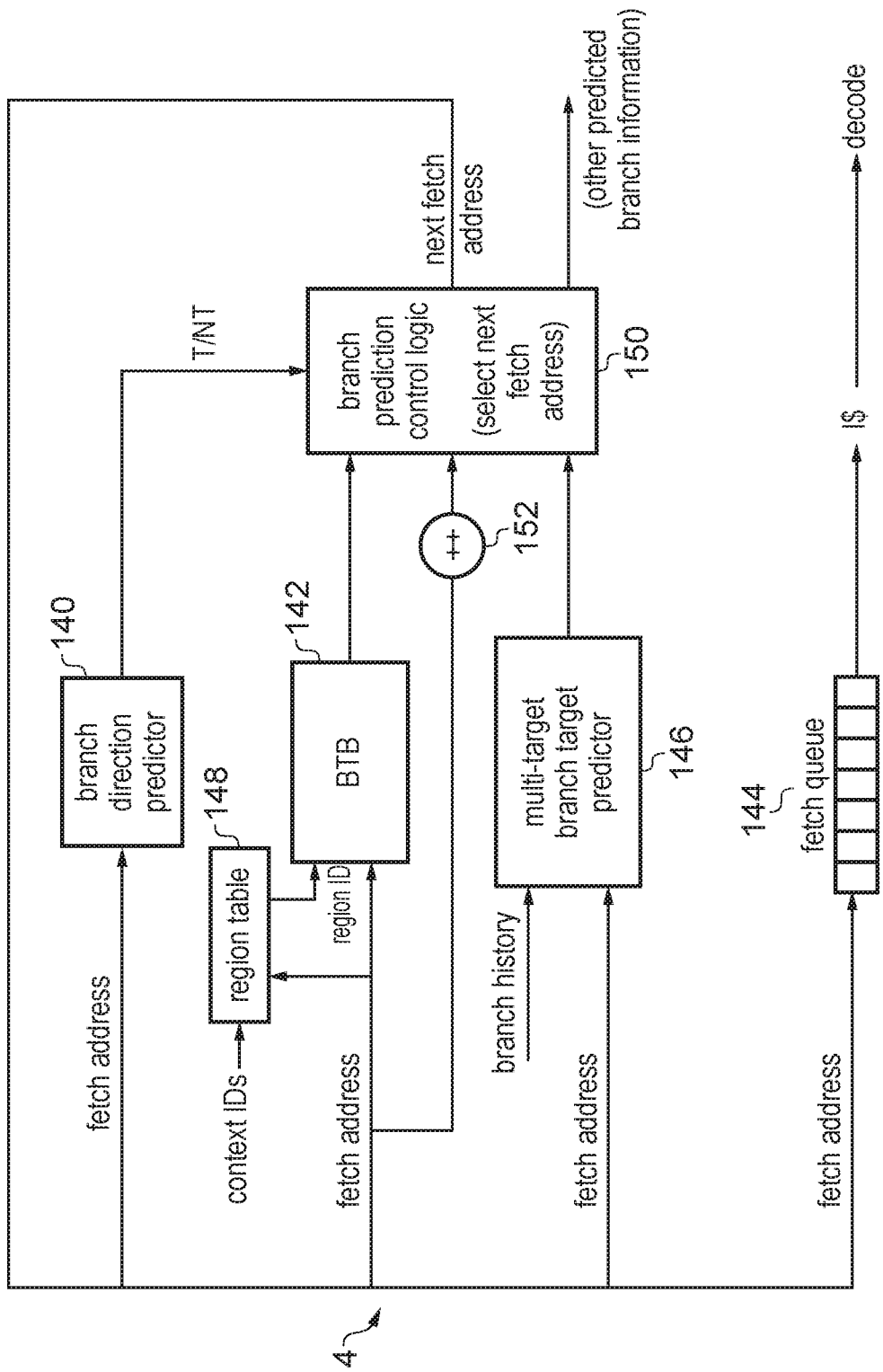
FIG. 9 shows another example of a branch predictor, comprising a branch target buffer and branch direction predictor.

FIG. 9 schematically illustrates another example of a branch predictor 4, which includes a branch direction predictor (BDP) 140 for predicting whether branch instructions are taken or not taken, a branch target buffer (BTB) 142 for predicting the target address to which a branch instruction will redirect program execution in the event that it is taken, and a fetch queue 144 for queueing the fetch addresses identifying blocks of program instructions to be fetched from the cache 8 (note that in some cases the fetch queue could be regarded as part of the fetch stage 6 instead of part of the branch predictor 4, but the functionality would be the same). The addresses placed in the fetch queue 144 represent addresses of blocks of instructions to be fetched from the instruction cache 8, which are derived from previous predictions of the branch predictor. The unit of instructions fetched in one block from the cache 8 may be referred to as a "fetch block" and may have a certain default size, e.g. 16, 32 or 64 bytes, although in some cases when the start address from which fetching is to be performed is not aligned with a natural fetch block boundary, a fetch of a partial fetch block may be performed with a size less than the default size.

The BDP 140, which can also be referred to as a branch history buffer or branch outcome predictor, records branch history information for predicting the taken/not-taken outcome of branch instructions. Any known branch taken/not-taken prediction scheme may be used for the BDP 140. For example, gshare or TAGE are examples of known branch direction prediction algorithms.

The BTB 142 holds prediction information for a number of branch instructions, identified by a tag corresponding to a portion of the instruction address for the branch instruction (and possibly dependent on other information such as context identifiers or other identifiers of the current execution environment). The prediction information may indicate the target address for the branch, as well as other information such as the instruction address (program counter or PC) of the corresponding branch instruction, some attributes concerning the branch (e.g. whether it is indirect, unconditional, function call, function return, . . . ), or other information for predicting the outcome of the branch as will be described below.

The branch predictor 4 also includes a multi-target branched target predictor 146, which is a special kind of branch target buffer used for predicting the target addresses of branch instructions which are polymorphic, that is their branch target address varies from time to time so that different instances of execution of the branch instructions at the same instruction fetch address may result in different target addresses depending on the outcome of previous instructions proceeding the branch. Both the BTB 142 and the multi-target indirect branch target predictor 146 are examples of branch target prediction structures. Also, the branch predictor 4 comprises a region table 148 which is used to compress context identifiers into a shorter region identifier to be used as tag information for the BTB 142.

When the fetch stage 6 starts a new fetch for a given fetch address to fetch a block of instructions from the instruction cache 8, the branch predictor 4 also looks up that fetch address in the BDP 140, the BTB 142 and the multi-target branch target predictor 146. When the BTB 142 holds predicted branch information including the branch target address for the program counter address represented by the current fetch address then that information is read out from the BTB 142 and is qualified by the BDP 140. The lookup may be controlled by branch prediction control logic 150. When the branch is predicted not taken by the BDP 140, the branch prediction control logic 150 selects as the next fetch address an incremented version of the current fetch address incremented by a certain stride amount by an adder 152, so that the next fetch address used in a following cycle will follow on sequentially from the current fetch address. On the other hand, if the BDP 140 predicts that the branch is taken, the branch prediction control logic 150 selects as the next fetch address the predicted branch target output by the BTB 142. For some instruction fetch addresses the BTB 142 may output an attribute indicating that the address refers to a block of instructions containing a branch previously detected as being polymorphic, and in this case the polymorphic branch attribute controls the branch prediction control logic 150 to select the branch target address output by the multi-target branch target predictor 146 as the next fetch address instead of the output of the BTB 142. The multi-target branch target predictor bases its predicted target address on the branch history of earlier branches preceding the current point of execution identified by the current instruction fetch address, in contrast to the prediction made by the BTB 142 which is independent of the branch history.

The next fetch address output by the branch prediction control logic 150 is allocated to the fetch queue 144 so that in due course when that address reaches the front of the queue the corresponding block of instructions is fetched from the instruction cache 8 by the fetch stage 6. Also the next fetch address is input as the current fetch address in a following processing cycle to trigger another lookup of the branch predictor 4 for that fetch address. This process continues cycle by cycle in order to step through the program code being executed. If a branch misprediction is detected at the branch unit 21, when the actual outcome of a branch instruction is different to the predicted outcome generated by the branch predictor 4, then signals are sent back to the fetch stage 6 to reset the fetch queue and resume fetching from the actual branch target address, and to update contents of the various prediction structures 140, 142, 146 based on the actual outcome of the branch to increase the likelihood of predictions being correct in future.

In summary, the BTB 142 (which can also be known as a branch target address cache or BTAC) is a component of the branch predictor 4 which is used to identify the predicted target address of a branch. Hence, the BTB may effectively be a small cache of entries with each entry providing the branch location (program counter, or branch instruction address, of the branch instruction), the predicted target address for the branch, and possibly other inclinations such as attributes specifying whether the branch is conditional and whether it represents a function call or function return for example. As different execution contexts (e.g. different processes being executed by the processor 2 or different virtual machines) may use the same virtual address to refer to different branches, then to avoid unnecessary address conflicts each BTB entry may be tagged with context information, such as a process identifier and/or a virtual machine identifier.

Figure 10:
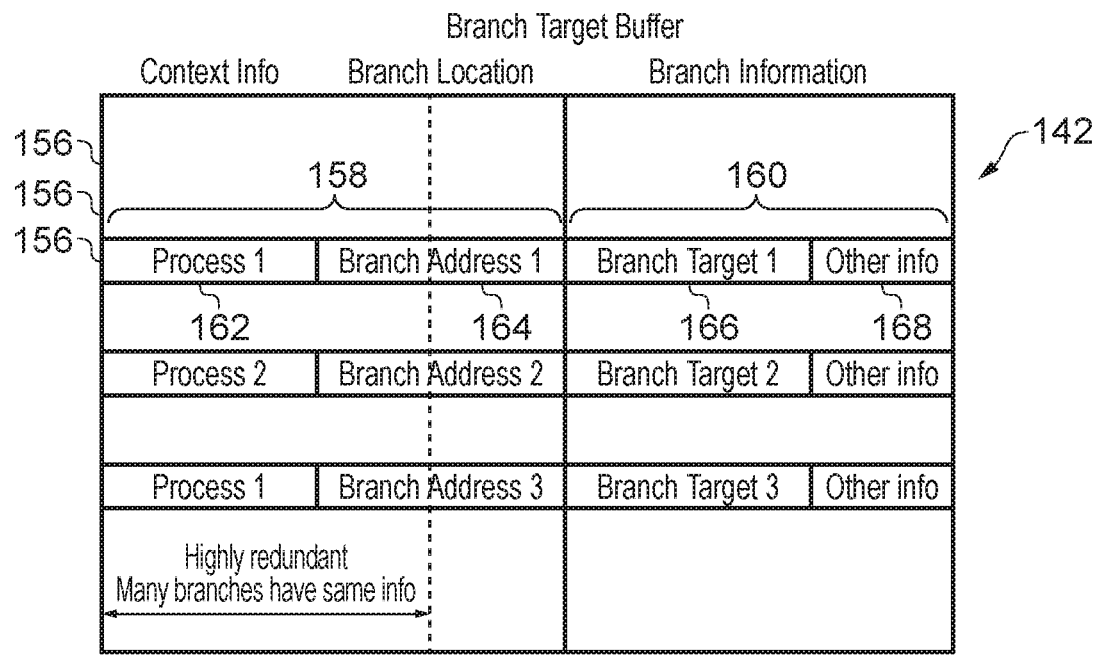
FIG. 10 shows, for comparison, a form of branch target buffer in which context information identifying a given execution context is specified in tag information for each branch target entry.

FIG. 10 shows an implementation of the BTB in embodiments which do not use the region table 148. In this example the BTB 142 includes a number of entries 156 with each entry 156 including a tag portion 158 providing the tag information for identifying on a BTB lookup whether that entry is relevant to the current fetch address, and a data portion 160 providing the predicted branch information including the branch target address 166 and any other information 168 associated with the current corresponding branch. In this example the tag portion 158 specifies as the tag information one or more execution environment identifiers 162 which identify the execution environment (context) in which the corresponding branch was executed and the instruction fetch address 164 corresponding to the branch (the program counter of the block of instructions containing the branch). The data portion includes the branch target address 166 and other information 168 such as the attributes specifying whether the branch is conditional, a function core, a function return, etc.

In some implementations, the data portion 160 could also include the least significant bits of the branch address 164 (although not illustrated in FIG. 10). This may be useful in superscalar processors in which multiple instructions are executed per cycle, in which case the branch predictor 4 may need to predict a block of multiple instructions in parallel, and so each entry may map to a block of instructions. The least significant bits of the instruction fetch address may be excluded from the tag portion 158 to allow any instruction within the block to match against the entry. However, even if an instruction fetch address from the block represented by a given entry is input, if the instruction fetch address is after the address of the last branch occurring in the block associated with that entry, no branch would arise following that instruction fetch address, and so the branch prediction associated with the branch should not be acted upon. Hence, by including the least significant bits of the branch address in the data portion 160 of the branch target address entry 156, this can enable a determination of whether the prediction represented by the matching entry should be acted upon given the current instruction fetch address looked up in the BTB 142.

The cache provided for the BTB can be implemented in different ways. In some examples the cache could be fully associative, so that the branch information for a given branch can be placed at any location within the BTB. However in practice a set-associative cache implementation may be more efficient, and in this case the locations at which branch information for a given branch is allowed to be stored may be limited to a particular set (identified based on the instruction fetch address of the instruction block containing the branch) in order to reduce the number of entries which have to be looked up for a given fetch address during a branch target buffer lookup.

Typically the BTB may have a relatively large number of entries, e.g. in the order of a thousand, in order to be able to store sufficient branch information to provide high enough performance. However, in practice the number of contexts which at a given time have information stored in the BTB can be much smaller, e.g. up to ten, since one execution context could have branch information cached for many instructions of that context. Also, many of the branch instructions associated with a given context may all share the same values for a more significant portion of the branch instruction address 164. This means that the tag information 158 if implemented in the way shown in FIG. 4 can include a large amount of redundant information since explicitly indicating the full context identifier and full branch instruction address can require a relatively large number of bits for the tag 158, which increases circuit area needed for the BTB 142 and also increases the number of comparators needed for tag comparisons during the lookup of the BTB 142.

Figure 11:
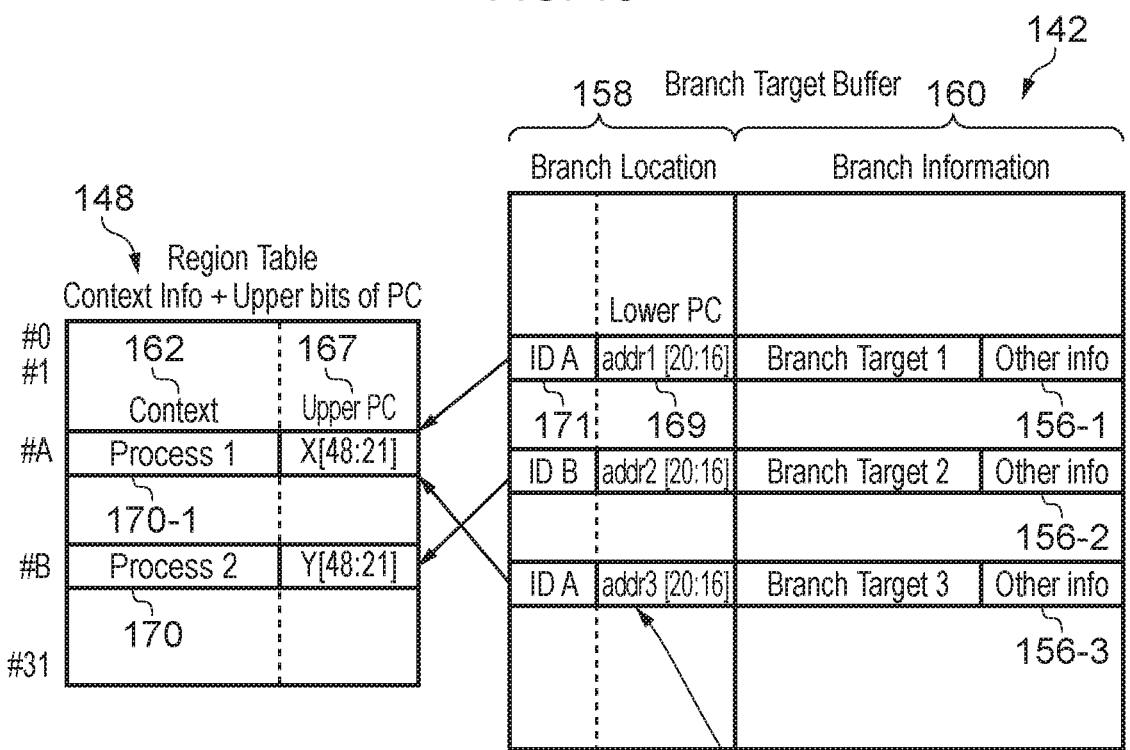
FIG. 11 shows an alternative implementation in which a region table is used to compress the context information into a shorter region identifier which is used as tag information in the branch target buffer.

As shown in FIG. 11, to improve the area efficiency of the BTB, the branch predictor 4 may use a region table 148 to compress this redundant information into a shorter tag value. In the example of FIG. 11 each entry 156 of the BTB again has a tag portion 158 and a data portion 160 and the data portion 160 is the same as in FIG. 10. However, instead of representing the execution context identifier 162 and the full branch instruction address tag 164 in the tags 158 within the BTB 152, the tag portion instead specifies only a lower portion 169 of the tag portion of the branch instruction address and a region identifier 171 which points to a corresponding region entry 170 in the region table which specifies the context identifiers 162 and upper portion 167 of the branch instruction address. Note that the region identifiers are not explicitly indicated in each region entry 170 in FIG. 11, but are implicit from the index of the corresponding region entry 170 (e.g. the first entry in the region table may be associated with region identifier #0, the next entry with region identifier #1, and so on). The region table 148 can be much smaller than the BTB 142, e.g. having between 10 and 100 entries, e.g. 32 in the example of FIG. 11. When looking up the BTB 142, one or more context identifiers identifying the current execution context and the upper bits of the program counter (e.g. bits 48 to 21) are looked up in the region table to identify the corresponding region identifier and then the region identifier and the lower portion of the tag bits of the program counter (e.g. bits 20 to 16) are used as the tag information for looking up the BTB 142. Note that the least significant bits (e.g. 15 to 0) of the program counter are not used in the tag at all as these are the bits which are used to index into the corresponding set of the set associative BTB 142. Hence, the region table 148 allows the tag portion 158 of the BTB entries 156 to be reduced in size. This exploits the fact that for the purpose of looking up the BTB 142, it is not essential to distinguish the current execution context from every other execution context, instead all that is needed is to distinguish the current execution context from any other execution context which currently has branch information in the BTB 142.

Figure 12:
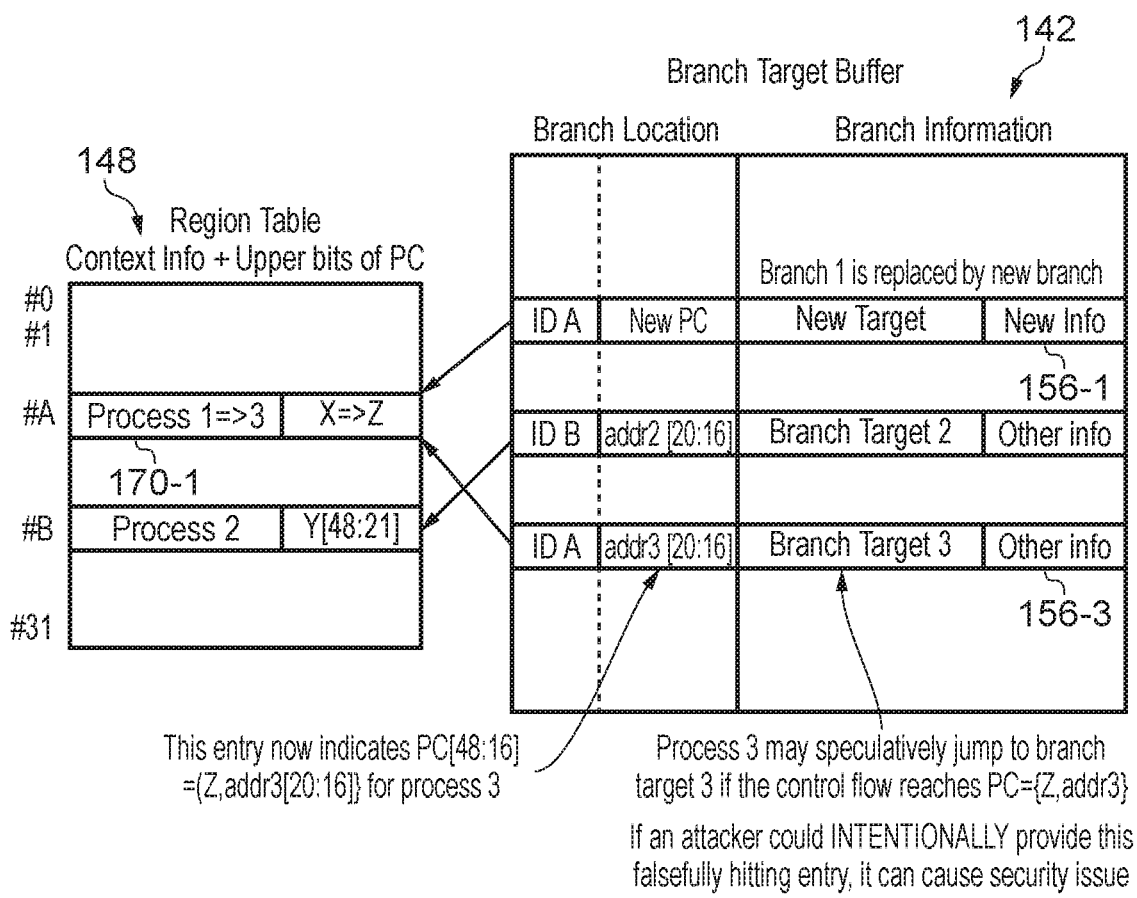
FIG. 12 shows a potential security issue which can arise in a system using such a region table, where an attacker may exploit the property that different execution contexts may reuse the same region identifier from the region table.

However, as shown in FIG. 12, when the BTB 142 is implemented using a region table 148, then this can lead to some false hits where the branch predictor 4 determines that a branch from one execution context matches against branch information in a BTB entry which was allocated by a different execution context. This can be seen from comparing FIGS. 11 and 12 which show the contents of the BTB in one example before and after an update to the region table 148. In FIG. 11, the BTB currently includes branch information for three branches at addr1, addr2, addr3 respectively (represented by entries 156-1, 156-2, 156-3 respectively). The branches represented by entries 156-1 and 156-3 are associated with process 1 as represented by region table entry #A and the branch represented by BTB entry 156-2 is associated with process 2 as represented by region table entry #B.

As shown in FIG. 12, a third process then executes a branch instruction and needs to allocate information into the BTB 142, but process 3 does not currently have any entry in the region table 148 allocated to it. If all the region table entries are already occupied then this requires a region entry 170 to be evicted and reallocated for the new process and so for example the region entry 170-1 which was previously allocated to process 1 may be updated so that it now provides the context identifiers and upper address bits associated with process 3. The branch target buffer entry 156-1 may also be updated to replace the previous branch 1 with the new branch which is associated with process 3. However, another BTB entry 156-3 specifying region identifier #A of the updated region table entry may not be invalidated at this stage, and may continue to provide the information associated with branch 3 which was previously associated with process 1. Invalidation logic for walking through the BTB 142 to eliminate such stale branches when there are updates to the region table would not normally be provided because it would require additional circuitry and it would be expected that such incorrect branch information would in any case be detectable if a prediction is made based on that information because at the execute stage 18 the actual branch outcome of the branch would be different from the prediction if the branch prediction data from the wrong execution context is used, and invalidation of the BTB entry involved can then be triggered. While this could cause a loss of performance, in practice as mispredictions may happen for other reasons not related to reuse of region table identifiers, this is not a great problem as the same misprediction resolution logic in the processing pipeline 2 could be reused. Hence, in typical BTB implementations using a region table 148, the entry which has a region identifier mapping to a region table entry which has been updated may be allowed to persist with the stale branch information allocated by a different execution context, as in the example 156-3 shown in FIG. 12.

Hence, when region table entries are updated an old entry of the BTB 142 may hit against subsequent branch instructions from the new process allocated to the updated region table entry, and this may cause false hits against previously allocated branch information from a different execution context. Previously this would only have been considered a performance issue and not a security issue. However, it has been recognised that an attacker may be able to use this property of the BTB to control the speculative execution of another execution context not under control of the attacker to expose information about secret data managed by that process. This is possible if both the following conditions are satisfied:

Condition 1: process A can use the target address provided in the BTB 142 by another process B.
Condition 2: process B can control the target of the BTB entry which is accessed by process A.

In the above example of FIG. 12, process 3 may use the target address provided by process 1 due to the re-use of the region identifiers used as tag information in the BTB between different contexts (condition 1). Also, process 1 can control the target of the BTB entry which is accessed by process 3, because it can execute branches with the desired target address which share the tag bits [20:16] with a branch in process 3, so that the desired target address would be allocated to the entry of the BTB 142 which will be hit by process 3. More generally, these conditions may arise in a branch target prediction structure in which values of the tag information 158 can be re-used between multiple execution contexts. The region table is one reason why this may arise but other reasons could simply be that the tag information does not depend on the identifier(s) of the current execution context (current execution environment).

The two conditions described above could be used as the basis for an attack as follows. First, the attacker controlling process 1 may execute branch instructions which result in a BTB entry being allocated specifying a branch target address which maps to some malicious sequence of instructions designed to be executed by a victim process 3 in order to control that victim process 3 to perform some operations which may expose secret data to the attacker. After the region table has been updated and the region identifier previously used for the attacker process 1 is reallocated to the victim process 3, the victim process 3 then executes the instruction from an address which matches the tag data in the stale BTB entry allocated by the attacker process 1, and so a branch prediction is made based on that information provided by the attacker. This leads to speculative execution of a sequence of instructions form the branch target address provided by the attacker, i.e. the special instructions provided by the attacker for tricking the victim process 3 into exposing the secret data by leaving a footprint in non-architectural state like e.g. data caches. These instructions could for example include memory access instructions which compute their target memory address using the secret information which the attacker wishes to gain access to. The data loaded into the cache 30, 32 by the memory access instructions may therefore depend on the secret information. Even if eventually the branch misprediction is identified, and so the architectural state in registers 14 of the processor pipeline 2 is rewound to the point before the sequence of instructions was mispredicted and speculatively executed by the victim process 3, the data loaded from memory by the incorrect speculatively executed instructions may still persist in the cache 30, 32. Therefore when execution switches back to the attacker process 1, the attacker may attempt to access each possible address which could have resulted from computing the target address based on the secret data. When performing such memory accesses, the attacker process 1 can measure performance data such as execution time for a load instruction or counting the number of cache misses, and from such side channel information about performance, the attacker may be able to determine whether or not data from a given address was placed in the cache by the victim process 3, and this can be used to deduce properties of the secret data which was accessible to the victim process 3 but inaccessible to the attacker process 1.

Figure 13:
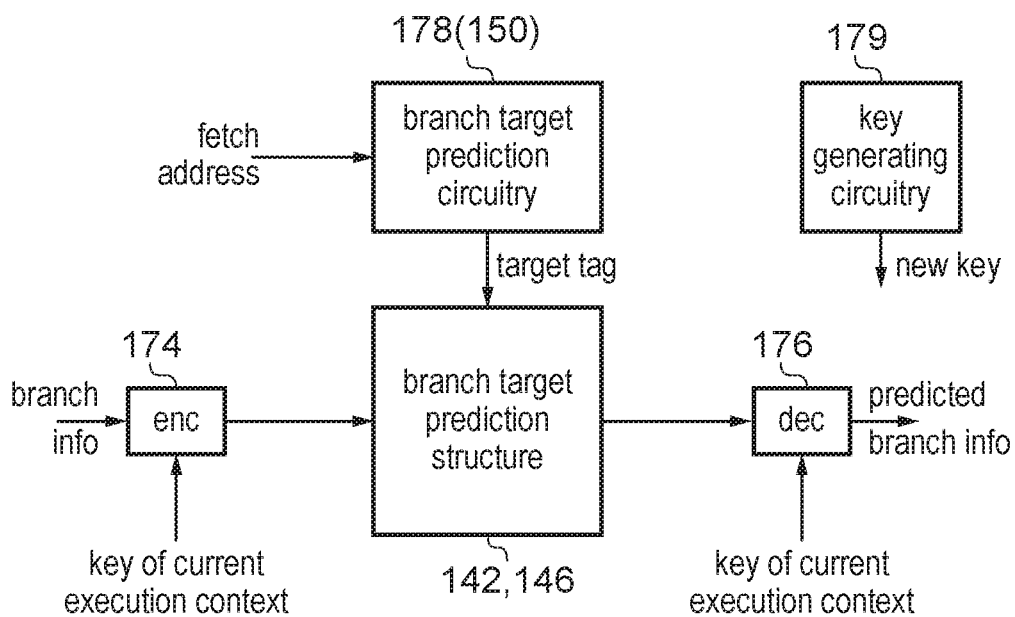
FIG. 13 shows an example in which branch information is encrypted before storage in a branch target prediction structure and decrypted on reading from the branch target prediction structure, based on an encryption key associated with the corresponding execution context.

For such an attack to be successful this requires the two conditions provided above to be satisfied. FIG. 13 shows a technique for breaking this second condition so as to deter such attacks by making it difficult for the attacker to control the branch target address which would be used by the victim context in the event of a false positive hit. The branch target prediction structure 142, 146 is provided with encryption circuitry 174 for encrypting branch information to be written to the branch target prediction structure, based on an encryption key associated with a current execution context, and decryption circuitry 176 for decrypting branch information read from the branch target prediction structure, based on the encryption key associated with the current execution context. Key generating circuitry 179 (e.g. a linear feedback shift register or other random number generator) may generate keys from time to time for each context. Branch target prediction circuitry 178 (which may correspond to the branch prediction control logic 150 of FIG. 9 as well as any cache access circuitry associated with the branch target prediction structure 142, 146 for generating target tag values and looking up the branch target entries to identify branch information for a given instruction fetch address) may generate a target tag from the instruction fetch address (e.g. using the region table 148), and control the branch target prediction structure to output the encrypted branch information if there is a hit in the branch target prediction structure. If there is a miss, and a branch is subsequently executed by the execute stage 18, the actual branch information for the branch is encrypted by the encryption circuitry 174 and written to the branch target prediction structure in association with tag information identifying the branch, under control of the branch target prediction circuitry. The encryption and decryption circuitry 174, 176 are shown as separate circuits in FIG. 13, but could also be the same circuit (e.g. an XOR circuit).

As discussed above, an alternative to encrypting the branch information would be to encrypt part of the target tag, in which case the decryption circuitry 176 may not be required.

Figure 14:
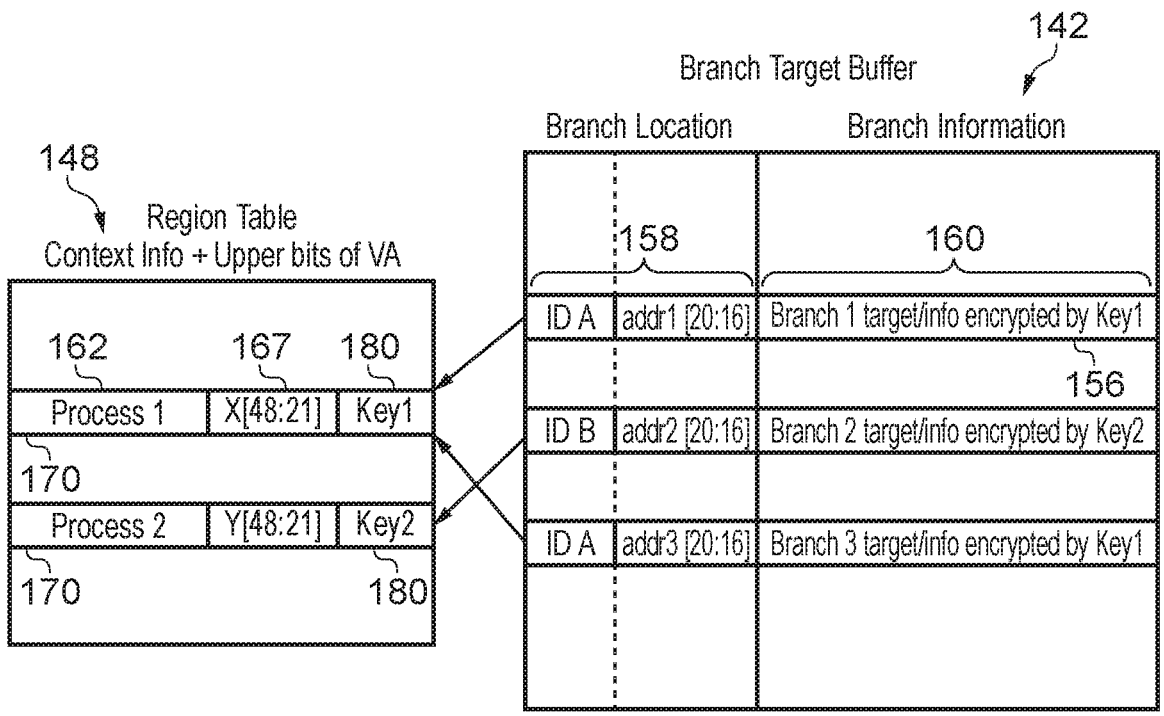
FIG. 14 shows an example of entries of a branch target buffer and region table according to the example of FIG. 13.

FIG. 14 shows an example of contents of the region table 148 and branch target buffer 142 when encryption/decryption is applied. In this example, each region table entry 170 stores an encryption key 180 which is associated with the corresponding execution context represented by that region table entry 170. The key 180 can be generated as a random or pseudo-random number by a linear feedback shift register (LFSR) or other random number generator 179 each time the corresponding region table entry 170 is updated so that the keys are different for different execution contexts which reuse the same region table entry. When a lookup of the BTB 142 misses, then fetching will continue sequentially beyond the current fetch address, but if a branch from the fetched instruction block is executed at the execute stage 18, the actual branch information is determined and can be allocated to a new branch entry 156 of the BTB 142. On allocating a new entry of the BTB, the branch information is encrypted using the corresponding encryption key 180 stored in the region table 148 for the current execution context. Optionally, the tag information 158 could be encrypted using the key as well. However, encryption of the tag is not essential. In some embodiments any additional information 168 stored as the predicted branch data 160 may not be encrypted and so only the branch target information can be encrypted, but security can be stronger if all of the branch information 160 is encrypted.

On a branch prediction lookup which generates a hit in the BTB 142, so that the tag information 158 matches against a target tag generated for the current instruction fetch address, then instead of simply outputting the branch information 160 directly from the BTB 142, the branch information is first decrypted using the corresponding encryption key 180 associated with the current execution context as defined by the region table 148, and then the decrypted branch information is used by the branch prediction logic 150 to derive the next fetch address. The encryption and decryption used to protect the BTB context could be implemented using secret key encryption or using public-key encryption. As the branch target address prediction may be on the critical timing path of the processing pipeline, it can be useful to use a relatively lightweight encryption method (e.g. XOR of the branch information with the key 180), instead of using a more complex multi-round encryption for example.

Figure 15:
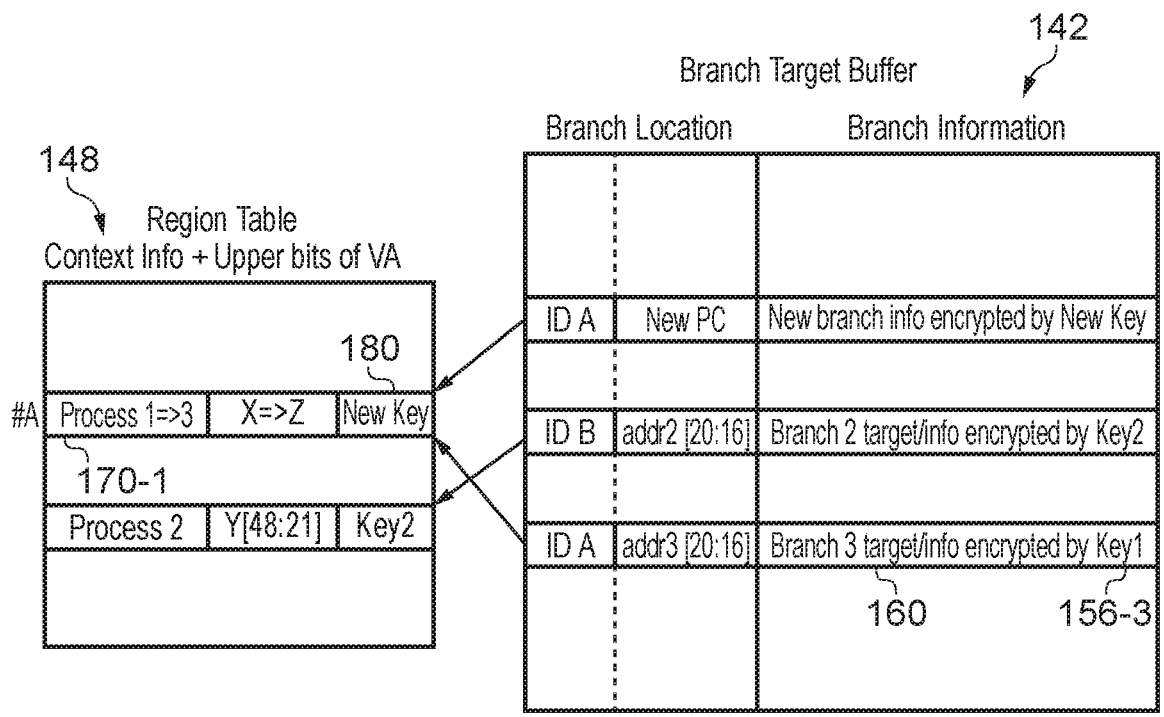
FIG. 15 shows an example of changing the encryption key when a region table entry is updated.

As shown in FIG. 15 this technique can prevent the second condition for attacks discussed above, because by encrypting the branch information using the key associated with the execution context which allocated that information, then if the same BTB entry 156-3 is accessed from a new execution context and then decrypted using the key of the new execution context, this will generate garbage information, not the target address which was allocated by the original context, so that it is difficult for an attacker to push a malicious target onto the BTB and control a different execution context to execute malicious code from a known location. For example, in FIG. 15 the attacker controlling process 1 allocates a certain entry 156-3 and then the region entry 170-1 is updated to point to process 3 as in FIG. 12. On updating the region table, a new key 180 is generated for region table entry 170-1, and so if subsequently there is a hit in BTB entry 156-3 during execution from the new execution context 3, the decryption of the branch information using the new key will not yield the same branch target address as the branch target address which was originally provided by process 1. The old information in the branch target information is encrypted by a stale key (key 1 which is no longer available in the region table) while the region table entry #A has a new key. To be able to create the type of attack discussed above to control the victim process 3 to jump to a malicious target address T, the attacker would need to provide a different target address T' so that Dec(Enc(T', key 1), New key)=T, which given a sufficient number of bits for the encryption key may make it infeasible that an attacker not knowing the old and new keys would be able to predict the value of T' needed to force the victim process 3 to branch to T.

While FIGS. 14 and 15 show an example where the keys associated with the respective execution contexts are cached in the region table 148, this is not essential, and it would also be possible for a separate storage structure to store the keys associated with each execution context.

In the examples of FIGS. 14 and 15, the key is a dynamic key which has a one-time use, as it is updated each time a region table replacement occurs. This can make the attacks harder because the attacker would need to identify the key and exploit it to read the secret information before the end of the lifetime of the key, which reduces the probability of the attacker being able to learn information about the key by observing a sequence of branch prediction results from the BTB in the time available before the key is updated. Nevertheless in other implementations instead of the dynamic key assigned to the region table entry, a static key for each execution context could be used so that the same key is used for a given execution context for the whole lifetime of the context. In this case, an efficient way of generating the keys for each context to reduce storage requirements may be to provide a common key shared between all the execution contexts, but to derive context-specific keys for each context from that common key by hashing the common key with the context identifier(s) associated with the context.

FIGS. 16 and 17 show an example of use of the multi-target indirect branch predictor 146. For polymorphic branches whose target address varies from time to time during the program, the BTB 142 which provides a fixed target address for each branch program counter address may not provide a reliable prediction, and so a separate prediction structure 146 may be provided. For such polymorphic branches, the branch information in the BTB 142 may be updated to provide an indicator which indicates that the BTB's predicted target address should not be used in future, and instead the branch target address for such branches should be predicted using the multi target indirect branch predictor 146. The multi-target indirect branch predictor includes a number of branch target entries 190 which each include information indicative of a target address predicted for the branch and tag information 194 which is based on a history of outcomes of previous branches (for example a sequence of bits indicating whether the previous branches were not taken or taken). Hence, the same branch instruction could be allocated multiple entries in the multi-target indirect branch predictor 146 corresponding to different branch history leading up to the branch. The tag information 194 is also dependent on the instruction fetch address of the block of instructions containing the branch. Unlike the BTB 142, the tag information does not include the context identifiers of the corresponding execution context or the upper bits of the program counter address. As the tags associated with each entry in the multi-target indirect branch predictor 146 are independent of the current execution context, this again means that tag values can be reused between multiple execution contexts. If an attacker controlling process 2 knows the access pattern (branch history) used to reach a particular indirect branch in a victim process 1, then the attacker can exploit a similar security issue to the one discussed above by pushing a malicious target address tagged by the known branch history pattern (e.g. tag A in FIG. 15) which will be accessed by process 1. The assumption here is that the attacker can intentionally predict tag conflicts in the multi-target indirect branch predictor 146.

As shown in FIG. 17, to prevent this weakness being exploited, the encryption keys 180 from the region table can also be used to encrypt the contents of the multi target indirect branch predictor 146. Hence, when branch information is allocated to an entry 190 of the multi-target indirect branch predictor 146, the encryption key 180 for the current execution context is read from the region table and this is used to encrypt the branch information 192 and optionally the tag 194 of the corresponding entry 190. On lookups of the multi-target indirect branch predictor 146, the branch information 192 is decrypted using the encryption key 180 of the current execution context, so that if a current execution context hits against an entry allocated by a previous execution context then the decryption using a different key to the one used to encrypt the data will lead to garbage data being output, different to the address originally provided by the previous execution context.

Hence, even in implementations which do not use a region table 148, if the branch predictor uses a multi-target indirect branch predictor 146 or another prediction structure which uses a tag which is independent of the current execution context, then again encryption of the contents of the branch predictor can be useful to avoid attackers being able to use false positive hits in the branch prediction structure to control a victim process to execute malicious code intended to give visibility of secret data.

Figure 18:
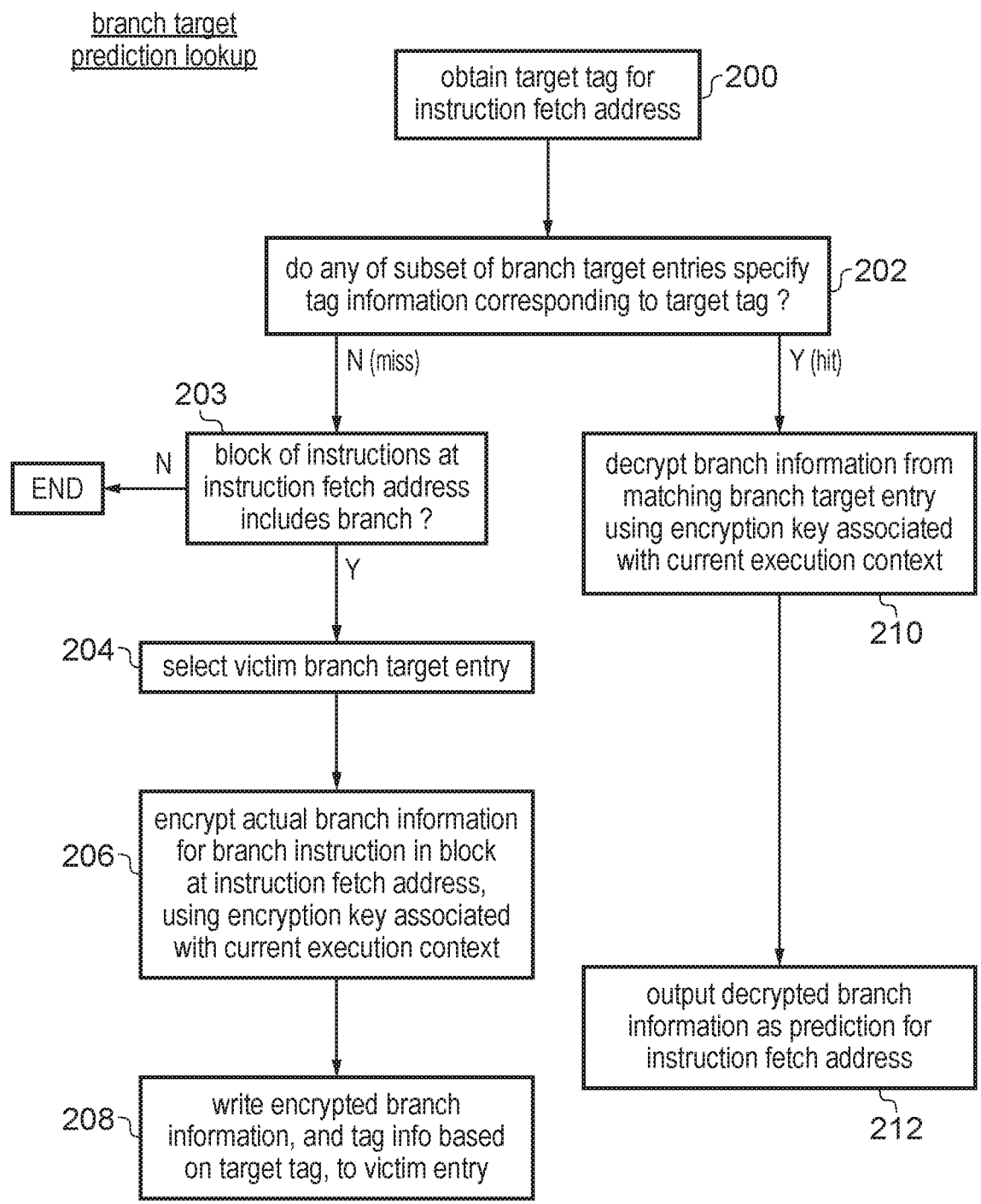
FIG. 18 is a flow diagram illustrating a method of performing a branch target prediction lookup.

FIG. 18 is a flow diagram illustrating a method of performing a branch target prediction lookup and update of the branch information in the branch target prediction structure 142, 146. It will be appreciated that FIG. 18 does not show all features of branch prediction which may be performed (e.g. the branch direction prediction by BDP 140 is not shown, as is the steps taken to halt execution of speculatively executed instructions and rewind processor state in the event of a misprediction—these can be performed as in any known branch prediction technique).

At step 200 a target tag is obtained for an instruction fetch address for which a lookup of the branch predictor is to be performed. The particular nature of the target tag will depend on the way the branch predictor structure is implemented. For example, for the BTB implemented using a region table 148 as discussed above the target tag can be determined from the region table based on context identifiers of the current execution context and part of the instruction fetch address. This approach will be discussed in more detail with respect to FIG. 19 below. Alternatively, for the multi-target indirect branch predictor 146 the target tag is based on the instruction fetch address and the history of previous taken/not taken outcomes. Other ways of generating the target tag are also possible.

At step 202 the branch prediction control logic 150 controls the branch target prediction structure 142, 146 to look up a subset of branch target entries 156, 190. The subset of entries may be selected based on the instruction address for example, or in a fully associative cache implementation could comprise all the entries of the branch target prediction structure. The branch prediction circuitry determines whether any of the selected set of entries specifies tag information which corresponds to the target tag obtained for the given branch instruction at step 200. If none of the subset of branch target entries specifies tag information corresponding to the target tag, then the lookup misses in the branch target prediction structure, and the branch prediction control logic 150 outputs the incremented version of the current fetch address from adder 152 as the next fetch address. Once the corresponding block of instructions has been decoded, the decode stage 10 determines at step 203 whether any instruction in that block is a branch instruction. If not, the method ends as there is no need to update any branch information. If the fetched/decoded block of instructions includes a branch instruction, then at step 204 a victim entry is selected from the looked up subset of branch target entries. For example if one of the subset of branch target entries is currently invalid then the invalid entry can be selected as the victim entry. If all of the subset of branch target entries are currently valid, then one of the valid entries is evicted to make way for the new branch information. Any eviction policy can be used to select the victim entry (for example round robin or least recently used).

At step 206, once the actual branch information has been resolved for the given branch instruction by the execute stage 18, then the actual branch information is encrypted using an encryption key associated with the current execution context. The branch information may include information for deriving or specifying the branch target address and could also include other information about the branch as discussed above. The encryption key could be read from the region table 148 or from separate storage. In some instances the target tag could also be encrypted. At step 208 the encrypted branch information and (optionally encrypted) tag information determined based on the target tag is written to the victim entry which was selected at step 204.

If at step 202 there was a hit in the branch target prediction structure 142, 146 and one of the looked up subset of branch target entries specified tag information which corresponds to the target tag, then at step 210 the branch information stored in that matching entry is decrypted using the encryption key associated with the current execution context. At step 212 the decrypted branch information is output as a prediction for the given branch instruction. The branch target address derived from the decrypted branch information is allocated to the fetch queue 144 to control subsequent fetching of instructions, and other predicted attributes of the branch instruction as specified by the decrypted branch information can control other aspects of the processing pipeline. Once the branch reaches the execute stage, the actual branch information is determined for the branch instruction and it can be determined whether the prediction was correct. If there was a misprediction then instructions subsequent to the branch instruction can be flushed from the pipeline and a signal can be sent to the fetch stage 6 to resume fetching of instructions from the correct target address of the branch if taken or from the sequential address following the instruction address of the branch if the branch should have been not taken. Also the branch predictor 4 can be updated to correct the branch information stored in the branch target prediction structure 142, 146 based on the actual branch outcome, so that a subsequent prediction for the same instruction fetch address is more likely to be correct next time.

Figure 19:
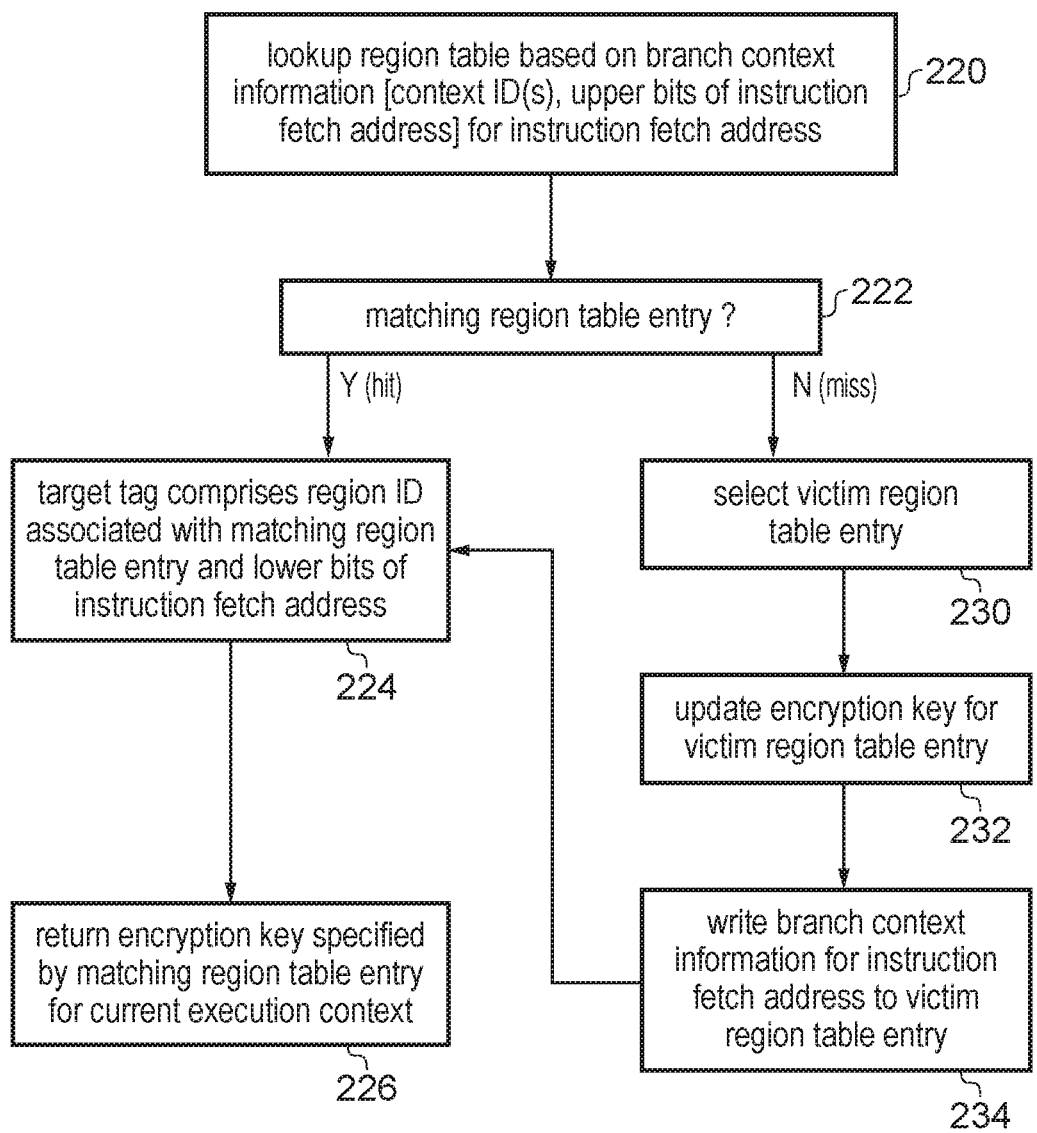
FIG. 19 is a flow diagram showing a method of generating a target tag value for the lookup based on the region table.

FIG. 19 is a flow diagram showing in more detail a way of obtaining the target tag at step 200 of FIG. 18 in embodiments where the branch target prediction structure is a BTB 142 using the region table 148 to compress the tag portion of each entry. At step 220 the region table 148 is looked up based on branch context information associated with the current instruction fetch address. For example the branch context information may include one or more context identifiers identifying the execution context in which the branch is executed and may also include upper branch instruction address bits of the instruction fetch address. At step 222 the branch prediction control circuitry determines whether the region table includes a matching region table entry 190 for which the branch context information stored in the entry 190 matches the branch context information provided for the given branch instruction. If so, then there is a hit in the region table, and at step 224 the target tag is determined as comprising the region ID which is associated with the matching region table entry and one or more lower bits of the tag portion (e.g. bits 20:16 in the example of FIG. 14) of the instruction address. Also at step 226 the encryption key corresponding to the current execution context is returned from the region table, by reading the key from the matching region table entry.

If at step 222 the lookup misses in the region table so that there is no matching region table entry which has branch context information matching the branch context information provided for the current instruction fetch address, then at step 230 a victim region table entry is selected, e.g. an invalid region table entry which is not already mapped to a particular context, or if no invalid entry exists, a valid region table entry to be evicted. Again an eviction policy such as LRU or round robin could be used to select the victim region table entry. At step 232 the encryption key 180 stored in the victim region table entry is updated. For example a linear feedback shift register or other random or pseudorandom number generator can be triggered to output a new random or pseudo-random number. The updated encryption key is written to the victim region table entry. Also at step 234 the branch context information determined at step 220 for the given branch instruction is written to the victim region table entry selected at step 230. The region identifier associated with the victim region table entry has been mapped to a new execution context and any entries of the BTB 142 which were previously mapped to that region identifier now could return a false positive hit if looked up from the current execution context because they were allocated by a previous execution context sharing the same region identifier. However by updating the encryption key at step 232 then the encrypted context of those false positive entries will not behave in the manner expected by the previous execution contexts which allocated those entries into the BTB 142 and so this prevents a malicious process being able to control the particular branch target address executed by another context to map to a certain address selected by the attacker. Following step 234 the method of FIG. 19 continues to step 224, and then steps 224 and 226 are performed in the same way as if the region table lookup generated a hit, in order to return the target tag for the subsequent lookup of the branch target prediction structure and return the encryption key. Following completion of FIG. 19, the generated tag can then be used for the branch target prediction lookup according to steps 202 onwards of FIG. 18.

In summary, branch information in a branch target prediction structure is encrypted based on an encryption key associated with the execution context which caused the branch information to be allocated to the branch target prediction structure. On a lookup of the branch target prediction structure, when there is a hit then the branch information from the matching entry is decrypted using the encryption key associated with the current execution context. This is useful for branch target prediction structures using tag information with values which are reusable in more than one execution context, as the encryption and decryption makes it much more difficult for an attacker to obtain access to sensitive data from another execution context by exploiting false positive hits in an entry of the branch target prediction structure from a different context to the one which allocated the entry.

It will be appreciated that the specific examples shown in FIGS. 9 to 19 are just one way of implementing a branch predictor. More generally, part of an input to a branch predictor when generating a new branch prediction entry may be encoded based on a value associated with the current execution context, and on querying the branch predictor for a given query input, either the query input can be encoded using a value associated with the execution environment triggering the query, or the output of the branch predictor can be reverse encoded or decoded using that value associated with the latest execution environment, or both, to make it harder for an attacker to guess what state has to be trained in the branch predictor in order to control a victim process to control a branch to a specific address using a false hit in the branch predictor between different execution environments.

Translation Lookaside Buffer

Figure 20:
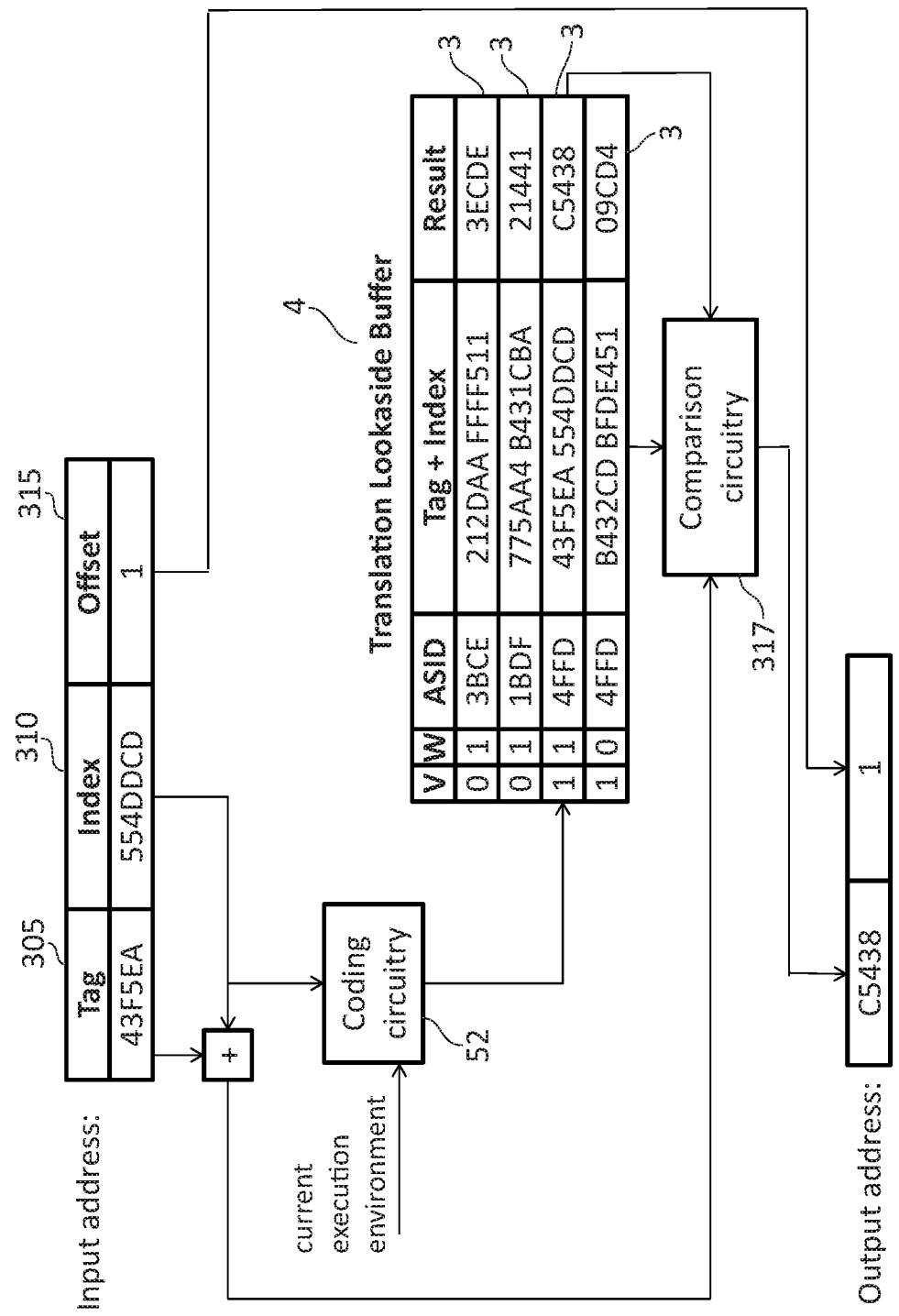
FIG. 20 shows an example in which the storage circuitry takes the form of a TLB.

The present technique also has relevance to address translation circuitry such as a translation lookaside buffer 4, which is a further form of the claimed storage circuitry. As shown in FIG. 20, a translation lookaside buffer contains a number of entries 3, each of which provides a translation between an input address (such as a virtual address) and an output address (such as a physical address). The input address includes a tag 305, an index 310, and an offset 315. The translation lookaside buffer 4 indicates, for each entry, whether that entry is valid (V), whether the data stored at the output address is writeable (W), and the process identifier associated with the entry (ASID). In some embodiments, entries in the TLB might also be listed in association with a Virtual Machine Identifier (VMID) that identifies a virtual machine instance associated with the entry. In some embodiments, entries in the TLB might also be listed in associated with an exception level, that indicates a privilege level at which the entry can be accessed. A result value of an entry is combined with the offset value 315 of the input address in order to produce the output address.

The index 310 portion of the input address is hashed in order to determine which entry 3 in the translation lookaside buffer 4 is relevant for the address translation. The result value of the corresponding entry would (assuming the entry was valid and the ASID matched the current ASID) be combined to determine the output address, e.g. an address in the physical memory. In the present example, the coding circuitry 52 performs the hash function, which is dependent on (e.g. takes as an input) an identifier of the current execution environment. Accordingly, in a TLB (which is usually set-associative) one execution environment would find it difficult to determine the set associated with a virtual address for another execution environment since the result of the hash in respect of a different execution environment is not known. It would therefore be difficult to determine, for instance, which entries in the TLB are being used by another execution environment.

It is important that correctness of the translation lookaside buffer 4 is maintained. That is, there should not be valid incorrect entries within the translation lookaside buffer. This can create difficulty, since the hash function (or one of the components of the hash function) might change over time. Furthermore, the coding circuitry 52 could point to an entry 3 in the translation lookaside buffer that relates to a different execution environment. Therefore, in the context of the current execution environment, the result would be "wrong". To counteract this, when an entry is referred to by the coding circuitry 52, the tag 305 and the index 310 of the input address are compared, using comparison circuitry 317, against those of the corresponding entry 3. Where other "environment controls" are added in order to restrict the execution environment for which an entry can be accessed (such as the VMID and/or exception level described above), these are also compared by the comparison circuitry 317 to check whether these requirements are met. Furthermore, each entry stores the tag and index with which it is associated. If the comparison indicates that the values are the same, then the 'Result' value of the entry is output. This is combined with the offset value 315 of the input address in order to form an output address. If the comparison indicates that the values are not the same, then no output is provided; and a 'miss' occurs in the TLB 4.

As described above, an input is provided to the coding circuitry 52 in order to encode the input address. The input (which includes the current execution environment) can be changed over time to improve security. The hash function and its input can include any of the techniques previously described. However, in some embodiments, multiple inputs to the hash function are provided on a per process basis both to inhibit the access of data belonging to another process and also to enable maintenance operations such as "invalidate by virtual address" to be used.

Cache

Figure 21:
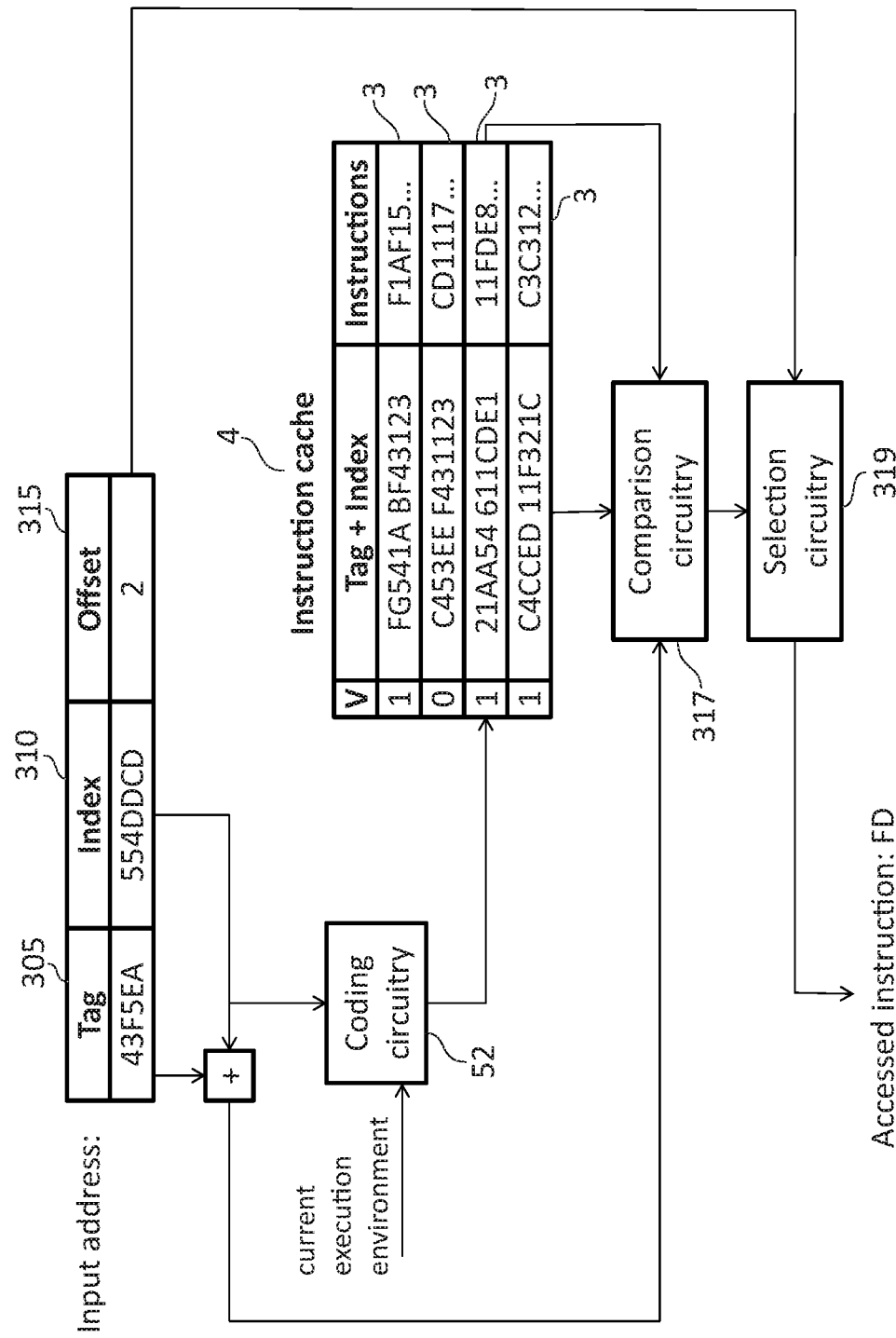
FIG. 21 shows an example in which the storage circuitry takes the form of an instruction cache.

In a similar manner to that of the TLB 4, the present technique also has relevance to caches such as an instruction cache 4, which is a further form of the claimed storage circuitry 4 as shown in FIG. 21. As in the case with the Translation Lookaside Buffer, there remains a desire to provide correctness of the entries 3. Consequently, having identified a particular entry to access based on the output of the coding circuitry 52 using the current execution environment, the comparison circuitry 317 is used to verify whether the desired entry has been accessed. If so, the instructions stored at that entry 3 in the instruction cache 4 is passed to selection circuitry 319. Here, the offset 315 of the input address is used to select one of the instructions stored in the entry 3, which is output as the accessed instruction. In this case, it is assumed that an instruction is merely two bytes in length and the offset indicates which of the two bytes stored in a particular entry 3 is being accessed.

Note that an instruction cache is typically read-only since the instructions are not modifiable. Similarly, since the instruction stored in the instruction cache is not writeable, there is no dirty flag to indicate that the instruction should be written back to memory as a result of being modified.

Data Cache

Figure 22:
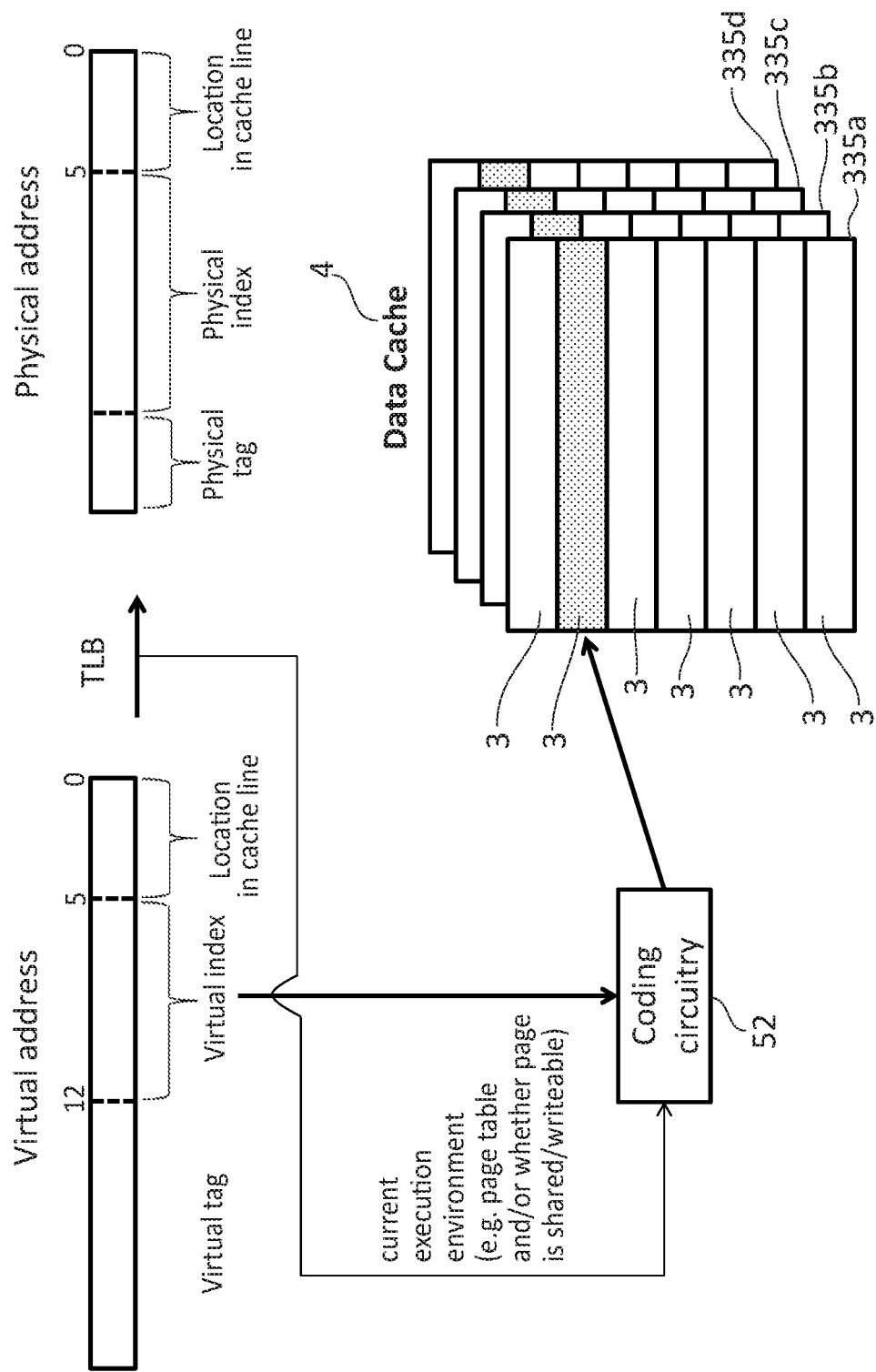
FIG. 22 shows an example in which the storage circuitry takes the form of a data cache.

The present technique can also be used in respect of a data cache 4, which is a further form of the claimed storage circuitry as shown in FIG. 22. FIG. 22 illustrates a set-associative data cache 4 split up into four ways 335a, 335b, 335c, 335d, with each way being split up into a number of sets, each of which is capable of storing an entry. A hashing algorithm can be used to determine the set to be used for a given input address. Each way of the selected set is then checked in order to locate the requested data.

In the present technique, the hashing algorithm is performed by the coding circuitry 52, which bases the hashing algorithm at least partly on a current execution environment. Consequently, other execution environments cannot easily deduce where an item of data is stored in the cache, limiting their ability to obtain that data. As with the instruction cache 4, comparison circuitry 317 is used to order to provide correctness. In other words, a combination of the index and tag of an input (e.g. virtual) address are compared to the index and tag stored with each entry 3 to inhibit incorrect data (such as that stored under an old value of the current execution environment, or stored by a different execution environment) from being inappropriately accessed.

However, further considerations apply when using the present technique with data caches (as opposed to instruction caches). Unlike in an instruction cache, data stored within a data cache can be modified. This can lead to coherency problems where multiple different versions of the same data exist within the cache. Consequently, if two processes attempt to access the same physical address then they should be directed towards the same set. If this is not the case, then each process would obtain its own copy of the data (e.g. from memory), store it in a different set and then modify the data.

This problem does not arise in respect of data that cannot be modified. Although it might perhaps be wasteful of space within a cache, there are no coherency problems associated with storing multiple copies of read-only data within a cache. Consequently, in relation to data that is stored in a page of memory that is marked as being read-only (e.g. non-writeable), the coding (e.g. hashing) process can proceed as previously described. Whether or not the page of memory associated with data is writeable or not can be stored, e.g. in page tables and/or the TLB.

Aside from this, there are a number of possible solutions to the problem. Firstly, the encoding process performed by the coding circuitry 52 can be foregone in respect of data stored in pages that are shared between processes. Again, this information can be stored in the page tables and/or TLB alongside the entry for the given page. Secondly, the current execution environment could consider the page of memory containing the data being accessed. For instance, the encoding performed by the coding circuitry could change on a page-by-page basis with the input to the coding circuitry (the current execution environment) being stored in, e.g. the TLB or page table entries.

In other situations, e.g. where different processes do not share data, the current execution environment can be changed between processes in order to obfuscate the location of data stored in respect of a different execution environment.

Note that in some embodiments, the current execution environment could differ for each of the different ways. This could provide further obfuscation of where data is located.

VIPT Cache

Figure 23:
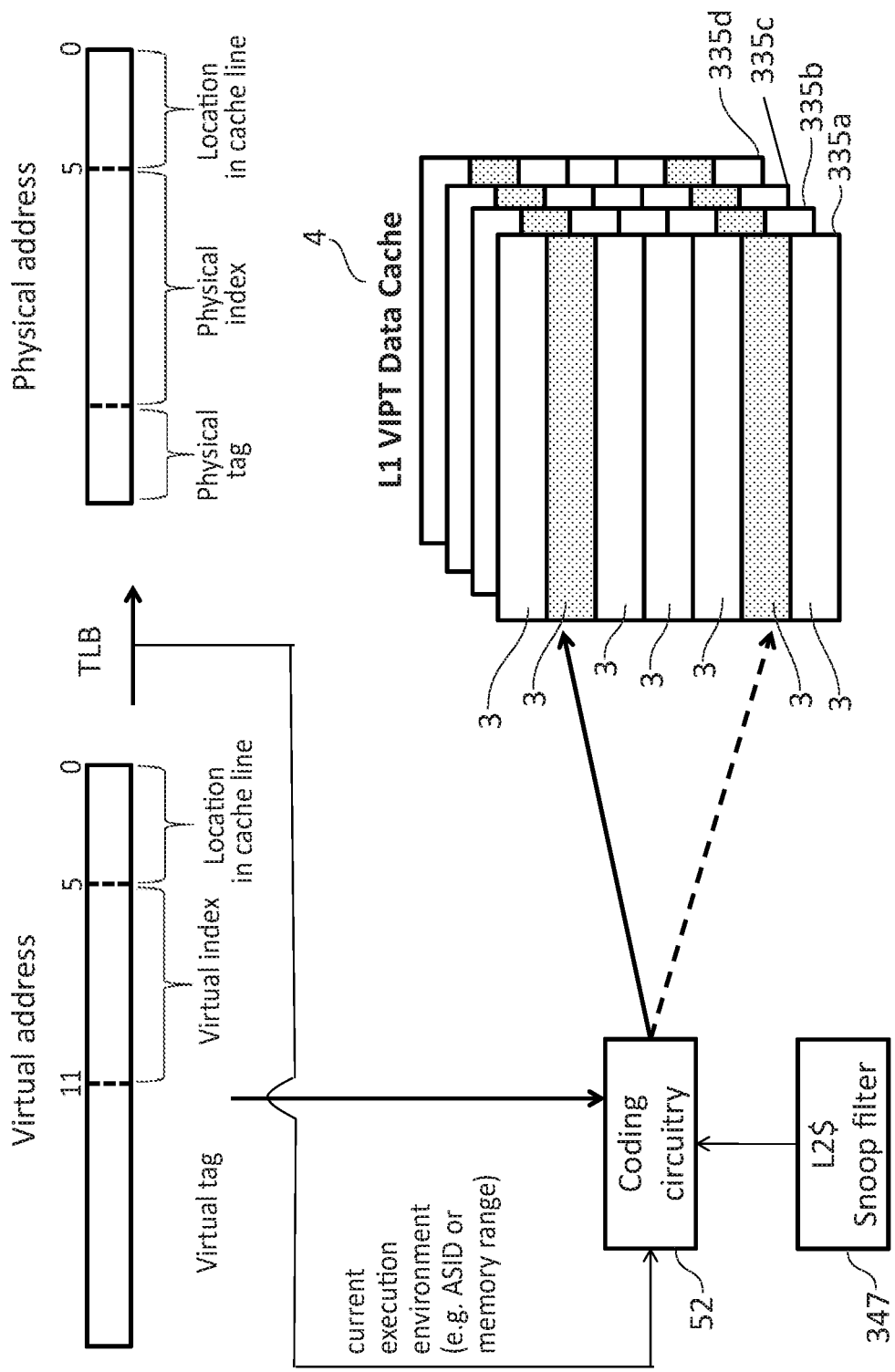
FIG. 23 shows an example in which the storage circuitry takes the form of a VIPT cache.

FIG. 23 illustrates the use of a Virtually Indexed, Physically Tagged (VIPT) cache 4, which is another type of the claimed storage circuitry with which the present technique can be applied. The use of a VIPT cache adds further considerations beyond those described for a data cache, explained above.

In particular, in a VIPT cache, some bits of the index will be different than if it had come from the Physical Address, and so a Physical Address can map to multiple sets. Consequently, the same physical address can be mapped to multiple different sets of a cache (each of those sets potentially having a plurality of ways 335). In many architectures, coherency is maintained between all of these 'aliases'. Hence, it is important to inhibit the same physical address from residing in multiple places in the cache at the same time. In the present embodiment, this is managed by the use of a snoop filter 347 belonging to a lower level cache (e.g. the level two cache in the case of a level one VIPT cache).

Figure 24:
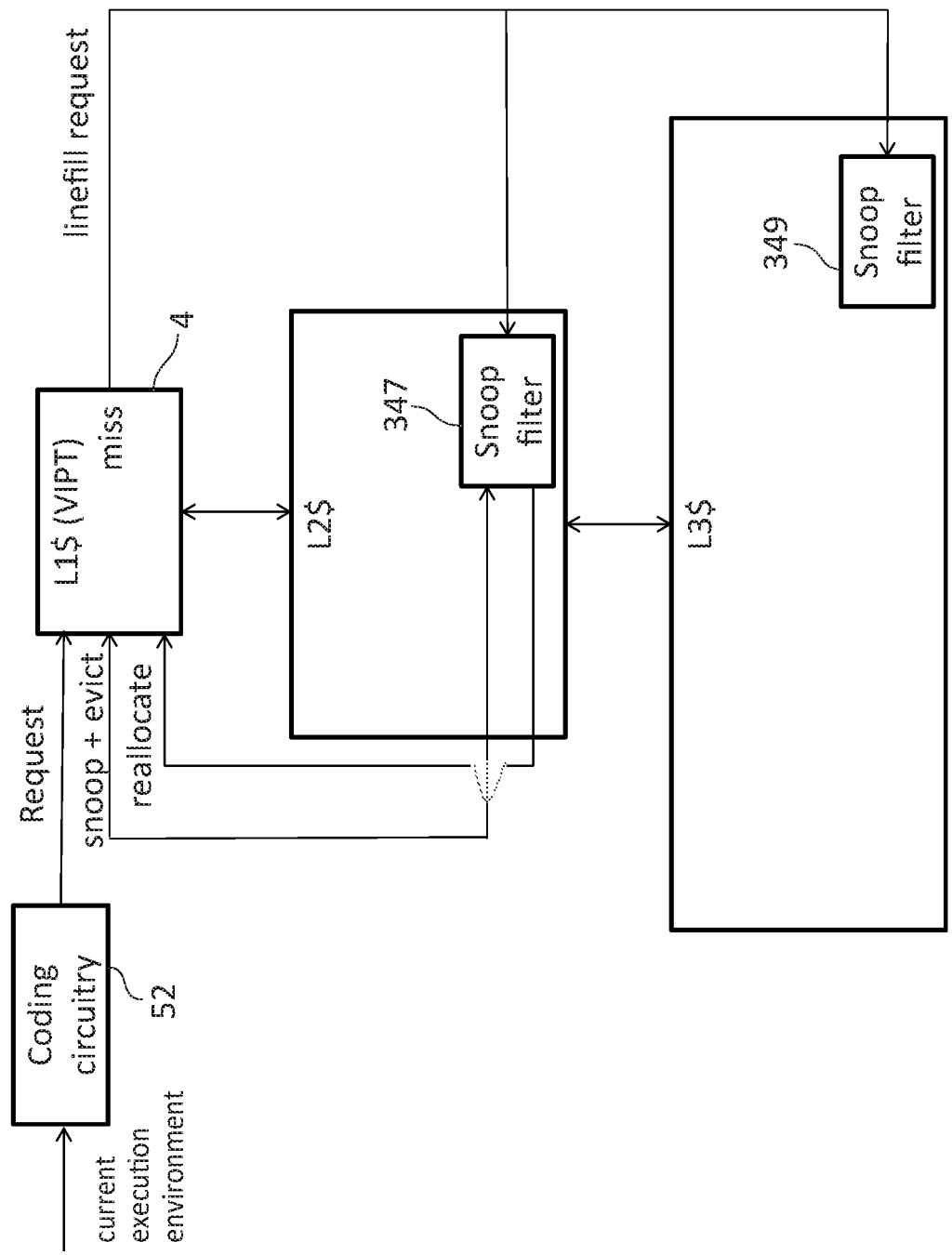
FIG. 24 illustrates the process of using a lower level snoop filter for managing alias coherency in the example of FIG. 23.

This process is illustrated in more detail with respect to FIG. 24. A request is issued to the L1 VIPT data cache 4. As previously described, at least some of the bits of the access address associated with the request are encoded by the encoding circuitry 52 using a current execution environment. In this way, each execution environment can be associated with its own 'alias'. In this example, the access request results in a miss. However, the data does in fact exist at another alias of the accessed address in the L1 VIPT data cache 4. The miss at the L1 VIPT data cache 4 results in a 'linefill request' being issued to lower level indexing circuitry such as snoop filters 347, 349. In this case, the snoop filter 347 of the level two cache is aware that the requested data is stored in a different alias of the L1 VIPT data cache 4. The data is therefore held by a different execution environment. A snoop and evict request is therefore sent to the L1 VIPT data cache 4 and the requested access is made. Once the access is complete, a reallocation request is made to store the data (as modified) from the location at which it was previously allocated to the location at which it was newly requested as a result of the coding circuitry 52.

The snoop filter 347 is able to determine the index at which each item of data is stored in the L1 VIPT data cache 4 by watching fetches performed by the L1 VIPT data cache 4. The snoop filter stores, for each item stored in the higher level L1 VIPT data cache 4, the index at which the data is stored (or an identification of which alias stores a given item of data). Alternatively, in some embodiments, the snoop filter 347 could query each of the possible aliases.

Main Memory

Figure 25:
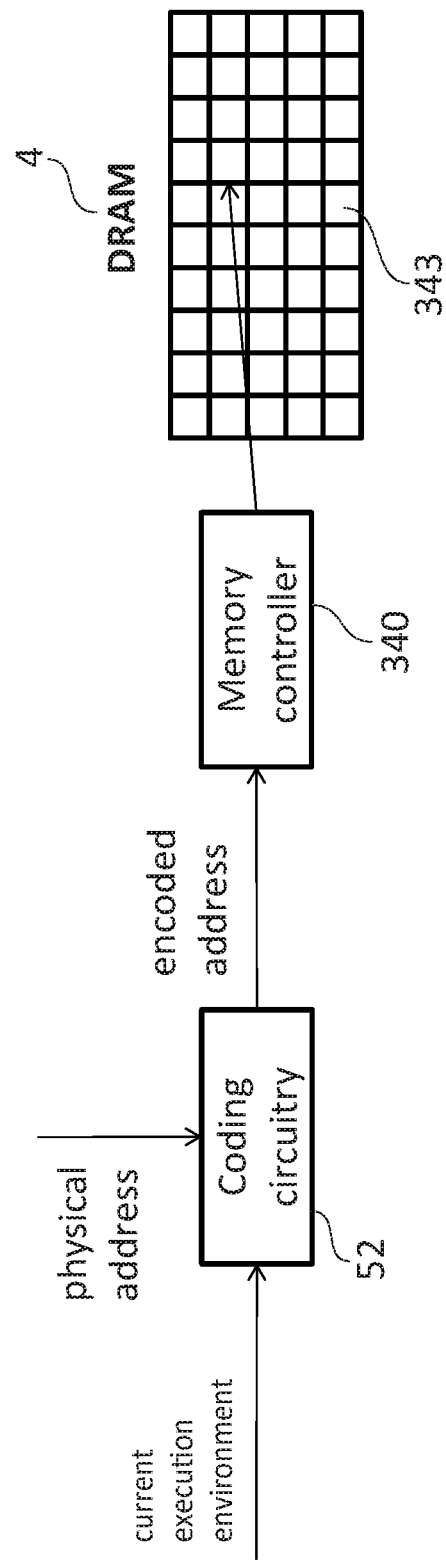
FIG. 25 shows an example in which the storage circuitry takes the form of main memory.

FIG. 25 illustrates an embodiment in which the present technique is applied to main memory (e.g. DRAM) 4, which is another example of the claimed storage circuitry.

When a physical address is passed to a memory controller 340, the memory controller access the relevant channel, DIMM, rank, and bank. At this point, individual bits are stored in cells 343 made up from rows and columns and the memory controller accesses the relevant cells in order to perform the requested memory access.

One attack that can be performed on DRAM, known as a Rowhammer attack, exploits the physical nature of these cells. In particular, DRAM works by applying a charge to a component (e.g. a capacitor), which slowly discharges over time. In order to maintain the value stored in a cell, a periodic 'refresh' is performed in which the stored value is read and rewritten back to the cell—thereby restoring the charge and preventing it from completely dissipating. As memory density has increased, the size of individual cells has decreased, and the tolerance to noise has decreased. The rowhammer attack works by identifying cells that are vulnerable to charge leakage from other neighbouring cells. Those neighbouring cells are then repeatedly hammered (accessed) in order to continually apply a charge to those cells. Each time, a small amount of the applied charge will leak into the vulnerable cells. Consequently, come refresh time, the value of the vulnerable cell is read and if sufficient leakage has occurred, the value stored in the cell is incorrectly interpreted and refreshed with the wrong value— thereby causing the bit in that cell to be flipped. For bits that represent privilege levels (such as for memory pages), this can lead to escalation attacks. This can be particularly problematic, since targeting data stored within a main memory can enable an attack to exploit or gain information about code running not only on a local core, but also other cores in the system.

The Rowhammer attack is possible largely because of the straightforward mapping between physical addresses and cells within the DRAM.

The present technique can therefore be applied in order to obfuscate the mapping between physical addresses and cell locations. In particular, by varying the mapping between systems, each time each system was booted, it can become very difficult for any reverse engineering to take place to identify the relationship between a physical address and a cell location.

As in other embodiments, coding circuitry 52 is provided to perform a coding on an access address. In this case, the access address takes the form of a physical address. The current execution environment is used to implement the coding. In this case, the coding can take the form of a combination of factors including a unique machine identifier and an identifier that is varied (e.g. randomly generated) at each boot of the system. These identifiers are software-invisible so that they can be neither read nor modified by software.

The coding can be a permutation of the physical address. This makes it possible for the encoding to be undone. Since the physical address itself is unchanged, the entire process is invisible (and therefore backwards compatible) with existing software.

Note that where multiple memory controllers are provided (e.g. in a multiprocessor system), each controller could be allocated a portion of the address space and can apply a different coding on addresses within that address space. Alternatively, a single coding could be used and part of the coding can be used to select which memory controller is used.

In some embodiments, rather than permute every single address, permutation is performed on a higher level of granularity. Consequently, physical addresses that are close to each other are more likely to remain physically close to each other. For example, the locations of pages could be permuted by only permuting a selection of bits in the physical address.

Combined System

It will be appreciated that elements of each of the embodiments described above can be combined together into a single system in which each storage circuit obfuscates the location of data that it stores. In this case, a different execution environment could be considered for each item of storage circuitry, which would improve security due to increased consistency in storage protocols between storage circuits. In contrast, a single execution environment could be considered for each item of storage circuitry (e.g. each item of storage circuitry could consider 'execution environment' in the same manner). One reason to do this would be to limit the number of execution environment specific variables that exist to handle storage at each item of storage circuitry.

Further example arrangements are set out in the following paragraphs:

(1) A data processing apparatus comprising: branch prediction circuitry adapted to store at least one branch prediction state entry in relation to a stream of instructions; input circuitry to receive at least one input to generate a new branch prediction state entry, wherein the at least one input comprises a plurality of bits; and coding circuitry adapted to perform an encoding operation to encode at least some of the plurality of bits based on a value associated with a current execution environment in which the stream of instructions is being executed.

(2) A data processing apparatus according to paragraph (1), wherein the encoding operation comprises encoding said at least some of the plurality of bits based on a value indicative of a current execution permission with which the stream of instructions is being executed.

(3) A data processing apparatus according to paragraph (1), wherein the encoding operation comprises encoding the at least some of the bits by using a key, wherein the key is based on the current execution environment in which the stream of instructions is being executed.

(4) A data processing apparatus according to paragraph (3), wherein the encoding operation comprises rearranging or toggling the at least some of the plurality of bits using the key.

(5) A data processing apparatus according to paragraph (3), wherein the at least one input comprises an indication of an instruction address of a branch instruction; the branch prediction circuitry is adapted to receive a query value comprising an indication of an instruction address of an instruction and to perform a search using the query value; and the coding circuitry is adapted to perform the encoding operation on at least some of a plurality of bits of the query value using the key prior to the search.

(6) A data processing apparatus according to paragraph (5), wherein the coding circuitry is adapted to recalculate a value of the key associated with the current execution environment and perform the encoding operation on the at least some of the plurality of bits of the query value using the recalculated value of the key.

(7) A data processing apparatus according to paragraph (3), wherein the at least one input comprises an indication of a destination address of a branch instruction; the branch prediction circuitry is adapted to receive a query value comprising an indication of an instruction address of an instruction and to perform a search using the query value; and the apparatus comprises reverse encoding circuitry to perform a reverse encoding operation on an output of the branch prediction circuitry output in response to receiving the query value.

(8) A data processing apparatus according to paragraph (7), wherein the reverse encoding circuitry is adapted to recalculate a value of the key associated with the current execution environment and perform the reverse encoding operation using the recalculated value of the key.

(9) A data processing apparatus according to paragraph (3), wherein the key is further based on any combination of one or more key input values indicative of at least one of: exception level, privilege level, ASID, VMID, NS, physical processor core number, and logical core number with which the stream of instructions is being executed, one or more software writeable registers and a previously generated random number.

(10) A data processing apparatus according to paragraph (9), wherein the previously generated random number comprises at least one of: a per-logical-processor element; a per-physical-processor element; and a system-wide element.

(11) A data processing apparatus according to paragraph (9), wherein the key is based on a one-way transformation applied to said one or more key input values.

(12) A data processing apparatus according to paragraph (1), wherein the stream of instructions can be executed in one of a plurality of execution environments adapted to execute at a lowest execution permission; the coding circuitry is adapted to perform the encoding operation further based on an identifier of the one of the plurality of execution environments in which the stream of instructions is being executed.

(13) A data processing apparatus according to paragraph (1), comprising: monitor circuitry adapted to detect a rate of any combination of instruction fetch faults and instruction decode faults while the stream of instructions is being executed in a speculative state, and to raise an exception or create an error response in reaction to the rate meeting a predetermined condition.

(14) A data processing apparatus according to paragraph (1), wherein the branch prediction circuitry comprises a branch target prediction structure comprising a plurality of branch target entries, each branch target entry specifying at least a branch target address; and the coding circuitry comprises encryption circuitry to encrypt at least part of a new branch target entry to be written to the branch target prediction structure, using an encryption key associated with the current execution environment.

(15) A data processing apparatus according to paragraph (14), wherein each branch target entry specifies tag information and branch data specifying at least the branch target address; and the apparatus comprises branch target prediction circuitry to perform a branch target prediction lookup for an instruction fetch address associated with the current execution environment, the branch target prediction lookup comprising determining whether any of a subset of branch target entries of the branch target prediction structure specifies tag information corresponding to a target tag determined for the instruction fetch address.

(16) A data processing apparatus according to paragraph (15), wherein values of the target tag are reusable in more than one execution environment.

(17) A data processing apparatus according to paragraph (15), wherein the encryption circuitry is configured to encrypt at least part of the tag information of the new branch target entry using the encryption key.

(18) A data processing apparatus according to paragraph (17), wherein the encryption circuitry is configured to encrypt at least part of the branch data of the new branch target entry using the encryption key; and the apparatus comprises decryption circuitry to decrypt said at least part of the branch data of one of the subset of branch target entries identified in the branch target prediction lookup as specifying tag information corresponding to the target tag.

(19) A data processing apparatus according to paragraph (14), wherein the encryption key comprises a static key fixed for the current execution environment.

(20) A data processing apparatus according to paragraph (19), wherein the static key for the current execution environment is dependent on a common key shared between at least two of the plurality of execution environments and at least one identifier specific to the current execution environment.

(21) The apparatus according to paragraph (14), wherein the encryption key comprises a dynamic key which is variable for the current execution environment.

(22) The apparatus according to paragraph (21), comprising key generating circuitry to generate an updated encryption key for the current execution environment.

(23) The apparatus according to paragraph (15), comprising a region table comprising a plurality of region entries, each region entry mapping branch context information to a region identifier comprising fewer bits than the branch context information, the branch context information comprising at least one identifier associated with a corresponding execution environment.

(24) The apparatus according to paragraph (23), wherein the target tag for the instruction fetch address comprises a target region identifier mapped by the region table to the branch context information associated with the instruction fetch address.

(25) The apparatus according to paragraph (23), wherein each region entry specifies the encryption key associated with the corresponding execution environment.

(26) The apparatus according to paragraph (23), wherein when the mapping provided by a given region entry of the region table is updated, the branch target prediction circuitry is configured to trigger an update of the encryption key associated with the execution environment associated with the given region entry following the mapping update.

(27) The apparatus according to paragraph (14), wherein the branch target prediction circuitry is configured to determine the target tag depending on the instruction fetch address and a history of branch outcomes of previous branch instructions preceding an instruction at the instruction fetch address.

(28) A data processing apparatus comprising: means for storing at least one branch prediction state entry in relation to a stream of instructions; means for receiving at least one input to generate a new branch prediction state entry, wherein the at least one input comprises a plurality of bits; and means for encoding at least some of the plurality of bits of said at least one input based on a value associated with a current execution environment in which the stream of instructions is being executed.

(29) A method comprising: storing at least one branch prediction state entry in relation to a stream of instructions; receiving at least one input to generate a new branch prediction state entry, wherein the at least one input comprises a plurality of bits; and encoding at least some of the plurality of bits based on a value associated with a current execution environment in which the stream of instructions is being executed.

Still further example arrangements are set out in the following clauses:

(1) A data processing apparatus comprising:
branch prediction circuitry adapted to store at least one branch prediction state entry in relation to a stream of instructions;
input circuitry to receive at least one input to generate a new branch prediction state entry, wherein the at least one input comprises a plurality of bits; and
coding circuitry adapted to encode at least some of the plurality of bits based on a value indicative of a current execution permission in which the stream of instructions is being executed.

(2) A data processing apparatus according to clause (1), wherein
the coding circuitry is adapted to encode the at least some of the bits by using a key, wherein the key is based on the current execution permission in which the stream of instructions is being executed.

(3) A data processing apparatus according to clause (2), wherein
the coding circuitry is adapted to encode the at least some of the plurality of bits by rearranging the at least some of the plurality of bits using the key.

(4) A data processing apparatus according to clause (2), wherein
the coding circuitry is adapted to encode the at least some of the plurality of bits by toggling the at least some of the plurality of bits using the key.

(5) A data processing apparatus according to clause (2), wherein
the coding circuitry is adapted to encode the at least some of the plurality of bits by performing a hash function using the key.

(6) A data processing apparatus according to clause (5), wherein
the hash function is reversible.

(7) A data processing apparatus according to clause (2), wherein the coding circuitry is adapted to encode the at least some of the plurality of bits by performing an XOR operation with the key.

(8) A data processing apparatus according to clause (5), wherein the hash function is a one-way hash function.

(9) A data processing apparatus according to any one of clauses (2) to (8), wherein the at least one input comprises an indication of an instruction address of a branch instruction;

the branch prediction circuitry is adapted to receive a query value comprising an indication of an instruction address of a branch instruction and to perform a search using the query value; and the coding circuitry is adapted to encode at least some bits of the query value using the key, prior to the search.

(10) A data processing apparatus according to clause (9), wherein the coding circuitry is adapted to recalculate a value of the key associated with the current execution environment and perform the encoding operation on the at least some of the plurality of bits of the query value using the recalculated value of the key.

(11) A data processing apparatus according to any one of clauses (2) to (10), wherein the at least one input comprises an indication of a destination address of a branch instruction;

the branch prediction circuitry is adapted to receive a query value comprising an indication of an instruction address of a branch instruction and to perform a search using the query value; and the apparatus comprises decode circuitry to perform a decode of an output of the branch prediction circuitry output in response to receiving the query value.

(12) A data processing apparatus according to clause (11), wherein the decode comprises recalculating a value of the key and then performing the decoding function.

(13) A data processing apparatus according to any of clauses (1) to (12), wherein the key is further based on any combination of values indicative of exception level, privilege level, ASID, VMID, NS, physical processor core number, and logical core number with which the stream of instructions is being executed and one or more software writeable registers.

(14) A data processing apparatus according to any of clauses (1) to (13), wherein the key is further based on a previously generated random number.

(15) A data processing apparatus according to clause (14), wherein the previously generated random number comprises at least one of:

a per-logical-processor element;

a per-physical-processor element; and a system-wide element.

(16) A data processing apparatus according to clause (15), wherein at least part of the previously generated random number is generated at startup.

(17) A data processing apparatus according to any one of clauses (14) to (16), wherein at least part of the previously generated random number is pseudo-random.

(18) A data processing apparatus according to any one of clauses (1) to (17) wherein the key is based on a one-way transformation applied to at least one key input parameter, including at least one value associated with the current execution environment or current execution permission.

(19) A data processing apparatus according to any of clauses (1) to (17), wherein the stream of instructions can be executed in one of a plurality of execution environments adapted to execute at a lowest execution permission;

the coding circuitry is adapted to encode the at least some of the plurality of bits further based on an identifier of the one of the plurality of execution environments in which the stream of instructions is being executed.

(20) A data processing apparatus according to any of clauses (1) to (19), comprising:

monitor circuitry adapted to detect a rate of any combination of instruction fetch faults and instruction decode faults while the stream of instructions is being executed in a speculative state; and to raise an interrupt or create an error response in reaction to the rate increasing beyond a predetermined threshold.

(21) A data processing apparatus according to clause (20), wherein the predetermined threshold is at least 20% higher than the immediately preceding rate.

(22) A data processing apparatus comprising:

means for storing at least one branch prediction state entry in relation to a stream of instructions;

means for receiving at least one input to generate a new branch prediction state entry, wherein the at least one input comprises a plurality of bits; and means for encoding at least some of the plurality of bits of said at least one input based on a value indicative of a current execution permission in which the stream of instructions is being executed.

(23) A method comprising:

storing at least one branch prediction state entry in relation to a stream of instructions;

receiving at least one input to generate a new branch prediction state entry, wherein the at least one input comprises a plurality of bits; and encoding at least some of the plurality of bits based on a value indicative of a current execution permission in which the stream of instructions is being executed.

(24) An apparatus comprising:

processing circuitry to perform data processing in one of a plurality of execution contexts;

a branch target prediction structure comprising a plurality of branch target entries, each branch target entry specifying branch information indicative of at least a branch target address;

encryption circuitry to encrypt branch information to be written to the branch target prediction structure using an encryption key associated with a current execution context; and decryption circuitry to decrypt branch information read from the branch target prediction structure using the encryption key associated with the current execution context.

(25) The apparatus according to clause (24), wherein each branch target entry specifies tag information; and the apparatus comprises branch target prediction circuitry to perform a branch target prediction lookup for an instruction fetch address associated with the current execution context, the branch target prediction lookup comprising determining whether any of a subset of branch target entries of the branch target prediction structure specifies tag information corresponding to a target tag determined for the instruction fetch address.

(26) The apparatus according to clause (25), wherein values of the target tag are reusable in more than one of the plurality of execution contexts.

(27) The apparatus according to an of clauses (25) and (26), wherein when none of the subset of branch target entries specifies tag information corresponding to the target tag and the instruction fetch address specifies a block of at least one instruction comprising a branch instruction, the encryption circuitry is configured to encrypt actual branch information for the branch instruction using the encryption key associated with the current execution context, and the branch target prediction circuitry is configured to allocate a branch target entry of the branch target prediction structure specifying the encrypted branch information and specifying tag information corresponding to the target tag.

(28) The apparatus according to any of clauses (25) to (27), wherein when one of the subset of branch target entries specifies tag information corresponding to the target tag, the decryption circuitry is configured to decrypt the branch information stored in said one of the subset of entries using the encryption key associated with the current execution context, and the branch target prediction circuitry is configured to output the decrypted branch information as predicted branch information for the instruction fetch address.

(29) The apparatus according to any of clauses (24) to (28), wherein the encryption key comprises a static key fixed for the current execution context.

(30) The apparatus according to clause (29), wherein the static key for the current execution context is dependent on a common key shared between at least two of the plurality of execution contexts and at least one context identifier specific to the current execution context.

(31) The apparatus according to any of clauses (24) to (30), wherein the encryption key comprises a dynamic key which is variable for the current execution context.

(32) The apparatus according to clause (31), comprising key generating circuitry to generate an updated encryption key for the current execution context.

(33) The apparatus according to clause (25), wherein when none of the subset of branch target entries specifies tag information corresponding to the target tag and the instruction fetch address specifies a block of at least one instruction comprising a branch instruction, the encryption circuitry is configured to encrypt the target tag using the encryption key associated with the current execution context, and the branch target prediction circuitry is configured to specify the encrypted target tag as the tag information for the allocated branch target entry; and in the branch target prediction lookup, the decryption circuitry is configured to decrypt the tag information of each of the subset of branch target entries and the branch target prediction circuitry is configured to compare the decrypted tag information with the target tag.

(34) The apparatus according to any of clauses (24) to (33), wherein the branch information is also indicative of at least one piece of branch information other than the branch target address.

(35) The apparatus according to clause (25), wherein the branch target prediction circuitry is configured to determine the target tag dependent on at least one context identifier associated with the current execution context.

(36) The apparatus according to clause (25), comprising a region table comprising a plurality of region entries, each region entry mapping branch context information to a region identifier comprising fewer bits than the branch context information, the branch context information comprising at least one context identifier associated with a corresponding execution context.

(37) The apparatus according to clause (36), wherein the target tag for the instruction fetch address comprises a target region identifier mapped by the region table to the branch context information associated with the instruction fetch address.

(38) The apparatus according to any of clauses (36) and (37), wherein each region entry specifies the encryption key associated with the corresponding execution context.

(39) The apparatus according to any of clauses (36) to (38), wherein when the mapping provided by a given region entry of the region table is updated, the branch target prediction circuitry is configured to trigger an update of the encryption key associated with the execution context associated with the given region entry following the mapping update.

(40) The apparatus according to any of clauses (36) to (39), wherein the branch context information of a given region entry also comprises a portion of the instruction fetch address for which a previous branch target prediction lookup caused the given region entry to be allocated to the region table.

(41) The apparatus according to clause (25), wherein the branch target prediction circuitry is configured to determine the target tag depending on the instruction fetch address and a history of branch outcomes of previous branch instructions preceding an instruction at the instruction fetch address.

(42) An apparatus comprising:

means for performing data processing in one of a plurality of execution contexts;

means for storing branch target entries of a branch target prediction structure, each branch target entry specifying branch information indicative of at least a branch target address;

means for encrypting branch information to be written to the means for storing using an encryption key associated with a current execution context; and means for decrypting branch information read from the means for storing using the encryption key associated with the current execution context.

(43) A method comprising:

performing data processing in one of a plurality of execution contexts;

storing branch target entries of a branch target prediction structure, each branch target entry specifying branch information indicative of at least a branch target address;

encrypting branch information to be written to the branch target prediction structure using an encryption key associated with a current execution context; and decrypting branch information read from the branch target prediction structure using the encryption key associated with the current execution context.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
storage circuitry adapted to store data:
input circuitry to receive at least one input to generate an access request to the data, wherein the at least one input comprises a plurality of address bits; and
coding circuitry to perform an translation operation to encode at least some of the plurality of address bits based on a value corresponding with a current execution environment to generate a plurality of encoded address bits and an encoded access request to access the data, wherein the encoded access request comprises the plurality of encoded address bits.

2. A data processing apparatus according to claim 1, wherein
the storage circuitry comprises branch prediction circuitry; and
the data comprises a branch prediction state data in relation to a stream of instructions that execute in the current execution environment.

3. A data processing apparatus according to claim 1, wherein
the storage circuitry comprises a cache.

4. A data processing apparatus according to claim 3, wherein
the storage circuitry comprises address translation circuitry; and
the at least one data comprises a translation from an input address in an input address space to an output address in an output address space.

5. A data processing apparatus according to claim 3, comprising:
tag comparison circuitry to compare a tag associated with the data to determine if the data should be accessed in response to the access request, wherein
the at least one input comprises an input tag; and
the tag associated with the data is compared to the input tag and accessed in response to a match.

6. A data processing apparatus according to claim 3, wherein
the storage circuitry comprises an instruction cache; and
the at least one data comprises at least one instruction.

7. A data processing apparatus according to claim 3, wherein
the storage circuitry comprises a data cache; and
the at least one data comprises a data value that is stored in memory circuitry at a memory location.

8. A data processing apparatus according to claim 7, comprising:
further storage circuitry to store associations between the execution environments and memory locations, wherein
each of the memory locations is associated with at most one of the execution environments.

9. A data processing apparatus according to claim 8, wherein
the access request is a memory access request to a requested memory location in the memory locations; and
the current execution environment is one of the execution environments associated with the requested memory location.

10. A data processing apparatus according to claim 8, wherein
the memory locations comprise pages in the memory circuitry that are set as being writeable.

11. A data processing apparatus according to claim 8, wherein
the further storage circuitry comprises address translation circuitry.

12. A data processing apparatus according to claim 7, wherein
the data cache comprises a Virtually Indexed Physically Tagged cache comprising a plurality of sets and a plurality of ways; and
the data value is storable within more than one of the plurality of sets within each of the plurality of ways.

13. A data processing apparatus according to claim 12, comprising:
index circuitry to store an indication of the set in which the data value is stored in association with the at least one input and an execution environment.

14. A data processing apparatus according to claim 13, wherein
the index circuitry is a snoop filter or a directory.

15. A data processing apparatus according to claim 3, wherein
the storage circuitry comprises a DRAM comprising memory locations; and
the access request is a memory access request to a requested memory location in the memory locations.

16. A data processing apparatus according to claim 15, wherein
the current execution environment is based on a processing circuit that provides the input to the input circuitry to generate the access request.

17. A data processing apparatus according to claim 15, comprising:
a plurality of processing circuits, including the processing circuit; and
further storage circuitry to store associations between execution environments and memory locations.

18. A data processing apparatus according to claim 1, wherein
the translation operation comprises translation the at least some of the address bits by using a key, wherein the key is based on the current execution environment.

19. A data processing apparatus according to claim 18, wherein
the coding circuitry is adapted to encode the at least some of the plurality of address bits by performing a hash function using the key.

20. A data processing apparatus according to claim 18, wherein
the translation operation comprises rearranging or toggling the at least some of the plurality of address bits using the key.

21. A data processing apparatus according to claim 18, wherein
the key is further based on any combination of one or more key input values indicative of at least one of: exception level, privilege level, ASID, VMID, NS, physical processor core number, and logical core number, one or more registers, a system reset counter, and a previously generated random number.

22. A data processing apparatus according to claim 21, wherein
at least one of the one or more registers is a software writeable register.

23. A data processing apparatus according to claim 21, wherein
the previously generated random number comprises at least one of:
a per-logical-processor element;
a per-physical-processor element; and
a system-wide element.

24. A data processing apparatus according to claim 21, wherein
the key is based on a one-way transformation applied to said one or more key input values.

25. A data processing apparatus according to claim 18, wherein
the access request is made in respect of a memory location; and
the key is based on the memory location.

26. A data processing apparatus according to claim 21, comprising:
event listening circuitry to change one of the one or more registers in response to an event.

27. A data processing apparatus according to claim 26, wherein
the event is the elapse of a period of time.

28. A method of data processing, comprising:
storing data;
receiving at least one input to generate an access request to the data, wherein the at least one input comprises a plurality of address bits; and
performing an translation operation to encode at least some of the plurality of address bits based on a value corresponding with a current execution environment to generate a plurality of encoded address bits and an encoded access request to access the data, wherein the encoded access request comprises the plurality of encoded address bits.

29. A data processing apparatus, comprising:
means for storing data;
means for receiving at least one input to generate an access request to the data, wherein the at least one input comprises a plurality of address bits; and
means for performing an translation operation to encode at least some of the plurality of address bits based on a value corresponding with a current execution environment to generate a plurality of encoded address bits and an encoded access request to access the data, wherein the encoded access request comprises the plurality of encoded address bits.

* * * * *